(12) United States Patent
Tsuruta et al.

(10) Patent No.: US 8,238,736 B2
(45) Date of Patent: Aug. 7, 2012

(54) OPTICAL UNIT WITH SHAKE CORRECTING FUNCTION AND PHOTOGRAPHIC OPTICAL DEVICE

(75) Inventors: Toshifumi Tsuruta, Nagano (JP); Kiyoshi Miyazaki, Nagano (JP); Tadashi Takeda, Nagano (JP); Hisahiro Ishihara, Nagano (JP); Katsushige Yanagisawa, Nagano (JP); Toshiyuki Karasawa, Nagano (JP); Yuichi Takei, Nagano (JP); Akihiro Nagata, Nagano (JP); Shinji Minamisawa, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/916,918

(22) Filed: Nov. 1, 2010

(65) Prior Publication Data

US 2011/0103782 A1 May 5, 2011

Related U.S. Application Data

(63) Continuation of application No. PCT/JP2009/001912, filed on Apr. 27, 2009.

(30) Foreign Application Priority Data

| Apr. 30, 2008 | (JP) | ................................ 2008-118579 |
| Jun. 4, 2008 | (JP) | ................................ 2008-147187 |
| Dec. 26, 2008 | (JP) | ................................ 2008-334723 |

(51) Int. Cl.
*G03B 17/00* (2006.01)
*H04N 5/228* (2006.01)

(52) U.S. Cl. .................................... 396/55; 348/208.99

(58) Field of Classification Search .................... 396/55; 348/208.99
See application file for complete search history.

(56) References Cited

U.S. PATENT DOCUMENTS

| 2007/0236577 A1 | 10/2007 | Ke et al. |
| 2009/0002825 A1 | 1/2009 | Morita et al. |
| 2009/0052037 A1* | 2/2009 | Wernersson .................. 359/554 |
| 2010/0080545 A1* | 4/2010 | Fan et al. ........................ 396/55 |

FOREIGN PATENT DOCUMENTS

JP 2001-194150 A 7/2001

(Continued)

OTHER PUBLICATIONS

International Search Report for International Application No. PCT/JP2009/001912 mailed Aug. 25, 2009 with English translation.

*Primary Examiner* — Rodney Fuller
(74) *Attorney, Agent, or Firm* — Cantor Colburn LLP

(57) ABSTRACT

Provided is a photographing optical device, which is able to reliably correct an unintentional movement by hand of a user by improving the constitution of a camera unit driving mechanism for correcting the deflection of a camera unit. In order that a camera unit is made to be rocked to correct the unintentional movement, a photographing optical device includes a first camera unit drive mechanism and a second camera unit drive mechanism, which are so disposed at two side portions sandwiching a pivot portion therebetween as to make a pair. In these camera unit drive mechanisms, camera unit driving magnets are held on the side of the camera unit as a movable body side, and camera unit driving coils are held on the side of a stationary body. The camera unit is pushed toward the pivot portion by a gimbal spring.

30 Claims, 19 Drawing Sheets

FOREIGN PATENT DOCUMENTS

| | | |
|---|---|---|
| JP | 2003-107311 A | 4/2003 |
| JP | 2005-217928 A | 8/2005 |
| JP | 2007-41326 A | 2/2007 |
| JP | 2007-41419 A | 2/2007 |
| JP | 2007-129295 A | 5/2007 |
| JP | 2007-272210 A | 10/2007 |
| JP | 2007-310084 A | 11/2007 |
| JP | 2009-25481 A | 2/2009 |
| WO | 2006/075545 A1 | 7/2006 |

* cited by examiner $M = F \cdot \sin \theta$ $M = F \cdot \cos \theta$

OPTICAL UNIT WITH SHAKE CORRECTING FUNCTION AND PHOTOGRAPHIC OPTICAL DEVICE

CROSS REFERENCE TO RELATED APPLICATIONS

This is a Continuation Application of International Application No. PCT/JP2009/001912, filed on 27 Apr. 2009, the disclosure of which is incorporated herein by reference in its entirety. International Application No. PCT/JP2009/001912 claims priority to Japanese Patent Applications No. 2008-118579, filed Apr. 30, 2008; 2008-147187, filed Jun. 4, 2008; and 2008-334723, filed Dec. 26, 2008; priority to each of which is claimed herein and the contents of each of which are incorporated herein by reference.

TECHNICAL FIELD

The present invention relates to an optical unit with shake correcting function which is mounted on a cell phone with camera or the like, and a photographic optical device into which a shake correcting function is incorporated.

BACKGROUND

A photographic optical device which is mounted on a portable apparatus is provided with a movable body including a lens, a lens drive mechanism for magnetically driving the movable body in an optical axis direction, and a photographing unit in which an imaging element is supported on a support body. In the photographic optical device, various types of a shake correction mechanism are mounted for restraining disturbances of a photographed image due to a handshake of a user. As such a shake correction mechanism, a structure where a shake correction lens provided in a photographing unit is shifted in a direction canceling the shake, a structure where an imaging element is shifted in a plane perpendicular to the optical axis, and the like have been practically used.

A structure where a shake correction mechanism is incorporated into a photographing unit is capable of being adopted in a photographic optical device which is mounted on a relatively large portable apparatus such as a digital camera. However, in a photographic optical device which is mounted on a small portable apparatus such as a cell phone with camera, a photographing unit is smaller and thus the shake correction mechanism is unable to be incorporated into the photographing unit.

In order to prevent this problem, in a photographic optical device, it has been proposed that a shake correction mechanism is structured between a photographing unit and a fixed body which supports the photographing unit. In a case that this structure is adopted, the photographing unit is structured as a movable module which is capable of displacing in a direction intersecting the optical axis on the fixed body (see Patent Literature 1).

The shake correction mechanism described in Patent Literature 1 is structured so that a photographing unit is elastically urged by a flat spring against a pivot part formed on a fixed body and the photographing unit is capable of rocking with the pivot part as a supporting point. The photographing unit is rocked around an X-axis perpendicular to an optical axis by a first photographing unit drive mechanism which is arranged at one side portion displaced from the pivot part, and the photographing unit is rocked around a Y-axis perpendicular to the optical axis by a second photographing unit drive mechanism which is arranged at another one side portion displaced from the pivot part.

Further, in another photographic optical device, another system has been proposed for correcting a hand shake occurred at the time of photographing. In other words, as shown in FIG. 20, an object side end part of a movable module 1081 in which a lens 1083 and an imaging element 1085 are supported on a support body 1082 is supported by a fixed body 1089 through an elastic member 1088 and actuators 1087 are disposed on side faces of the movable module 1081. The actuators 1087 rock an end part on an opposite side to an object to be photographed side of the movable module 1081 (end part on the imaging element side) as shown by the arrow "P" on the basis of a detection result of a shake detection sensor 1086 to correct the hand shake (see Patent Literature 2).

[PTL 1] Japanese Patent Laid-Open No. 2007-310084
[PTL 2] Japanese Patent Laid-Open No. 2007-129295

However, like the shake correction mechanism described in Patent Literature 1, in a first photographing unit drive mechanism or in a second photographing unit drive mechanism which is arranged at one side portion with respect to the pivot part, even when a positional relationship between the drive mechanism and the pivot part is slightly displaced, a driving power is varied and thus it is difficult to obtain a stable thrust force.

Further, the flat spring which is used in the shake correction mechanism described in Patent Literature 1 is formed in a shape whose spring constants in an X-axis direction and a Y-axis direction are largely different from each other. Therefore, when both of the first photographing unit drive mechanism and the second photographing unit drive mechanism are driven, a magnitude and a direction of an urging force which is applied to the photographing unit by the flat spring are not provided with linearity. Therefore, control for the first photographing unit drive mechanism and the second photographing unit drive mechanism are extremely complicated.

In addition, like the shake correction mechanism described in Patent Literature 1, in a structure that a photographing unit drive magnet is provided on a fixed body side and a photographing unit drive coil is provided on a photographing unit side which is a movable body side, since wiring lines for power supply are required to connect with the photographing unit drive coil, the number of wiring lines to the photographing unit is increased and thus a wiring structure is complicated and, on the photographing unit side, it is difficult to increase a winding number of the photographing unit drive coil. Further, since the photographing unit drive coil whose mass is larger than that of the photographing unit drive magnet is provided on the photographing unit side which is the movable body side, a large force is required to rock the photographing unit and its control is difficult.

Further, like the shake correction mechanism described in Patent Literature 2, in a system in which an end part on an imaging element side of a movable module is rocked, the movable module is unable to be appropriately rocked. In other words, a flexible wiring member such as a flexible circuit board or resin coated lead wires which is electrically connected with an imaging element and a shake detection sensor is drawn out from the end part on the imaging element side of the movable module. Therefore, the flexible wiring member is also required to be elastically deformed for rocking the end part on the imaging element side of the movable module and thus it is difficult to speedily rock the movable module. Further, when the end part on the imaging element side of the movable module is rocked, the flexible wiring member is also elastically deformed. Therefore, an unnecessary force is applied to the end part of the imaging element side of the movable module due to a shape returning force of the flexible wiring member and a magnitude of the shape returning force is varied depending on a deformed state of the flexible wiring member and thus it is difficult that the end part on the imaging element side of the movable module is rocked appropriately. Especially, when a magnetic drive mechanism is used as an actuator for shake correction, in comparison with a case that a piezo-electric element is used like the structure described in Patent Literature 2, the movable module is driven in an elastic and non-contact manner and thus the shake correction is easily affected by the flexible wiring member.

In view of the problems described above, at least an embodiment of the present invention provides an optical unit with shake correcting function which is capable of surely correcting a shake to a movable module by stabilizing a force applied to the movable module.

Further, at least an embodiment of the present invention provides a photographic optical device which is hard to be affected by deformation of a flexible wiring member that is drawn out from a movable module when the movable module on which a lens and an imaging element are mounted is rocked for correcting a shake or, when the movable module on which a shake detection sensor for a hand shake or the like is mounted in addition to the lens and the imaging element is rocked for correcting a shake.

SUMMARY

In order to solve the above problems, at least an embodiment of the present invention provides an optical unit with shake correcting function including a movable module in which at least a lens is supported on a support body, a fixed body which supports the movable module, a pivot part which is provided between the movable module and the fixed body for rockably (capable of rocking) supporting the movable module in the fixed body, and a movable module drive mechanism for shake correction which generates magnetic forces in a pair at two positions interposing the pivot part for rocking the movable module in the same direction as each other with the pivot part as a supporting point.

In at least an embodiment of the present invention, the movable module is supported by the fixed body so as to be capable of rocking through the pivot part and a movable module drive mechanism for rocking the movable module is provided between the movable module and the fixed body. Therefore, in a case that photographing is performed with a cellular phone with camera or the like on which the optical unit with shake correcting function is mounted, even when a hand shake or the like is occurred, the hand shake is corrected by rocking of the movable module. Accordingly, since the shake correction mechanism is not required to be built into the movable module, even when the shake correction mechanism cannot be provided in the movable module due to a small size of the movable module, a shake is corrected. Further, in at least an embodiment of the present invention, since the movable module drive mechanisms disposed at two positions interposing the pivot part generate magnetic forces for rocking the movable module in the same direction as each other, different from a case that the movable module drive mechanism is disposed only one side with respect to the pivot part, the driving power is stable. In other words, when a distance from the pivot part of one of the movable module drive mechanisms is displaced in a direction so that the driving force becomes smaller, a distance from the pivot part of the other of the movable module drive mechanisms is displaced in a direction so that the driving force becomes larger. Therefore, according to at least an embodiment of the present invention, a shake such as a hand shake can be corrected with a high degree of accuracy.

In at least an embodiment of the present invention, a structure may be adopted that the movable module is pressed against the pivot part by an urging means utilizing a magnetic urging force or by an urging means utilizing a spring member. When the movable module is urged by a spring member as the urging means, it is preferable that the urging means is a spring member, for example, a gimbal spring, which is provided with an inner peripheral side connecting part that is connected with the movable module, an outer peripheral side connecting part that is connected with the fixed body, and a plurality of arm parts that are extended from the inner peripheral side connecting part in the same circumferential direction as each other and connected with the outer peripheral side connecting part. According to this structure, the urging means applies a substantially uniform urging force in all directions and thus an attitude of the movable module is stable and a control for the movable module drive mechanism is extremely easy. Further, the arm parts are extended in the same circumferential direction as each other and thus the arm parts can be extended longer. As a result, the urging means applies an urging force having a high degree of linearity over the entire moving range of the movable module and thus a hand shake can be corrected surely without a complicated control for the movable module drive mechanism.

In order to solve the problem, another embodiment of the present invention provides an optical unit with shake correcting function including a movable module in which at least a lens is supported on a support body, a fixed body which supports the movable module, a pivot part which is provided between the movable module and the fixed body for rockably supporting the movable module in the fixed body, an urging means which presses the movable module against the pivot part, and a movable module drive mechanism for shake correction which generates a magnetic force for rocking the movable module with the pivot part as a supporting point. The urging means is a spring member, for example, a gimbal spring, which is provided with an inner peripheral side connecting part that is connected with the movable module, an outer peripheral side connecting part that is connected with the fixed body, and a plurality of arm parts that are extended from the inner peripheral side connecting part in the same circumferential direction as each other and connected with the outer peripheral side connecting part.

In at least an embodiment of the present invention, the urging means is a spring member having the structure described above, for example, a gimbal spring. Therefore, the urging means applies a substantially uniform urging force in all directions and thus an attitude of the movable module is stable and a control for the movable module drive mechanism is extremely easy. Further, the arm parts are extended in the same circumferential direction as each other and thus the arm parts can be extended longer. As a result, the urging means applies an urging force having a high degree of linearity over the entire moving range of the movable module and thus a hand shake can be corrected surely without a complicated control for the movable module drive mechanism.

In at least an embodiment of the present invention, it is preferable that the movable module drive mechanism generates magnetic forces in a pair at two positions interposing the pivot part for rocking the movable module in the same direction as each other with the pivot part as a supporting point. According to this structure, since the movable module drive mechanisms disposed at two positions interposing the pivot part generate magnetic forces for rocking the movable module in the same direction as each other, different from a case that the movable module drive mechanism is disposed only one side with respect to the pivot part, the driving power is stable. In other words, when a distance from the pivot part of one of the movable module drive mechanisms is displaced in a direction so that the driving force becomes smaller, a distance from the pivot part of the other of the movable module drive mechanisms is displaced in a direction so that the driving force becomes larger. Therefore, according to at least an embodiment of the present invention, a hand shake can be corrected with a high degree of accuracy.

In at least an embodiment of the present invention, it is preferable that, when three directions perpendicular to each other are set to be an X-axis, a Y-axis and a Z-axis, and a direction along the optical axis is set to be the Z-axis, two movable module drive mechanisms are structured between the movable module and the fixed body as the movable module drive mechanism and the two movable module drive mechanisms generate magnetic driving forces for rocking the movable module around two axial lines of the X-axis, the Y-axis and the Z-axis.

For example, it is preferable that the two movable module drive mechanisms are comprised of a first movable module drive mechanism which generates magnetic forces in a pair at two positions interposing the pivot part in a Y-axis direction for rocking the movable module around one of axial lines of the X-axis and the Y-axis; and a second movable module drive mechanism which generates magnetic forces in a pair at two positions interposing the pivot part in an X-axis direction for rocking the movable module around the other of the axial lines of the X-axis and the Y-axis. According to this structure, since the movable module are rocked around the X-axis and the Y-axis, when the rocking motions are combined, the movable module is rocked over the whole "XY" plane. Accordingly, all the hand shakes which may be occurred in a cellular phone with camera or the like can be corrected surely.

In at least an embodiment of the present invention, the movable module is a photographing unit in which an imaging element is mounted on the support body.

In this case, it may be structured that the lens is included in a movable body which is movably supported on the support body in an optical axis direction, and a lens drive mechanism for magnetically driving the movable body in the optical axis direction is supported on the support body in the movable module. According to this structure, even when the movable module is provided with the lens drive mechanism, a hand shake of the cell phone or the like on which the optical unit is mounted is corrected by displacement of the movable module and thus the shake correction mechanism is not required to be built into the movable module. Therefore, even when the shake correction mechanism cannot be provided within the movable module due to a small size of the movable module, a shake is corrected.

In at least an embodiment of the present invention, it is preferable that the movable module drive mechanism is provided with a movable module drive magnet which is held by one of the movable module and the fixed body and a movable module drive coil which is held by the other of the movable module and the fixed body, and the movable module drive magnet and the movable module drive coil are provided at two positions interposing the pivot part.

In this case, it is preferable that the movable module drive magnet is held on the movable module and the movable module drive coil is held by the fixed body. According to this structure, since the number of wiring lines to the movable module becomes smaller, a structure for the wiring lines can be simplified. Further, since the winding number of the movable module drive coil can be increased, a large drive force can be obtained. In addition, since the movable module drive magnet whose mass is smaller than that of the movable module drive coil is provided on the movable module which is the movable body, the weight of the movable module can be reduced. Accordingly, since the movable module can be rocked with a small force, power consumption required for shake correction can be reduced. Further, responsiveness to a hand shake is superior.

In at least an embodiment of the present invention, it is preferable that a lens drive mechanism for magnetically driving the movable body in the optical axis direction is supported on the support body in the movable module, the movable module drive mechanism is provided with a movable module drive magnet which is held by the movable module and a movable module drive coil which is held by the fixed body, the movable module is provided with a cover part surrounding the movable body on an outer peripheral side, the lens drive mechanism is provided with a lens drive coil which is held by an outer peripheral face of the movable body and a lens drive magnet which is held by an inner peripheral face of the cover part, and the movable module drive magnet is held by an outer peripheral face of the cover part. According to this structure, a magnetic interference between the lens drive mechanism and the movable module drive mechanism can be prevented.

In at least an embodiment of the present invention, it is preferable that a magnetic piece is held by the movable body at a position on an object to be photographed side in the optical axis direction with respect to the lens drive magnet for generating a magnetic attraction force between the lens drive magnet and the magnetic piece. According to this structure, in the movable module, since the position in the optical axis direction of the movable body can be controlled with a high degree of accuracy, a feed back control is not required in which a position in the optical axis direction of the lens is monitored with a sensor or the like to feed back.

In at least an embodiment of the present invention, it is preferable that the fixed body is provided with a fixed cover for covering the movable module and the movable module drive mechanism on an outer peripheral side and, when the fixed cover is viewed in a direction perpendicular to the optical axis, a portion of the fixed cover disposed on an outer side of the movable module drive magnet which is located at least within a magnetic flux region of the movable module drive magnet is formed of a magnetic body. According to this structure, leakage flux from the movable module drive mechanism to the outer side of the fixed cover can be reduced. Further, since magnetic material acts as a flux concentrating yoke, interlinkage flux interlinking with the movable module drive coil is increased and thus, when an attitude of the movable module is to be displaced by the movable module drive mechanism, a large thrust force can be obtained. Therefore, responsiveness to a shake is superior.

In this case, it is preferable that the fixed cover is provided with a first cover portion formed of nonmagnetic material and a second cover portion formed of a magnetic body. Also in this structure, leakage flux from the movable module drive mechanism to the outer side of the fixed cover can be reduced. Further, since magnetic material acts as a flux concentrating yoke, interlinkage flux interlinking with the movable module drive coil is increased and thus, when an attitude of the movable module is to be displaced by the movable module drive mechanism, a large thrust force can be obtained. Therefore, responsiveness to a shake is superior. In addition, the outside magnetic flux is prevented from entering into the shake correction magnetic drive mechanism and an effect given to an attitude of the movable module can be reduced. In addition, a structure may be easily attained that a magnetic body is not provided at a position where a magnetic attraction force with the movable module drive coil applies a load when the movable module is to be displaced.

In at least an embodiment of the present invention, it is preferable that the fixed body is provided with a fixed cover whose magnetic body portion covers an outer peripheral side of the movable module and the movable module drive mechanism, and magnetic poles of the movable module drive magnets adjacent to each other around the optical axis are different from each other. According to this structure, in the magnetic flux generated from the movable module drive magnets which are adjacent to each other around the optical axis, a magnetic flux passed through the fixed cover is reduced. As a result, since an attraction force between the fixing cover and the movable module drive magnet is reduced, an effect of the attraction force given to the displacement of the movable module can be reduced.

In at least an embodiment of the present invention, it is preferable that the movable module is provided with a movable module side yoke which holds the movable module drive magnet, the movable module side yoke is provided with a coil side flux concentrating yoke portion which is bent and extended to a position facing an outer face of the movable module drive magnet. According to this structure, since the movable module drive mechanism is interposed with a yoke which is provided with a coil side flux concentrating yoke portion, leakage flux from the movable module drive mechanism can be reduced. Further, since interlinkage flux interlinking with the movable module drive coil is increased, when an attitude of the movable module is to be displaced by the movable module drive mechanism, a large thrust force can be obtained. Therefore, responsiveness to a shake is superior.

In order to solve another problem described above, at least an embodiment of the present invention provides a photographic optical device including a movable module in which a lens and an imaging element located on an opposite side to an object to be photographed side with respect to the lens are supported on a support body, a fixed body which supports the movable module, a shake detection sensor which detects an inclination of the movable module, a shake correction mechanism which rocks the movable module on the fixed body on the basis of a detection result of the shake detection sensor to correct a shake, and an imaging element flexible wiring member which is electrically connected with the imaging element and is drawn out from an end part of the movable module on an opposite side to an object to be photographed side. The shake correction mechanism includes a rocking support part which rockably (capable of rocking) supports the movable module with a side where the imaging element is located with respect to the lens as a rocking center, and a shake correction magnetic drive mechanism which generates a magnetic force for rocking the movable module with the side where the imaging element is located with respect to the lens.

In at least an embodiment of the present invention, although an imaging element flexible wiring member which is electrically connected with the imaging element is drawn out from an end part of the movable module on an opposite side to an object to be photographed side, when a shake such as a hand shake or the like is to be corrected, the movable module is rocked with the side where the imaging element is located with respect to the lens (end part on the opposite side to an object to be photographed side) as a center, deformation of the imaging element flexible wiring member is extremely small. Therefore, the movable module can be rocked rapidly. Further, when the end part of the imaging element side of the movable module is rocked, the elastic deformation of the flexible wiring member is extremely small and thus the shape returning force of the flexible wiring member applied to the movable module is also extremely small. Accordingly, the movable module can be rocked appropriately without receiving effects of the deformation of the flexible wiring member and thus a shake such as a hand shake can be surely corrected. Especially, in at least an embodiment of the present invention, a magnetic drive mechanism is used as an actuator for shake correction and, in the case of magnetic driving, the structure can be simplified and its weight can be reduced but, since the movable module is driven elastically and in a non-contact manner, the movable module is easily affected by an external force. However, in at least an embodiment of the present invention, the deformation of the flexible wiring member is hard to affect as an external force and thus, even when the movable module is structured to be rocked by magnetic driving, the driving is appropriately performed and thus a hand shake correction which is superior in responsiveness can be performed accurately.

In at least an embodiment of the present invention, a structure may be adopted in which the movable module is provided with a movable body which includes the lens and which is movably supported on the support body in the optical axis direction, and a lens drive mechanism which is provided between the movable body and the support body for magnetically driving the movable body in the optical axis direction.

In at least an embodiment of the present invention, it is preferable that the rocking support part is a pivot part which includes a support protruded part which is protruded from one of the movable module and the fixed body toward the other of the movable module and the fixed body, and an abutted part which is provided in the other of the movable module and the fixed body and with which a tip end part of the support protruded part is abutted. According to this structure, the movable module can be surely supported in a rockable manner with a simple structure.

In at least an embodiment of the present invention, it is preferable that the shake detection sensor is mounted on the movable module on an opposite side position to the object to be photographed side with respect to the imaging element, and the shake detection sensor is electrically connected with a sensor flexible wiring member which is separately provided from the imaging element flexible wiring member or with a flexible wiring member which is integrally formed with the imaging element flexible wiring member.

In at least an embodiment of the present invention, it is preferable that the shake correction magnetic drive mechanism is performed with a closed loop control so that an integral value of a detection result by the shake detection sensor is zero.

In at least an embodiment of the present invention, it is preferable that the shake detection sensor is disposed at a position overlapping with the pivot part in the optical axis direction on the object to be photographed side with respect to the pivot part. According to this structure, since displacement in any direction of the movable module by a hand shake or the like can be surely detected, a hand shake or the like can be surely corrected.

In at least an embodiment of the present invention, it is preferable that the shake detection sensor is electrically connected with the sensor flexible wiring member which is separately provided from the imaging element flexible wiring member, and each of the sensor flexible wiring member and the imaging element flexible wiring member is a flexible circuit board in which wiring patterns are formed on a flexible insulation substrate and which is provided with a strip-shaped thinner width portion that is folded at least at one position in the optical axis direction. According to this structure, when the movable module is rocked at the time of shake correction due to a hand shake or the like, deformations of the sensor flexible wiring member and the imaging element flexible wiring member are absorbed by the bent portions of the sensor flexible wiring member and the imaging element flexible wiring member. Moreover, the bent portions are the strip-shaped thinner width portions of the imaging element flexible wiring member and the flexible circuit board and thus they can be bent with a small force and their shape returning forces after having been bent are smaller. Therefore, deformations of the sensor flexible wiring member and the imaging element flexible wiring member are hard to affect the rocking of the movable module. Accordingly, the movable module can be rocked appropriately and thus a hand shake or the like can be surely corrected. Further, when a folded structure is adopted, at the time of rocking of the movable module, tensile strain "h" of the flexible circuit board defined by the following expression becomes smaller.

Tensile strain "h"=ΔL/L

L: Original length

ΔL: Change of length

Therefore, stress "f" defined by the following expression also becomes smaller.

Stress "f"=E h

E: Constant

As a result, rocking inhibition caused by the flexible circuit board is reduced.

In at least an embodiment of the present invention, it is preferable that the strip-shaped thinner width portions of the sensor flexible wiring member and the imaging element flexible wiring member are respectively passed through a gap space that is structured between the movable module and the fixed body by the pivot part so as to avoid the support protruded part.

For example, it is preferable that the strip-shaped thinner width portions of the sensor flexible wiring member and the imaging element flexible wiring member are extended in a juxtaposed manner so as to interpose the pivot part. According to this structure, a gap space which is formed between the movable module and the fixed body by forming of the pivot part can be utilized as a routing space of the sensor flexible wiring member and the imaging element flexible wiring member.

In at least an embodiment of the present invention, it is preferable that bent portions of the strip-shaped thinner width portions directing to the shake detection sensor and the imaging element of the sensor flexible wiring member and the imaging element flexible wiring member are disposed around the support protruded part with the support protruded part as a center. According to this structure, even when the movable module is rocked in any direction, forces of the sensor flexible wiring member and the imaging element flexible wiring member applied to the movable module are equivalent to each other. Therefore, the movable module can be rocked appropriately and thus a hand shake or the like can be surely corrected.

In at least an embodiment of the present invention, it is preferable that the sensor flexible wiring member and/or the imaging element flexible wiring member are provided with a bent portion whose inner side is adhesively bonded with a bend-back prevention member. According to this structure, even when the sensor flexible wiring member and the imaging element flexible wiring member are bent, bent shapes of the sensor flexible wiring member and the imaging element flexible wiring member can be maintained surely.

In at least an embodiment of the present invention, the fixed body is provided with a base which is formed in a substantially rectangular shape and structures a part of the pivot part at an opposite side position to an object to be photographed side with respect to the movable module, the base is provided with side plate parts standing up toward the object to be photographed side only from two side parts facing each other of a bottom plate part of the base, and portions corresponding to two other side parts of the bottom plate part are formed with cut-out parts at positions overlapping with the bent portions of the sensor flexible wiring member and the imaging element flexible wiring member. According to this structure, strength of the base is secured by the side plate parts standing up from the bottom plate part of the base and, even when the bent portions are provided in the sensor flexible wiring member and the imaging element flexible wiring member, a malfunction such that the bent portion is caught by the base is not occurred and thus a hand shake or the like is corrected surely.

In at least an embodiment of the present invention, a structure may be adopted that the support protruded part is formed on the bottom plate part of the base, the movable module is provided with a sensor support plate at a position on the object to be photographed side so as to face the base, the shake detection sensor is disposed on a face on the object to be photographed side of the sensor support plate, and the abutted part with which a tip end part of the support protruded part is abutted is formed on a face opposite to the object to be photographed side of the sensor support plate.

In at least an embodiment of the present invention, it is preferable that each of the sensor flexible wiring member and the imaging element flexible wiring member is a single-sided flexible circuit board in which wiring patterns are formed on one face of the insulation substrate. A single-sided flexible circuit board is inexpensive in comparison with a double-sided circuit board and, since a force required to deform and a shape returning force occurred when having been deformed are smaller, the movable module can be rocked appropriately and a hand shake can be surely corrected. From this point of view, only a portion to be deformed may be structured of a single-sided flexible circuit board and a flat portion may be structured of a double-sided circuit board. When deformation is not a problem, a double-sided flexible circuit board in which wiring patterns are formed on both faces of an insulation substrate may be used.

In at least an embodiment of the present invention, it is preferable that an urging means is provided for urging the movable module toward the pivot part, and the urging means is a so-called gimbal spring which is provided with an inner peripheral side connecting part connected with the movable module, an outer peripheral side connecting part connected with the fixed body, and a plurality of arm parts extended from the inner peripheral side connecting part to be connected with the outer peripheral side connecting part. According to this structure, a space occupied by the urging means is narrower. Further, when the gimbal spring is provided with an inner peripheral side connecting part connected with the movable module, an outer peripheral side connecting part connected with the fixed body, and a plurality of arm parts extended from the inner peripheral side connecting part to be connected with the outer peripheral side connecting part, since the gimbal spring applies a substantially uniform urging force in all directions and thus an attitude of the movable module is stable and a control for the movable module drive mechanism is extremely easy. Further, the arm parts are extended in the same circumferential direction as each other and thus the arm parts can be extended longer. As a result, the urging means applies an urging force having a high degree of linearity over the entire moving range of the movable module and thus a hand shake or the like can be corrected surely without a complicated control for the movable module drive mechanism.

In at least an embodiment of the present invention, it is preferable that the gimbal spring is in a deformed state for generating an urging force which urges the movable module toward the pivot part during a neutral period when the shake correction magnetic drive mechanism is stopped. According to this structure, a state where the movable module is supported by the pivot part is surely maintained.

In at least an embodiment of the present invention, it is preferable that an urging means is provided for urging the movable module toward the pivot part, and the urging means includes a magnetic spring which urges the movable module toward the pivot part by magnetic operation, and a spring member which mechanically urges the movable module toward the pivot part and the spring member is a gimbal spring which is provided with an inner peripheral side connecting part connected with the movable module, an outer peripheral side connecting part connected with the fixed body, and a plurality of arm parts extended from the inner peripheral side connecting part to be connected with the outer peripheral side connecting part. According to this structure, a state where the movable module is supported by the pivot part is surely maintained. Further, during a neutral period when driving of the shake correction magnetic drive mechanism is stopped, the movable module is urged toward the pivot part only by the magnetic spring and the gimbal spring can be set in a non-deformed state where the gimbal spring does not generate an urging force. According to this structure, when the movable module is rocked, the gimbal spring is deformed. In other words, during a period when the movable module is not rocked, the gimbal spring is maintained in a flat shape. Therefore, a portion having linearity between a force applied to the gimbal spring and a deformed quantity of the gimbal spring can be utilized effectively and thus the movable module can be rocked appropriately and a hand shake or the like is corrected surely.

In at least an embodiment of the present invention, it is preferable that vibration absorbing material is fixed to at least a part of the arm part. According to this structure, when the movable module is rocked, vibration of the arm part can be rapidly stopped and thus vibration of the movable module can be also stopped rapidly.

In at least an embodiment of the present invention, regardless of that the rocking support part is a pivot part or not, a structure may be adopted that the shake detection sensor is mounted on the movable module on an opposite side position to the object to be photographed side with respect to the imaging element, and the shake detection sensor is electrically connected with a sensor flexible wiring member which is separately provided from the imaging element flexible wiring member or with a flexible wiring member which is integrally formed with the imaging element flexible wiring member. In this case, it is preferable that the shake correction magnetic drive mechanism is performed with a closed loop control so that an integral value of a detection result by the shake detection sensor is zero.

In at least an embodiment of the present invention, it is preferable that the shake correction magnetic drive mechanism generates magnetic forces in a pair at two positions interposing a rocking center for rocking the movable module in the same direction as each other. According to this structure, different from a case that the shake correction magnetic drive mechanism is disposed only one side with respect to the rocking center of the movable module, the driving power is stable. In other words, when a distance from the rocking center of the movable module of one of the shake correction magnetic drive mechanisms is displaced in a direction so that the driving force becomes smaller, a distance from the rocking center of the other of the shake correction magnetic drive mechanisms is displaced in a direction so that the driving force becomes larger. Therefore, according to at least an embodiment of the present invention, a hand shake or the like can be corrected with a high degree of accuracy.

In at least an embodiment of the present invention, it is preferable that, when three directions perpendicular to each other are set to be an X-axis, a Y-axis and a Z-axis, and a direction parallel to the optical axis is set to be the Z-axis, two shake correction magnetic drive mechanisms are structured between the movable module and the fixed body as the shake correction magnetic drive mechanism and the two shake correction magnetic drive mechanisms generate magnetic driving forces for rocking the movable module around two axial lines of the X-axis, the Y-axis and the Z-axis. According to this structure, since the movable module are rocked around two axial lines, when the rocking motions are combined, the movable module is rocked in a plane defined by the two axial lines. Accordingly, a hand shake or the like which may be occurred in a cellular phone with camera or the like can be corrected surely.

For example, it is preferable that the two shake correction magnetic drive mechanisms are comprised of a first shake correction magnetic drive mechanism which generates magnetic forces in a pair at two positions interposing the rocking center of the movable module in the Y-axis direction for rocking the movable module around the X-axis, and a second shake correction magnetic drive mechanism which generates magnetic forces in a pair at two positions interposing the rocking center of the movable module in the X-axis direction for rocking the movable module around the Y-axis. The first shake correction magnetic drive mechanism is provided with first shake correction magnets which are disposed at two positions in the Y-axis direction on the movable module and first shake correction coils which respectively face the first shake correction magnets in the Y-axis direction, and the second shake correction magnetic drive mechanism is provided with second shake correction magnets which are disposed at two positions in the X-axis direction on the movable module and second shake correction coils which respectively face the second shake correction magnets in the X-axis direction. According to this structure, since the movable module is provided with a magnet and the fixed body is provided with a coil, the number of wiring lines to the movable module becomes smaller and thus a structure for the wiring lines can be simplified. Further, when the first shake correction coil and the second shake correction coil are disposed on the fixed body, the winding number of the coil can be increased and thus a large drive force can be obtained. In addition, since a magnet whose mass is smaller than that of a coil is provided on the movable module, the weight of the movable module can be reduced. Accordingly, since the movable module can be rocked with a small force, power consumption required for shake correction can be reduced. Further, responsiveness to a hand shake is superior.

In at least an embodiment of the present invention, a structure may be adopted that a side portion extending in the X-axis direction which is located at a displaced position in the Z-axis direction from a position facing the first shake correction magnet in the Y-axis direction is set to be an effective side of the first shake correction coil, and a side portion extending in the Y-axis direction which is located at a displaced position in the Z-axis direction from a position facing the second shake correction magnet in the X-axis direction is set to be an effective side of the second shake correction coil.

In this case, it is preferable that outer faces of the first shake correction magnet and the second shake correction magnet are magnetized in different poles, a side portion extending in the Z-axis direction of the first shake correction coil is also set to be an effective side in addition to the side portion extending in the X-axis direction, and a side portion extending in the Z-axis direction of the second shake correction coil is also set to be an effective side in addition to the side portion extending in the Y-axis direction. According to this structure, magnetic fields generated from the first shake correction magnet and the second shake correction magnet are efficiently interlinked with the first shake correction coil and the second shake correction coil. Therefore, since a large torque is obtained with a small power consumption, the movable module can be rocked rapidly and surely. Accordingly, power consumption of a portable apparatus or the like provided with an image-pickup optical device can be reduced and a hand shake can be corrected rapidly and surely.

In at least an embodiment of the present invention, it is preferable that outer faces of the first shake correction magnet and the second shake correction magnet are magnetized in different poles in the Z-axis direction, side portions of the first shake correction coil extending in the X-axis direction so as to face respective portions magnetized in different poles of the first shake correction magnet in the Y-axis direction are set to be effective sides, and side portions of the second shake correction coil extending in the Y-axis direction so as to face respective portions magnetized in different poles of the second shake correction magnet in the X-axis direction are set to be effective sides. According to this structure, magnetic fields generated from the first shake correction magnet and the second shake correction magnet are efficiently interlinked with the first shake correction coil and the second shake correction coil. Further, a magnetic driving force acting on the movable module is a force which rocks the movable module in the optical axis direction. Therefore, even when the rocking center of the movable module (position of the pivot part) and a position where a force acting on the movable module are located nearer to each other in the optical axis direction, the magnetic driving force is effectively utilized as a force for rocking the movable module. Accordingly, since a large torque is obtained with a small power consumption, the movable module can be rocked rapidly and surely. As a result, power consumption of a portable apparatus or the like provided with an image-pickup optical device can be reduced and a hand shake can be corrected rapidly and surely.

In at least an embodiment of the present invention, it is preferable that the first shake correction coil and the second shake correction coil are held on respective faces of a rectangular tube-shaped coil holder which is disposed on an outer side of the movable module. According to this structure, since a structure is attained in which the first shake correction coil and the second shake correction coil are held by a coil holder having a larger strength, positional relationship between the first shake correction coil and the second shake correction coil and the first shake correction magnet and the second shake correction magnet can be obtained with a high degree of accuracy. Therefore, since a large torque is obtained with a small power consumption, the movable module can be rocked rapidly and surely. As a result, power consumption of a portable apparatus or the like provided with an image-pickup optical device can be reduced and a hand shake can be corrected rapidly and surely.

In at least an embodiment of the present invention, it is preferable that an abutting part is disposed between the fixed body and the movable module, and the movable module and the fixed body are abutted with each other through the abutting part before the movable module is abutted with the shake correction coil and before the shake correction magnet is abutted with the fixed body when the movable module is rocked. According to this structure, even when the shake correction coil and the shake correction magnet are disposed in the vicinity of each other, the shake correction coil and the shake correction magnet can be prevented from being damaged.

In at least an embodiment of the present invention, it is preferable that an attached module provided with a shutter mechanism is fixed to the fixed body on the object to be photographed side with respect to the movable module. According to this structure, in comparison with a case that the attached module is mounted on the movable module, the weight of the movable module is reduced. Therefore, the movable module can be rapidly and surely rocked and power consumption of a portable apparatus or the like provided with an image-pickup optical device can be reduced.

In at least an embodiment of the present invention, the movable module is supported by the fixed body so as to be capable of rocking through the pivot part and a movable module drive mechanism for rocking the movable module is provided between the movable module and the fixed body. Therefore, in a case that photographing is performed with a cellular phone with camera or the like on which the optical unit with shake correcting function is mounted, even when a hand shake or the like is occurred, the hand shake or the like is corrected by rocking of the movable module. Accordingly, since the shake correction mechanism is not required to be built into the movable module, even when the shake correction mechanism cannot be provided in the movable module due to a small size of the movable module, a shake is corrected. Further, in at least an embodiment of the present invention, a magnetic force generated by the movable module drive mechanism or an urging force which is generated by the urging means is stable and thus a shake such as a hand shake is corrected with a high degree of accuracy.

In at least an embodiment of the present invention, although an imaging element flexible wiring member which is electrically connected with the imaging element is drawn out from an end part of the movable module on an opposite side to an object to be photographed side, when a shake such as a hand shake or the like is to be corrected, the movable module is rocked with the side where the imaging element is located with respect to the lens (end part on the opposite side to an object to be photographed side) as a center, deformation of the imaging element flexible wiring member is extremely small. Therefore, the movable module can be rocked rapidly. Further, when the end part of the imaging element side of the movable module is rocked, the elastic deformation of the flexible wiring member is extremely small and thus the shape returning force of the flexible wiring member applied to the movable module is also extremely small. Accordingly, the movable module can be rocked appropriately without receiving effects of the deformation of the flexible wiring member and thus a shake such as a hand shake can be surely corrected. Especially, in at least an embodiment of the present invention, a magnetic drive mechanism is used as an actuator for shake correction. In the case of magnetic driving, although the structure can be simplified and its weight can be reduced, since the movable module is driven in an elastic and a non-contact manner, the movable module is easily affected by an external force. However, in at least an embodiment of the present invention, the deformation of the flexible wiring member is hard to affect as an external force and thus, even when the movable module is structured to be rocked by magnetic driving, the driving is appropriately performed and thus a hand shake correction superior in responsiveness can be performed accurately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

Figure 1A:
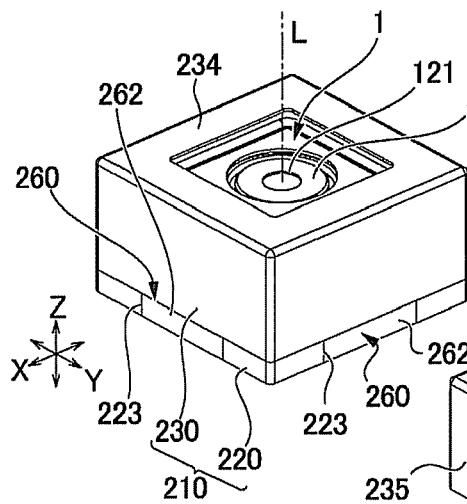
FIG. 1(a) is an outward appearance view showing an optical unit with shake correcting function in accordance with a first embodiment of the present invention which is viewed from obliquely above on an object to be photographed side.

Embodiments of the present invention will be described below with reference to the accompanying drawings. In the following description, a structure for preventing a shake by hand (hand shake) of a photographing unit as a movable module. Further, in the following description, three directions perpendicular to each other are respectively set to be an X-axis, a Y-axis and a Z-axis and a direction along an optical axis "L" (lens optical axis) is set to be the Z-axis. Therefore, in the following description, a rocking around the X-axis of shakes in the respective directions corresponds to a so-called pitching (longitudinal rocking), a rocking around the Y-axis corresponds to a so-called yawing (lateral rocking), and a rocking around the Z-axis corresponds to a so-called rolling.

First Embodiment (Entire Structure of Optical Unit with Shake Correcting Function)

FIG. 1(*a*) is an outward appearance view showing an optical unit with shake correcting function in accordance with a first embodiment of the present invention which is viewed from obliquely above on an object to be photographed side, and FIG. 1(*b*) is its exploded perspective view. FIG. 2 is a longitudinal sectional view showing the optical unit with shake correcting function in accordance with the first embodiment of the present invention which is cut in parallel to the optical axis.

An optical unit 200 with shake correcting function shown in FIGS. 1(*a*) and 1(*b*) and FIG. 2 is a thin type camera which is used in a cell phone with camera and is provided with a substantially rectangular parallelepiped shape as a whole. In this embodiment, the optical unit 200 with shake correcting function includes a base 220 in a rectangular plate shape and a box-shaped fixed cover 230 which is fitted on an upper side of the base 220. The base 220 and the fixed cover 230 structure a fixed body 210. In this embodiment, the fixed cover 230 is provided with a top plate part 234.

As described below, in this embodiment, an inner side of the fixed cover 230 is structured with a photographing unit 1 (movable module) and a shake correction mechanism for rocking the photographing unit 1 to correct a shake such as a hand shake.

(Structure of Photographing Unit)

FIG. 3(*a*) is an outward appearance view showing the photographing unit 1 that is used in the optical unit 200 with shake correcting function in accordance with the first embodiment of the present invention which is viewed from obliquely above, and FIG. 3(*b*) is its exploded perspective view. FIG. 4 is an explanatory view schematically showing an operation of the photographing unit 1 shown in FIGS. 3(*a*) and 3(*b*). A left half of FIG. 4 is a view where a movable body 3 is located at an infinity position (normal photographing position) and a right half of FIG. 4 is a view where the movable body 3 is located at a macro-position (close-up photographing position).

As shown in FIGS. 3(*a*) and 3(*b*) and FIG. 4, the photographing unit 1 moves, for example, three pieces of lenses 121 along an optical axis "L" in both of an "A"-direction (front side) approaching to an object to be photographed (object side) and a "B"-direction (rear side) approaching to an opposite side to the object to be photographed (imaging element side/image side). The photographing unit 1 is formed in a substantially rectangular parallelepiped shape. The photographing unit 1 generally includes the movable body 3 which holds three pieces of lenses 121 and a fixed diaphragm on its inner side, a lens drive mechanism 5 for moving the movable body 3 along an optical axis direction, and a support body 2 on which the lens drive mechanism 5, the movable body 3 and the like are mounted. The movable body 3 is provided with a lens holder 12 in a cylindrical shape which holds the lenses 121 and the fixed diaphragm, and a coil holder 13 which holds lens drive coils 30*s* and 30*t* described below on its outer peripheral side face.

The support body 2 is provided with an imaging element holder 19 in a rectangular plate shape which positions an imaging element 155 on an opposite side to the object to be photographed side, a case 18 in a box shape which is attached to the imaging element holder 19 on the object to be photographed side, and a spacer 11 in a rectangular plate shape which is disposed on an inner side of the case 18. Center portions of the case 18 and the spacer 11 are respectively formed with circular incident windows 110 and 180 for taking light into the lenses 121 from an object to be photographed. Further, a center portion of the imaging element holder 19 is formed with a hole 190 for guiding the incident light to the imaging element 155.

In addition, the support body 2 in the photographing unit 1 is provided with a circuit board 154 on which the imaging element 155 is mounted and the circuit board 154 is fixed on an under face of the imaging element holder 19. Further, a plate 151 is fixed to an under face of the circuit board 154.

In this embodiment, the case 18 is made of a ferromagnetic plate such as a steel plate and functions also as a yoke. Therefore, the case 18 structures an interlinkage magnetic field generating body 4 together with lens drive magnets 17 described below for generating interlinkage magnetic field in lens drive coils 30*s* and 30*t* which are held by a coil holder 13. The interlinkage magnetic field generating body 4 structures a lens drive mechanism 5 together with the lens drive coils 30*s* and 30*t* which are wound around an outer peripheral face of the coil holder 13.

The support body 2 and the movable body 3 are connected with each other through metal spring members 14*s* and 14*t*. Basic structures of the spring members 14*s* and 14*t* are similar to each other. Each of the spring members 14*s* and 14*t* is provided with an outer peripheral side connecting part 14*a* which is held by the support body 2, a ring-shaped inner peripheral side connecting part 14*b* which is held by the movable body 3, and an arm-shaped flat spring part 14*c* which connects the outer peripheral side connecting part 14*a* with the inner peripheral side connecting part 14*b*. The outer peripheral side connecting part 14*a* of the spring member 14*s* on the imaging element side is held by the imaging element holder 19 and its inner peripheral side connecting part 14*b* is connected with an imaging element side end face of the coil holder 13 of the movable body 3. The outer peripheral side connecting part 14*a* of the spring member 14*t* on the object to be photographed side is held by the spacer 11, and its inner peripheral side connecting part 14*b* is connected with an object to be photographed side end face of the coil holder 13 of the movable body 3. In this manner, the movable body 3 is movably supported along the direction of the optical axis "L" by the support body 2 through the spring members 14*s* and 14*t*. Each of the spring members 14*s* and 14*t* is made of nonmagnetic metal such as beryllium copper or nonmagnetic SUS steel material and is formed by means of that a thin plate having a predetermined thickness is performed by press working or etching processing with the use of photo lithography technique. The spring member 14*s* is divided into two spring pieces 14*e* and 14*f* and coil ends of the lens drive coils 30*s* and 30*t* are respectively connected with the spring pieces 14*e* and 14*f*. Further, the spring pieces 14*e* and 14*f* of the spring member 14*s* are respectively formed with terminals 14*d* and the spring member 14*s* (spring pieces 14*e* and 14*f*) functions also as a power supply member to the lens drive coils 30*s* and 30*t*.

In this embodiment, a ring-shaped magnetic piece 61 is held on the object to be photographed side end face of the coil holder 13 and the magnetic piece 61 is located at an object to be photographed side position with respect to the lens drive magnets 17. The magnetic piece 61 applies an urging force in the direction of the optical axis "L" to the movable body 3 by an attraction force generated between the lens drive magnets 17 and the magnetic piece 61. Therefore, the movable body 3 is prevented from being displaced by its own weight at the time of no energization and thus the movable body 3 is maintained in a desired posture and its impact resistance is improved. Further, the magnetic piece 61 acts as a kind of yoke to reduce leakage flux from a magnetic path which is structured between the lens drive magnets 17 and the lens drive coils 30s and 30t. In accordance with an embodiment, a bar or ball shaped magnetic body may be used as the magnetic piece 61. In a case that the magnetic piece 61 is formed in a ring shape, when the lens holder 12 is to be moved in the optical axis direction, a magnetic attraction force attracted between the lens drive magnets 17 and the magnetic piece 61 becomes in an isotropic state.

Further, since the magnetic piece 61 is disposed on the object to be photographed side end face of the lens holder 12, at the time of no energization (home position), the lens holder 12 is placed in a stationary state on the imaging element side by means of that the magnetic piece 61 is attracted by the lens drive magnets 17. Further, at the time of energization, the magnetic piece 61 held on the object to be photographed side end face of the lens holder 12 is moved to a further separated position from the lens drive magnets 17 and thus an unnecessary force for pressing the lens holder 12 against the imaging element side does not act. Therefore, the lens holder 12 can be moved in the optical axis direction with less electric power.

In the photographing unit 1 in this embodiment, when viewed in the direction of the optical axis "L", the lens 121 is formed in a circular shape but the case 18 used for the support body 2 is formed in a rectangular box shape. Therefore, the case 18 is provided with a rectangular tube-shaped body part 184 and an upper plate part 185 having an incident window 120 which is formed on an upper face side of the rectangular tube-shaped body part 184. In this embodiment, the rectangular tube-shaped body part 184 is formed in a square tube shape and provided with four side plate parts 181 at respective positions corresponding to sides of a quadrangle when viewed in the direction of the optical axis "L".

Respective inner faces of four side plate parts 181 are fixed with the lens drive magnets 17 and each of the lens drive magnets 17 is formed of a rectangular flat plate-shaped permanent magnet. Each of four lens drive magnets 17 is divided into two pieces in the direction of the optical axis "L" and each of the pieces is magnetized so that its inner face and outer face are magnetized in different poles from each other. In four lens drive magnets 17, for example, an inner face of an upper half portion is magnetized in an "N"-pole and its outer face is magnetized in an "S"-pole, and an inner face of a lower half portion is magnetized in an "S"-pole and its outer face is magnetized in an "N"-pole. Therefore, in four lens drive magnets 17, arrangement of the magnetic poles of adjacent permanent magnets is the same as each other and thus interlinkage flux lines to the coils are generated efficiently.

The movable body 3 includes the lens holder 12 in a cylindrical shape, which holds the lenses 121 and the like, and the coil holder 13 in which the coil (lens drive coils 30s and 30t) is wound around its outer peripheral side face. A side wall portion of the movable body 3 is structured of the lens holder 12 and the coil holder 13. The lens holder 12 is structured so that its upper half portion is formed in a large diameter cylindrical part 12b having a larger diameter and its lower half portion is formed in a small diameter cylindrical part 12a having a smaller diameter than the large diameter cylindrical part 12b. The coil holder 13 is provided with a circular lens holder accommodating opening 130 for holding the lens holder 12 in its inside.

In this embodiment, an inner circumferential shape of the coil holder 13 is circular when viewed in the direction of the optical axis "L" but its outer peripheral side face 131 which defines the outer peripheral shape of the coil holder 13 is rectangular and thus four faces 132 are provided at respective positions corresponding to four sides of the quadrangle. In the outer peripheral side face 131 of the coil holder 13, rib-shaped protruded parts 131a, 131b and 131c are formed at both end parts and a middle position in the direction of the optical axis "L" over the whole circumference. A recessed part between the rib-shaped protruded part 131a which is formed at the imaging element side end part and the rib-shaped protruded part 131b formed at the middle position is a first coil winding part 132a, and a recessed part between the rib-shaped protruded part 131c which is formed at the object side end part and the rib-shaped protruded part 131b formed at the middle position is a second coil winding part 132b.

Each of four faces 132 of the coil holder 13 is formed with a rectangular through hole (through holes 133a and 133b) so that the first coil winding part 132a and the second coil winding part 132b are respectively removed so as to avoid the corner portions of the quadrangle. The through holes 133a and 133b are penetrated through the side face wall of the coil holder 13 in an inner and outer direction. In this manner, in this embodiment, hollow portions which are recessed toward the inner side are structured in the outer peripheral side face 131 of the movable body 3 by the through holes 133a and 133b of the coil holder 13. The through holes 133a and 133b are formed at center portions in the circumferential direction between adjacent corner portions in the outer peripheral side face 131 of the coil holder 13. Lengths of the through holes 133a and 133b in the circumferential direction are set to be about ⅓ dimension of lengths of the respective faces 132 (side dimension of the quadrangle). Therefore, the corner portions of the coil holder 13 are formed with support portions 134 having a larger wall thickness which are extended with a similar thickness toward the direction of the optical axis "L". The through holes 133a and 133b are formed over the whole in a widthwise direction (direction of optical axis "L") of the first coil winding part 132a and the second coil winding part 132b but are not formed in the rib-shaped protruded parts 131a, 131b and 131c. Therefore, the through holes 133a and 133b (hollow portion) are formed only at midway portions of the coil holder 13 (movable body 3) in the direction of the optical axis "L" and formed at the positions except both end parts.

In the coil holder 13 which is structured as described above, the lens drive coil 30s is wound around the first coil winding part 132a and the lens drive coil 30t is wound around the second coil winding part 132b. In this embodiment, the first coil winding part 132a and the second coil winding part 132b are formed in a rectangular shape when viewed in the direction of the optical axis "L" and thus each of the lens drive coils 30s and 30t is wound around in a rectangular tube shape. Further, each of four lens drive magnets 17 is divided into two pieces in the direction of the optical axis "L" and each of the pieces is magnetized so that its inner face and outer face are magnetized in different poles from each other. Therefore, winding directions of two lens drive coils 30s and 30t are opposite to each other.

Further, length dimensions in the direction of the optical axis "L" of the through holes 133a and 133b are equal to length dimensions in the direction of the optical axis "L" of the first coil winding part 132a and the second coil winding part 132b, and the through holes 133a and 133b are formed over the whole in the direction of the optical axis "L" of the first coil winding part 132a and the second coil winding part 132b. However, the lens drive coils 30s and 30t are wound around the whole of the first coil winding part 132a and the second coil winding part 132b and passed through the whole of formed regions of the through holes 133a and 133b. Therefore, the opened portions of the through holes 133a and 133b to the outer side are closed by the lens drive coils 30s and 30t. Further, the lens holder 12 is disposed in the lens holder accommodating opening 130 of the coil holder 13. Therefore, the opened portion of the through hole 133b to the inner side which is located on the object to be photographed side in the direction of the optical axis "L" is closed by the large diameter cylindrical tube part 12b which is formed in the upper half part of the lens holder 12. Further, the through hole 133a which is located on the imaging element side in the optical axis direction faces the small diameter cylindrical tube part 12a which is formed in the lower half part of the lens holder 12.

The coil holder 13 which is structured as described above is disposed in the inside of the case 18. As a result, four side parts of the lens drive coils 30s and 30t are respectively faced with the lens drive magnets 17 which are fixed to the inner face of the rectangular tube-shaped body part 184 of the case 18.

As described above, in this embodiment, the coil holder 13 is provided with the through holes 133a and 133b (hollow portion) and thus the weight of the movable body 3 is reduced and a thrust force to the movable body 3 is enhanced. Further, the through holes 133a and 133b are formed in the face 132 except the corner part of the outer peripheral side face 131 of the coil holder 13 and thus thick wall portions extended in the direction of the optical axis "L" are formed as support portions 134 at the corner portions of the coil holder 13. Therefore, even when the weight of the movable body 3 is reduced by forming of the through holes 133a and 133b, the movable body 3 is provided with a sufficient strength. Further, if the through holes 133a and 133b are formed in the corner parts of the coil holder 13, when the lens drive coils 30s and 30t are wound around, shapes of the lens drive coils 30s and 30t are disordered at the corner portions and the lens drive coils 30s and 30t cannot be wound around in a quadrangular shape. However, in this embodiment, since the through holes 133a and 133b are formed in the face 132 except the corner parts, even when the lens drive coils 30s and 30t are wound around so as to pass the through holes 133a and 133b, the lens drive coils 30s and 30t are wound around in a quadrangular shape.

Further, since the through holes 133a and 133b are formed at the center portions of sides of a polygonal shape, the support portions 134 having a larger thickness extended in the direction of the optical axis "L" can be formed so as to have equal thickness to each other at a plurality of the corner portions of the polygonal shape. Therefore, a weight balance and a strength balance can be preferably secured in the circumferential direction of the movable body. Moreover, the through holes 133a and 133b are formed at midway portions except the both end parts in the direction of the optical axis "L" of the coil holder 13 and thus the strength of the both ends of the coil holder 13 can be prevented from being reduced. Therefore, when the lens drive coils 30s and 30t are to be wound around the coil holder 13, since a sufficient load can be applied to the coil wire, the lens drive coils 30s and 30t are wound around in a tightly aligned state and thus a sufficient thrust force can be obtained.

(Operation of Lens Drive Mechanism)

In the photographing unit 1 in this embodiment, the movable body 3 is normally located on the imaging element side and, in this state, when an electric current is supplied to the lens drive coils 30s and 30t in a predetermined direction, the lens drive coils 30s and 30t are respectively received with an upward (front side) electro-magnetic force. Therefore, the movable body 3 to which the lens drive coils 30s and 30t are fixed begins to move toward the object to be photographed side (front side). At the same time, elastic forces which restrict movement of the movable body 3 are occurred between the spring member 14t and the front end of the movable body 3 and between the spring member 14s and the rear end of the movable body 3. Therefore, the movable body 3 is stopped when the electro-magnetic force moving the movable body 3 toward the front side and the elastic forces restricting the movement of the movable body 3 are balanced with each other. In this case, when an amount of the electric current supplied to the lens drive coils 30s and 30t is adjusted according to the elastic forces acting on the movable body 3 by the spring members 14s and 14t, the movable body 3 can be stopped at a desired position.

As described above, the spring members 14s and 14t which are utilized in this embodiment are satisfied with a linear relationship between an elastic force (stress) and a displacement amount (distortion amount). Therefore, a linearity between a moving amount of the movable body 3 and a current supplied to the lens drive coils 30s and 30t can be improved. Further, since two spring members 14s and 14t are used, large balanced forces are applied in the direction of the optical axis "L" when the movable body 3 is stopped and thus, even when a centrifugal force or an impact force is acted in the direction of the optical axis "L", the movable body 3 is further stably stopped. In addition, in the photographing unit 1, the movable body 3 is stopped by utilizing a balance between an electro-magnetic force and an elastic force instead of colliding with a collided member (buffer member) and thus occurrence of a collision noise is prevented.

Further, the case 18 is formed in a box-like shape provided with the upper plate part 185 in the upper face of the rectangular tube-shaped body part 184 and thus the leakage flux from the magnetic path structured between the lens drive magnets 17 and the lens drive coils 30s and 30t can be reduced. Therefore, a moving amount of the coil holder 13 and a thrust force based on a current supplied to the lens drive coils 30s and 30t can be improved. Further, in a case that the photographing unit 1 is assembled into a cellular phone, leakage flux to electronic components disposed on its periphery can be reduced.

Further, in the photographing unit 1, the lens 121 is circular but the lens drive coils 30s and 30t are rectangular regardless of the lens shape, and the lens drive magnets 17 are flat plate-shaped permanent magnets which are respectively fixed to a plurality of inner faces corresponding to sides of the rectangular tube-shaped body part 184 of the case 18 in the support body 2 whose inner peripheral faces are formed in a rectangular shape. Therefore, even when there is no sufficient space between the movable body 3 and the support body 2 on the outer peripheral side of the movable body 3, facing areas of the lens drive coils 30s and 30t with the lens drive magnets 17 are larger and thus a sufficient thrust force is obtained. Further, when the movable body 3 is viewed in the direction of the optical axis "L", the outer peripheral side face of the movable body 3 (outer peripheral side face 131 of the coil holder 13) is formed in a quadrangular shape that is similar to the lens drive coils 30s and 30t. Therefore, only when the lens drive coils 30s and 30t are wound around the outer peripheral face of the movable body 3 (outer peripheral side face 131 of the coil holder 13), the lens drive coils 30s and 30t are wound around in a quadrangular shape. In addition, the movable body 3 is divided into the lens holder 12 and the coil holder 13. Therefore, it may be structured that, after the lens drive coils 30s and 30t have been wound around the coil holder 13, the lens holder 12 is accommodated and disposed in the lens holder accommodating opening 130 and thus, when the lens drive coils 30s and 30t are to be wound around, a situation such as a damage of the lens 121 can be prevented.

Further, the movable body 3 of the photographing unit 1 holds the magnetic piece 61 for generating a magnetic attraction force between the lens drive magnets 17 and the magnetic piece 61 at a position on an object to be photographed side in the optical axis direction with respect to the lens drive magnets 17. Therefore, the position in the optical axis direction of the movable body 3 can be controlled with a high degree of accuracy. Accordingly, in the photographing unit 1, a feed back control is not required in which a position in the optical axis direction of the lens 121 is monitored with a sensor or the like to feed back. In accordance with an embodiment, in each of a case that the magnetic piece 61 is provided in the movable body 3 and a case that the magnetic piece 61 is not provided in the movable body 3, a feed back control may be performed in which a position in the optical axis direction of the lens 121 is monitored with a sensor or the like to feed back.

In the embodiment described above, when viewed in the direction of the optical axis "L", the rectangular tube-shaped body part 184 and the lens drive coils 30s and 30t are formed in a quadrangular shape but may be formed in a roughly quadrangular shape. In other words, the rectangular tube-shaped body part 184 and the lens drive coils 30s and 30t may be formed in such a shape that corners of a quadrangle are rounded or that corners of a quadrangle are cut linearly, for example, in an octagonal shape but the corner cut portions are short to be a shape similar to a roughly quadrangle. Further, in the embodiment described above, the rectangular tube-shaped body part 184 and the lens drive coils 30s and 30t are formed in a quadrangular shape. However, the shape of the rectangular tube-shaped body part and the coil is not limited to a quadrangle and may be a polygon such as a hexagon or an octagon. Further, the lens drive magnet 17 may be fixed to all faces of the rectangular tube-shaped body part of the yoke or may be fixed to faces located every other one in the circumferential direction. In addition, in the embodiment described above, the outer peripheral shape of the coil holder 13 is also a polygonal shape. However, it may be structured so that the coil holder 13 is formed in a cylindrical shape and the lens drive coils 30s and 30t wound around in a polygonal shape are fixed to an outer peripheral side face of the coil holder 13 by utilizing protruded parts or the like which are formed on its outer peripheral side face.

In the embodiment described above, the movable body 3 is divided into the lens holder 12 and the coil holder 13, and the body part of the coil holder 13 is formed with the through holes 133a and 133b which structure the hollow portion comprised of a recessed part or a hole that is structured by removing a part of the side wall part of the movable body 3. However, the body part of the lens holder 12 may be formed with a recessed part or a hole by removing a part of the body part and the recessed part or the hole may be utilized as the hollow portion.

In the embodiment described above, the movable body 3 is divided into the lens holder 12 and the coil holder 13 but the movable body may be structured as one piece of component. Also in this case, when the outer peripheral side face or the inner peripheral side face of the movable body 3 is formed with a recessed part or a hole as the hollow portion by removing a part of the outer peripheral side face or the inner peripheral side face, the weight of the movable body 3 is reduced. In this case, it is also preferable that the hollow portion is formed at a position except the corner part like the structure adopted in the embodiment described above where the through holes 133a and 133b are formed in the coil holder 13.

(Structure of Shake Correction Mechanism)

Figure 1B:
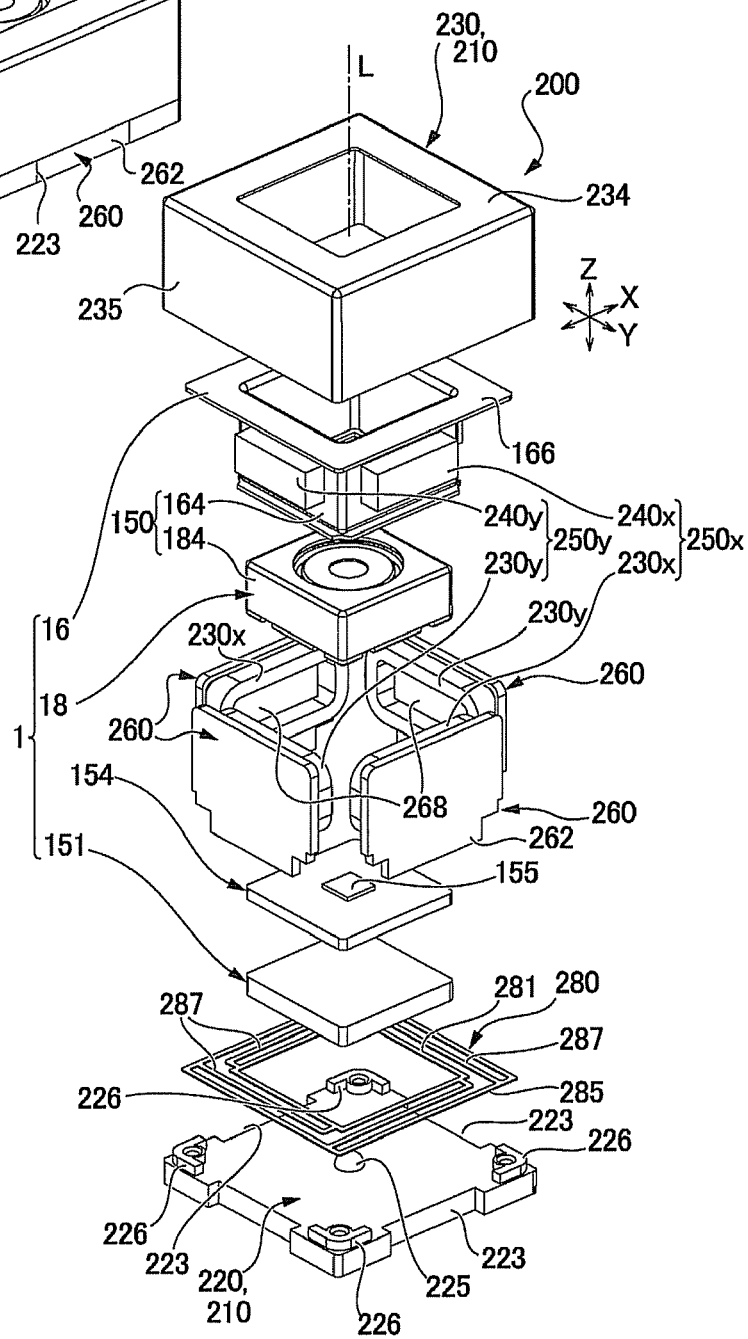
FIG. 1(b) is its exploded perspective view.
Figure 2:
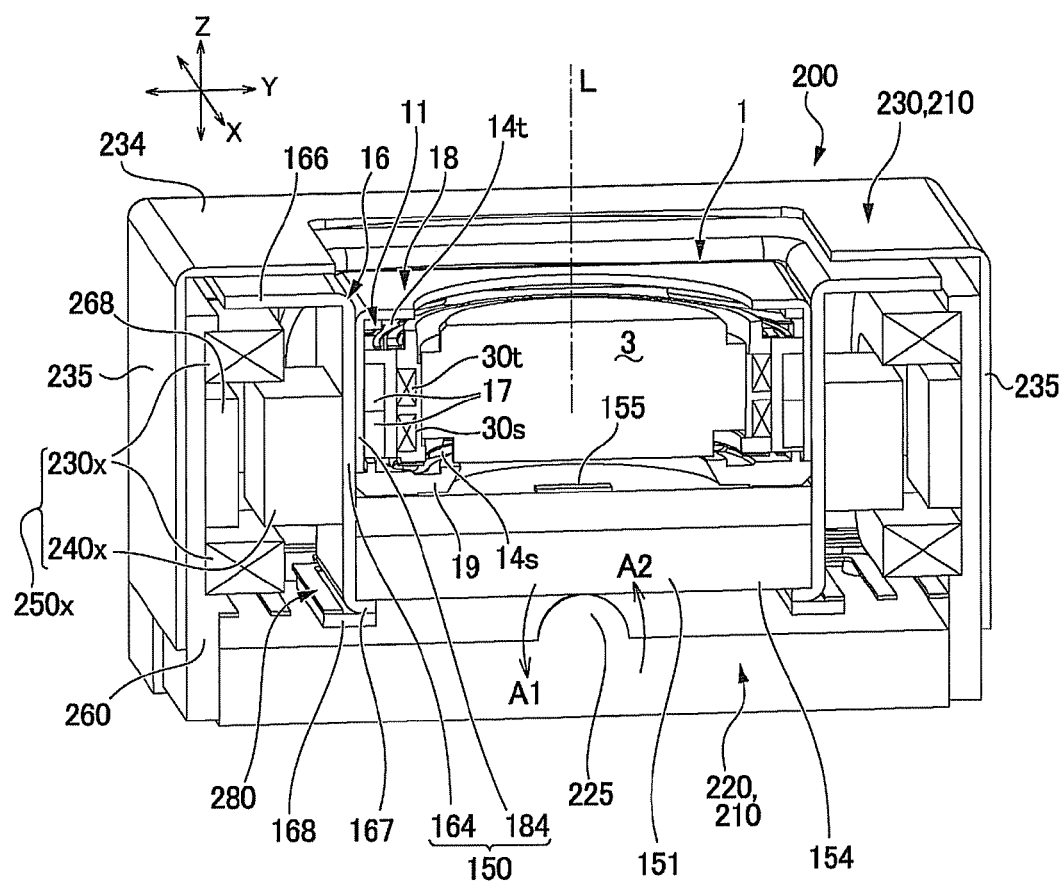
FIG. 2 is a longitudinal sectional view showing the optical unit with shake correcting function in accordance with the first embodiment of the present invention which is cut in parallel to the optical axis.

In FIGS. 1(a) and 1(b) and FIG. 2, in the optical unit 200 with shake correcting function in this embodiment, a pivot part 225 as a rocking support part which is protruded in a hemispheric shape is formed at a center of an upper face of the base 220 in order to structure a shake correction mechanism. An upper end part of the pivot part 225 is abutted with a center of the plate 151 of the photographing unit 1 and is located on the optical axis "L". Therefore, the photographing unit 1 is capable of rocking by the pivot part 225 in all directions, i,e, the X-axis direction, the Y-axis direction and a direction between the X-axis direction and the Y-axis direction. Further, although the pivot part 225 may be formed in a shaft-like shape but, when the pivot part 225 is formed in a hemispheric protruded part, the dimension in the direction of the optical axis "L" of the optical unit 200 can be shortened. Further, a portion of the plate 151 with which the pivot part 225 is abutted may be formed in a recessed part which is recessed in a conical shape. In addition, the pivot part may be formed in the photographing unit 1.

Further, in this embodiment, a gimbal spring 280 whose planar shape is rectangular is disposed between the base 220 and the plate 151 of the photographing unit 1. The gimbal spring 280 is a spring member as an urging means for urging the photographing unit 1 toward the pivot part 225. The gimbal spring 280 is made of metal such as phosphor bronze, beryllium copper or nonmagnetic SUS steel material and is formed by means of that a thin plate having a predetermined thickness is performed by press working or etching processing with the use of photo lithography technique.

The gimbal spring 280 is provided with an inner peripheral side connecting part 281 which is formed in a rectangular frame shape and is connected with an under face of the plate 151 of the photographing unit 1, an outer peripheral side connecting part 285 which is formed in a rectangular frame shape and is connected with support parts 226 protruded upward at respective corner portions of the base 220 of the fixed body 210, and four arm parts 287 which are extended from the inner peripheral side connecting part 281 in the same circumferential direction as each other to be connected with the outer peripheral side connecting part 285. The inner peripheral side connecting part 281 and the outer peripheral side connecting part 285 are structured so that their sides are parallel to each other. In this embodiment, each of the four arm parts 287 is connected with a side part of the inner peripheral side connecting part 281 in the vicinity of its one end side part and extended in parallel to the side part of the inner peripheral side connecting part 281 from the connected portion toward the other end side part of the inner peripheral side connecting part 281 to be connected with the outer peripheral side connecting part 285. Further, in the gimbal spring 280 in this embodiment, the planar shape of the inner peripheral side connecting part 281 and the outer peripheral side connecting part 285 is a square and thus the four arm parts 287 are disposed at an equal angular distance around the optical axis with the same shape and size as each other. Therefore, the four arm parts 287 are disposed in a rotationally symmetric manner each other at 90 degrees, 180 degrees and 270 degrees.

In the gimbal spring 280, since an upper end part of the pivot part 225 is abutted with the plate 151 of the photographing unit 1, the inner peripheral side connecting part 281 is located on an object to be photographed side by a protruded dimension of the pivot part 225 with respect to the outer peripheral side connecting part 285. Therefore, the arm parts 287 are deformed so that their inner peripheral side end parts are located on the object to be photographed side with respect to their outer peripheral side end parts. Accordingly, the photographing unit 1 is urged toward the pivot part 225 by shape returning forces of the arm parts 287.

In addition, in this embodiment, a photographing unit (movable module) drive mechanism for shake correction which generates a magnetic force for rocking the photographing unit 1 with the pivot part 225 as a supporting point is structured between the photographing unit 1 and the fixed body 210. The photographing unit (movable module) drive mechanism for shake correction is comprised of a first photographing unit (movable module) drive mechanism 250x for rocking the photographing unit 1 around the X-axis with the pivot part 225 as a supporting point and a second photographing unit (movable module) drive mechanism 250y for rocking the photographing unit 1 around the Y-axis with the pivot part 225 as a supporting point. The structures of the first photographing unit drive mechanism 250x and the second photographing unit drive mechanism 250y will be described below.

In the photographing unit 1, a rectangular tube-shaped body part 164 of the yoke 16 is fixed to the outer peripheral face of the support body 2 (case 18). In the yoke 16, a flange part 166 extending to the outer peripheral side is formed at an object side end part of the body part 164. Further, an end part of the yoke 16 which is located on the imaging element 155 side of the body part 164 is slightly bent to an inner side to form a bent portion 167, and an under face of the bent portion 167 is fixed with a magnetic plate 168 formed in a rectangular frame shaped which structures a part of the yoke 16.

In this manner, the rectangular tube-shaped body part 184 of the case 18 and the body part 164 of the yoke 16 form a cover part 150 which surrounds the movable body 3 on an outer peripheral side and the lens drive magnet 17 is held by each of four inner peripheral side faces of the cover part 150 (inner peripheral side faces of the rectangular tube-shaped body part 184 of the case 18). Further, each of two outer peripheral side faces which face each other in the Y-axis direction of the cover part 150 (body part 164 of the yoke 16) is held with a photographing unit (movable module) drive magnet 240x formed in a rectangular plate shape which structures the first photographing unit drive mechanism 250x, and each of two outer peripheral side faces which face each other in the X-axis direction of the cover part 150 is held with a photographing unit (movable module) drive magnet 240y formed in a rectangular plate shape which structures the second photographing unit drive mechanism 250y.

Magnets having the same structure as each other may be used for the photographing unit drive magnet 240x and the photographing unit drive magnet 240y and, in this embodiment, a permanent magnet having a rectangular flat plate shape is used. Further, each of the photographing unit drive magnet 240x and the photographing unit drive magnet 240y is magnetized so that magnetic poles of its inner face and its outer face are different from each other. For example, in each of the photographing unit drive magnet 240x and the photographing unit drive magnet 240y, its outer face is magnetized in an "N"-pole and its inner face is magnetized in an "S"-pole.

In accordance with an embodiment, a magnetizing direction of the photographing unit drive magnet 240x and the photographing unit drive magnet 240y is not limited to the above-mentioned pattern. For example, in this embodiment, it may be structured so that the inner faces of the magnets which face each other are magnetized in an "N"-pole (outer faces are in an "S"-pole) and the inner faces of the other magnets which face each other are magnetized in an "S"-pole (outer faces are in an "N"-pole).

Four pieces of a plate-shaped coil holding member 260 are disposed on an outer peripheral side of the photographing unit 1 so as to face the photographing unit drive magnets 240x and the photographing unit drive magnets 240y. In this embodiment, four pieces of the coil holding member 260 are fixed to four inner peripheral side faces of the rectangular tube-shaped body part 235 of the fixed cover 230 in a state that protruded parts 262 on the lower end side are fitted to cut-out parts 223 formed in side parts of the base 220. Nonmagnetic material is used for the coil holding member 260.

Each inner face of two pieces of the coil holding member 260 which face each other in the Y-axis direction is held with a photographing unit (movable module) drive coil 230x which is wound around in a rectangular tube shape and the photographing unit drive coils 230x are faced with the photographing unit drive magnets 240x in an inner and outer direction. Further, an outer side end part of the photographing unit drive magnet 240x is inserted into the inner side of the photographing unit drive coil 230x and the photographing unit drive magnet 240x forms a magnetic field interlinking with respective sides of the photographing unit drive coil 230x from the inner side to the outer side of the photographing unit drive coil 230x.

In this manner, in this embodiment, the first photographing unit (movable module) drive mechanism 250x is structured of the photographing unit drive coil 230x and the photographing unit drive magnet 240x, and a pair of the first photographing unit (movable module) drive mechanisms 250x is disposed at two positions interposing the pivot part 225 therebetween in the Y-axis direction for rocking the photographing unit 1 around the X-axis. In the first photographing unit drive mechanism 250x, two photographing unit drive coils 230x are electrically connected so as to generate magnetic driving forces to the photographing unit 1 in the same direction as each other around the X-axis when energized. Therefore, two first photographing unit drive mechanisms 250x are arranged to be a push-pull configuration in which, when an electric current is supplied to two photographing unit drive coils 230x, moments in the same direction as each other around the X-axis passing through the pivot part 225 are applied to the photographing unit 1. For example, when one of two first photographing unit drive mechanisms 250x applies a moment shown by the arrow "A1" in FIG. 2 to the photographing unit 1, the other applies a moment shown by the arrow "A2" in FIG. 2 to the photographing unit 1. In accordance with an embodiment, in the two first photographing unit drive mechanisms 250x, magnetizing directions of the two photographing unit drive magnets 240x may be set different from each other depending on the connecting method of the two photographing unit drive coils 230x to structure the two first photographing unit drive mechanisms 250x to be a push-pull configuration.

Further, each inner face of two pieces of the coil holding member 260 which face each other in the X-axis direction is held with a photographing unit drive coil 230y which is wound around in a rectangular tube shape and the photographing unit drive coils 230y are faced with the photographing unit drive magnets 240y in an inner and outer direction. Further, an outer side end part of the photographing unit drive magnet 240y is inserted into the inner side of the photographing unit drive coil 230y and the photographing unit drive magnet 240y forms a magnetic field interlinking with respective sides of the photographing unit drive coil 230y from the inner side to the outer side of the photographing unit drive coil 230y.

In this manner, in this embodiment, the second photographing unit (movable module) drive mechanism 250y is structured of the photographing unit drive coil 230y and the photographing unit drive magnet 240y, and a pair of the second photographing unit (movable module) drive mechanisms 250y is disposed at two positions interposing the pivot part 225 therebetween in the X-axis direction for rocking the photographing unit 1 around the Y-axis. In the second photographing unit drive mechanism 250y, two photographing unit drive coils 230y are electrically connected so as to generate magnetic driving forces to the photographing unit 1 in the same direction as each other around the Y-axis when energized. Therefore, two second photographing unit drive mechanisms 250y are arranged to be a push-pull configuration in which, when an electric current is supplied to two photographing unit drive coils 230y, moments in the same direction as each other around the Y-axis passing through the pivot part 225 are applied to the photographing unit 1. In accordance with an embodiment, in the two second photographing unit drive mechanisms 250y, magnetizing directions of the two photographing unit drive magnets 240y may be set different from each other depending on the connecting method of the two photographing unit drive coils 230y to structure the two second photographing unit drive mechanisms 250y to be a push-pull configuration.

In addition, in this embodiment, the inner faces of the coil holding members 260 are fixed with a flat plate-shaped buffering member 268 comprised of an elastic material such as rubber on inner sides of the photographing unit drive coils 230x and 230y. The buffering members 268 face the photographing unit drive magnets 240x and 240y through a predetermined gap space in the inner and outer direction. The buffering member 268 functions to absorb an impact. In other words, when an impact is applied to the optical unit 200 with shake correcting function to cause the photographing unit 1 to displace in a direction intersecting with the Z-axis direction, the photographing unit drive magnets 240x and 240y hit the buffering members 268 and the impact is absorbed by the buffering member 268.

(Shake Correcting Operation)

In a cell phone with camera on which the optical unit 200 with shake correcting function structured as described above is mounted, a shake detection sensor (not shown) such as a gyro-sensor is mounted for detecting a hand shake at the time of photographing and, on the basis of the detection result by the shake detection sensor, a control section which is mounted on the cell phone with camera supplies an electric current to one or both of the photographing unit drive coils 230x and the photographing unit drive coils 230y to rock the photographing unit 1 around one or both of the X-axis and the Y-axis. When the rocking motions are combined, the photographing unit 1 is rocked over the whole "XY" plane. Accordingly, all the hand shakes which may be occurred in a cellular phone with camera or the like can be corrected surely.

(Principal Effects in this Embodiment)

As described above, in the optical unit 200 with shake correcting function in this embodiment, the photographing unit 1 is supported to be capable of rocking with respect to the fixed body 210 through the pivot part 225 and the photographing unit drive mechanism (first photographing unit drive mechanism 250x and second photographing unit drive mechanism 250y) for rocking the photographing unit 1 is provided between the photographing unit 1 and the fixed body. Therefore, at the time of photographing by using a cellular phone with camera on which the optical unit 200 is mounted, even when a hand shake or the like is occurred, the hand shake or the like can be corrected by rocking of the photographing unit 1. Therefore, since the shake correction mechanism is not required to be built into the photographing unit 1, even when the shake correction mechanism cannot be provided in the photographing unit 1 due to a small size of the photographing unit 1, a shake is corrected.

Further, in this embodiment, the paired first photographing unit drive mechanisms 250x are disposed at two positions interposing the pivot part 225 therebetween in the Y-axis direction and the paired second photographing unit drive mechanisms 250y are disposed at two positions interposing the pivot part 225 therebetween in the X-axis direction. Further, two first photographing unit drive mechanisms 250x respectively generate magnetic forces for rocking the photographing unit 1 in the same direction and two second photographing unit drive mechanisms 250y respectively generate magnetic forces for rocking the photographing unit 1 in the same direction. Therefore, different from a case that the first photographing unit drive mechanism 250x is disposed only one side with respect to the pivot part 225 or, different from a case that the second photographing unit drive mechanism 250y is disposed only one side with respect to the pivot part 225, since the driving power is stable, a hand shake can be corrected with a high degree of accuracy.

In other words, when a distance from the pivot part 225 of one of the first photographing unit drive mechanisms 250x is displaced in a direction so that the magnetic driving force becomes smaller, a distance from the pivot part 225 of the other of the first photographing unit drive mechanisms 250x is displaced in a direction so that the magnetic driving force becomes larger and thus the driving power of the first photographing unit drive mechanisms 250x is stable. Similarly, when a distance from the pivot part 225 of one of the second photographing unit drive mechanisms 250y is displaced in a direction so that the magnetic driving force becomes smaller, a distance from the pivot part 225 of the other of the second photographing unit drive mechanisms 250y is displaced in a direction so that the magnetic driving force becomes larger and thus the driving power of the second photographing unit drive mechanisms 250y is stable.

Further, when a positional relationship between the photographing unit drive magnet 240x and the photographing unit drive coil 230x which structure the first photographing unit drive mechanism 250x is displaced in a direction so that the magnetic driving force becomes smaller in one of the first photographing unit drive mechanisms 250x, in the other of the first photographing unit drive mechanisms 250x, the photographing unit drive magnet 240x and the photographing unit drive coil 230x are displaced in a direction so as to correct the positional displacement between the photographing unit drive magnet 240x and the photographing unit drive coil 230x in one of the first photographing unit drive mechanisms 250x, in other words, so that the magnetic driving force becomes larger and thus the driving power of the first photographing unit drive mechanisms 250x is stable. Similarly, when a positional relationship between the photographing unit drive magnet 240y and the photographing unit drive coil 230y which structure the second photographing unit drive mechanism 250y is displaced in a direction so that the magnetic driving force becomes smaller in one of the second photographing unit drive mechanisms 250y, in the other of the second photographing unit drive mechanisms 250y, the photographing unit drive magnet 240y and the photographing unit drive coil 230y are displaced in a direction so as to correct the positional displacement between the photographing unit drive magnet 240y and the photographing unit drive coil 230y in one of the second photographing unit drive mechanisms 250y, in other words, so that the magnetic driving force becomes larger and thus the driving power of the second photographing unit drive mechanisms 250y is stable.

In this embodiment, the gimbal spring 280 which is a spring member for pressing the photographing unit 1 toward the pivot part 225 is provided with a plurality of arm parts 287 which are extended from the inner peripheral side connecting part 281 in the same circumferential direction as each other to be connected with the outer peripheral side connecting part 285 and thus provided with a point symmetrical structure. Therefore, the gimbal spring 280 applies a substantially uniform urging force in all directions and thus an attitude of the photographing unit 1 is stable and a control for the first photographing unit drive mechanism 250x and the second photographing unit drive mechanism 250y is extremely easy. Further, the arm parts 287 are extended in the same circumferential direction as each other and thus the arm parts 287 can be extended longer. As a result, the gimbal spring 280 applies an urging force having a high degree of linearity over the entire moving range of the photographing unit 1 and, also from this point, a hand shake can be corrected surely without a complicated control to the first photographing unit drive mechanism 250x and the second photographing unit drive mechanism 250y.

In this embodiment, in both of the first photographing unit (movable module) drive mechanism 250x and the second photographing unit (movable module) drive mechanism 250y, a magnet (photographing unit drive magnets 240x and 240y) is held by the photographing unit 1 which is a movable body, and a coil (photographing unit drive coils 230x and 230y) is held by the fixed body 210. Therefore, the number of wiring lines to the photographing unit 1 that is a movable body is small and thus a structure for the wiring lines can be simplified. Further, when the photographing unit drive coils 230x and 230y are mounted on the fixed body 210, the winding number of the photographing unit drive coils 230x and 230y can be increased and thus a large drive force can be obtained. In addition, since the photographing unit drive magnets 240x and 240y whose mass is smaller than that of the photographing unit drive coils 230x and 230y are provided on the photographing unit 1 which is the movable body, the weight of the photographing unit 1 can be reduced. Accordingly, since the photographing unit 1 can be rocked with a small force, power consumption required for shake correction can be reduced. Further, according to this embodiment, responsiveness to a hand shake is superior.

In this embodiment, the cover part 150 surrounding the support body 2 and the movable body 3 of the photographing unit 1 is provided on their outer peripheral side, and the lens drive magnets 17 are held on the inner peripheral face of the cover part 150 and the photographing unit drive magnets 240x and 240y are held on the outer peripheral face of the cover part 150. Therefore, magnetic interference between the lens drive mechanism 5 and the photographing unit drive mechanism (first photographing unit drive mechanism 250x and second photographing unit drive mechanism 250y) can be prevented.

Second Embodiment

Figure 5A:
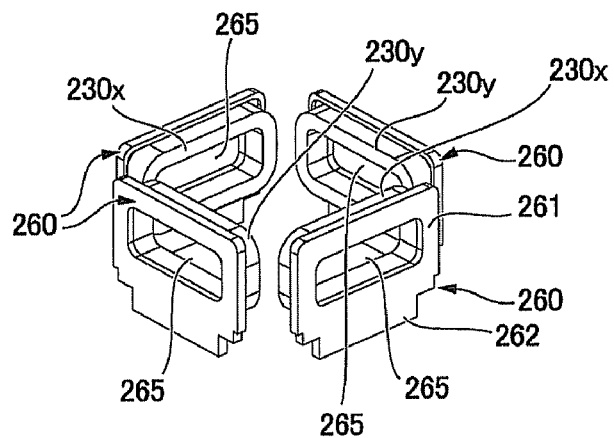
FIG. 5(a) is an explanatory view showing a structure of a coil holding member used in an optical unit with shake correcting function in accordance with a second embodiment of the present invention.
Figure 5B:
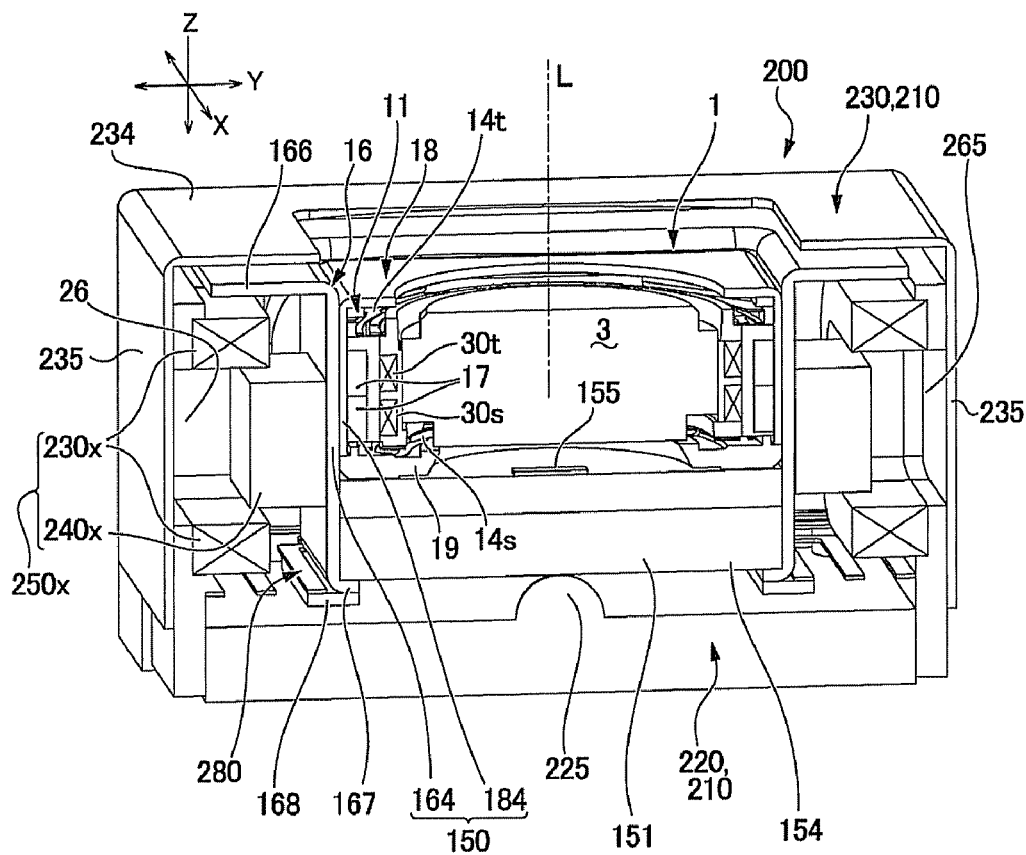
FIG. 5(b) is a longitudinal sectional view showing the optical unit with shake correcting function which is cut in parallel to the optical axis.

FIG. 5(a) is an explanatory view showing a structure of coil holding members used in an optical unit with shake correcting function in accordance with a second embodiment of the present invention, and FIG. 5(b) is a longitudinal sectional view showing the optical unit with shake correcting function which is cut in parallel to the optical axis. An optical unit with shake correcting function in accordance with the second embodiment is provided with common portions to the optical unit with shake correcting function in accordance with the first embodiment and thus the same reference signs are used in the common portions and their descriptions are omitted.

In the first embodiment 1, a plate shaped member which is not formed with an opening part is used as the coil holding member 260. However, in the second embodiment, as shown in FIGS. 5(a) and 5(b), the coil holding member 260 is formed of magnetic material and an opening part 265 comprised of a through hole is formed in a portion of the coil holding member 260 which is located on an inner side of the photographing unit drive coils 230x and 230y. The opening parts 265 face the photographing unit drive magnets 240x and 240y on an outer side. When this structure is adopted, the coil holding members 260 function as back yokes of the coils 230x and 230y (fixed body side yoke). Therefore, a degree is enhanced in which a magnetic field generated by the photographing unit drive magnets 240x and 240y is interlinked with the photographing unit drive coils 230x and 230y and thus the drive efficiencies of the first photographing unit drive mechanism 250x and the second photographing unit drive mechanism 250y can be enhanced.

In the example shown in FIGS. 5(a) and 5(b), the buffering member 268 shown in FIGS. 1(a) and 1(b) and FIG. 2 is not provided but, also in the example shown in FIGS. 5(a) and 5(b), the buffering member 268 shown in FIGS. 1(a) and 1(b) and FIG. 2 may be provided.

Third Embodiment

Figures 6A, 6B:
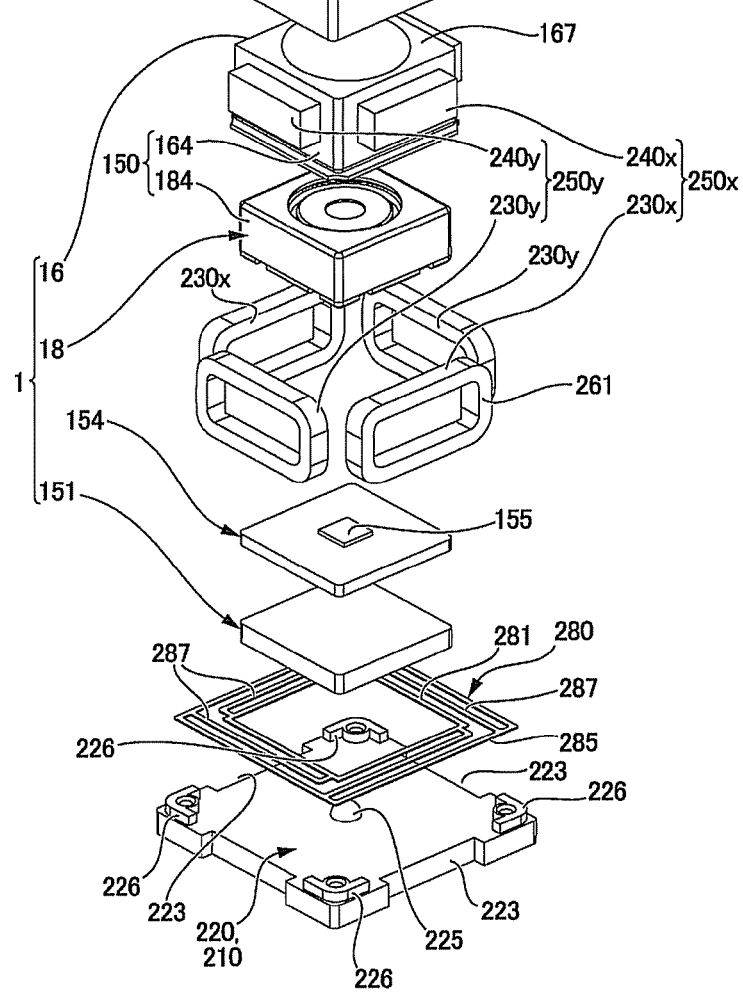
FIG. 6(a) is an outward appearance view showing an optical unit with shake correcting function in accordance with another embodiment of the present invention which is viewed from obliquely above on an object to be photographed side.
FIG. 6(b) is its exploded perspective view.

FIG. 6(a) is an outward appearance view showing an optical unit with shake correcting function in accordance with a third embodiment of the present invention which is viewed from obliquely above on an object to be photographed side, and FIG. 6(b) is its exploded perspective view. An optical unit with shake correcting function in accordance with the third embodiment is provided with common portions to the optical unit with shake correcting function in accordance with the first embodiment and thus the same reference signs are used in the common portions and their descriptions are omitted.

In the first embodiment, as shown in FIGS. 1(a) and 1(b), the fixed cover 230 is provided with the top plate part 234 but, as shown in FIGS. 6(a) and 6(b), a fixed cover 230 which is not provided with the top plate part 234 may be used.

Further, in the first embodiment, as shown in FIGS. 1(a) and 1(b), the yoke 16 is provided with the flange part 166 which is stretched to the outer peripheral side but, as shown in FIGS. 6(a) and 6(b), a yoke 16 which is not provided with the flange part 166 may be used, and alternatively, a yoke 16 provided with the upper plate part 185 may be used.

Further, in the first embodiment, as shown in FIGS. 1(a) and 1(b), the photographing unit drive coils 230x and 230y are supported by the coil holding members 260 but, as shown in FIGS. 6(a) and 6(b), the photographing unit drive coils 230x and 230y may be fixed to the inner face of the side plate part 235 of the fixed cover 230 without using of the coil holding members 260.

First Magnetic Flux Leakage Countermeasure

In the first and the second embodiments or the like, material of the fixed cover 230 and the base 220 is not specified but, when the entire fixed cover 230 and the entire base 220 are formed of magnetic material, since the first photographing unit drive mechanism 250x and the second photographing unit drive mechanism 250y are covered with a magnetic body, magnetic flux leakage to the outside is prevented. Further, the outside magnetic flux is prevented from entering into the first photographing unit drive mechanism 250x and the second photographing unit drive mechanism 250y and thus an effect given to an attitude of the photographing unit 1 is reduced.

When the fixed cover 230 is formed of magnetic material, a magnetic attraction force is generated between the photographing unit drive magnets 240x and 240y attached to the photographing unit 1 and the fixed cover 230, and the magnetic attraction force may affect the displacement of the photographing unit 1 by the shake correction mechanism.

As a structure for reducing the magnetic attraction force, as shown in FIGS. 6(a) and 6(b), a fixed cover 230 which is not provided with the top plate part 234 may be used instead of the fixed cover 230 which is described with reference to FIGS. 1(a) and 1(b). According to this structure, a magnetic attraction force generated between the photographing unit drive magnets 240x and 240y and the top plate part 234 of the fixed cover 230 is eliminated. Accordingly, an unnecessary urging force directing in the Z-axis direction is not occurred in the photographing unit 1. Further, when the fixed cover 230 which is not provided with the top plate part 234 is used, at the time of assembling of the photographic optical device 200, a gap space between the fixed cover 230 and the photographing unit 1 is monitored from an object to be photographed side by using an image sensor or the like and a working operation can be performed while confirming their positional relationship and, as a result, assembling with a high degree of positional accuracy is attained.

Further, in a case that the top plate part 234 is provided like the fixed cover 230 described with reference to FIGS. 1(a) and 1(b), the magnetic poles adjacent to each other in the circumferential direction may be different from each other in the photographing unit drive magnet 240x and the photographing unit drive magnet 240y which are adjacent to each other in the circumferential direction. According to this structure, a magnetic attraction force generated between the photographing unit drive magnets 240x and 240y and the top plate part 234 of the fixed cover 230 is reduced. Accordingly, an unnecessary urging force directing in the Z-axis direction can be reduced in the photographing unit 1.

Second Magnetic Flux Leakage Countermeasure

Figure 7:
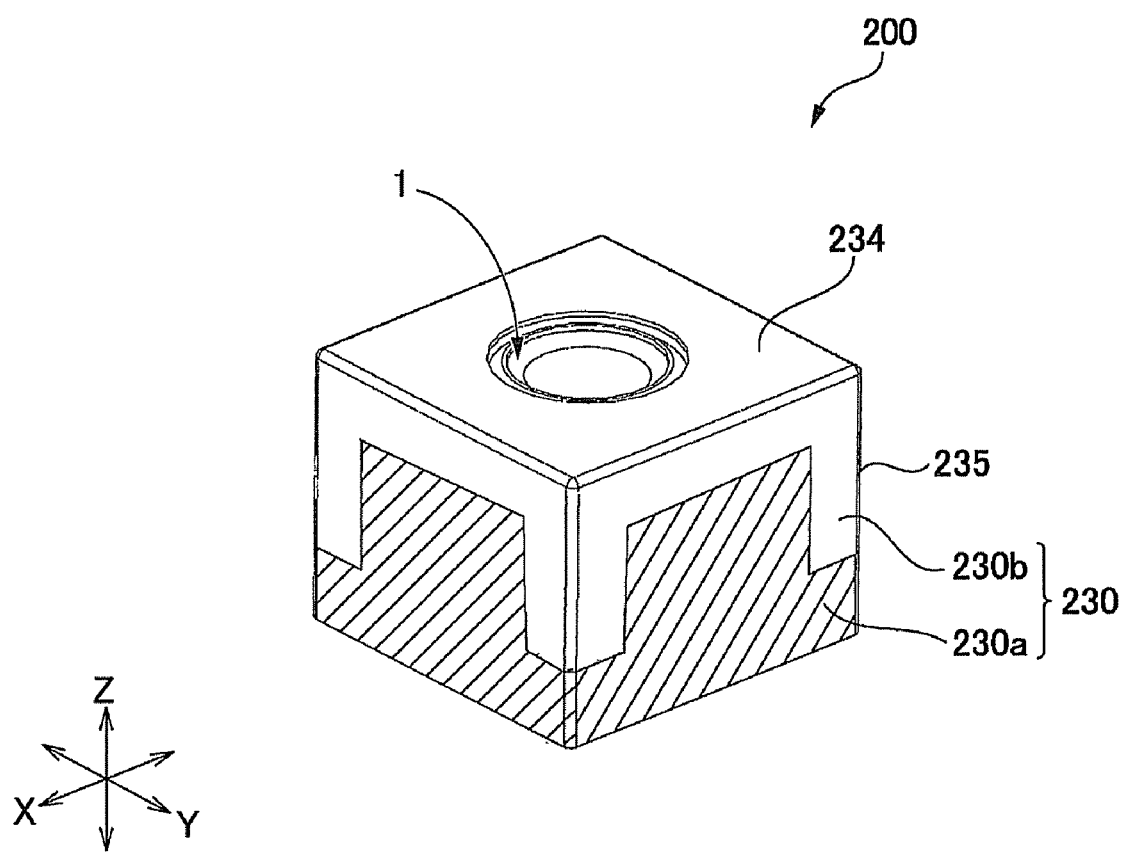
FIG. 7 is an explanatory view showing a countermeasure against magnetic flux leakage in an optical unit with shake correcting function to which at least an embodiment of the present invention is applied.

FIG. 7 is an explanatory view showing a countermeasure against magnetic flux leakage in an optical unit with shake correcting function to which at least an embodiment of the present invention is applied.

In the first magnetic flux leakage countermeasure, the entire fixed cover 230 is structured of magnetic material but, as shown in FIG. 7, a part of the fixed cover 230 may be formed of magnetic material and the other portion is formed of nonmagnetic material. In other words, in the fixed cover 230 shown in FIG. 7, when viewed in a direction perpendicular to the optical axis "L", an outer portion 230a of at least the entire range where the photographing unit drive magnets 240x and 240y are moved (slanted line portion in the drawing) is formed of magnetic material and the other portion 230b is formed of nonmagnetic material. Therefore, the fixed cover 230 is provided with a first cover portion formed of nonmagnetic material (portion 230b) and a second cover portion formed of magnetic material (portion 230a), and the portion of the fixed cover 230 which is located within the magnetic flux region of the movable module drive magnets 240x and 240y is formed of a magnetic body.

Even in the structure as described above, the portion 230a of the fixed cover 230 formed of magnetic material covers the outer side of the photographing unit drive magnets 240x and 240y and the photographing unit drive coils 230x and 230y and thus magnetic flux leakage to the outer side can be prevented. Further, the outside magnetic flux is prevented from affecting the first photographing unit drive mechanism 250x and the second photographing unit drive mechanism 250y. Further, since the portion 230a of the fixed cover 230 formed of magnetic body acts as a flux concentrating yoke, interlinkage flux interlinking with the photographing unit drive coils 230x and 230y is increased. Therefore, when an attitude of the photographing unit 1 is to be corrected by the first photographing unit drive mechanism 250x and the second photographing unit drive mechanism 250y, a large thrust force can be obtained and thus responsiveness of correction to a shake can be improved.

In accordance with an embodiment, a portion formed of magnetic material and a portion formed of nonmagnetic material may be structured as separate components and then they are combined to structure the fixed cover 230 and alternatively, they may be structured as a one-piece molded product.

Further, the entire main body portion of the fixed cover 230 may be formed of nonmagnetic material and a magnetic plate is adhered to the main body portion to structure the portion 230a formed of magnetic material. Well-known material such as iron may be used as the magnetic plate. According to this structure, after the photographic optical device 200 have been assembled, an attitude of the photographing unit 1 can be adjusted by utilizing a magnetic attraction force generated between the magnetic plate and the photographing unit drive magnets 240x and 240y.

Third Magnetic Flux Leakage Countermeasure

Figure 8:
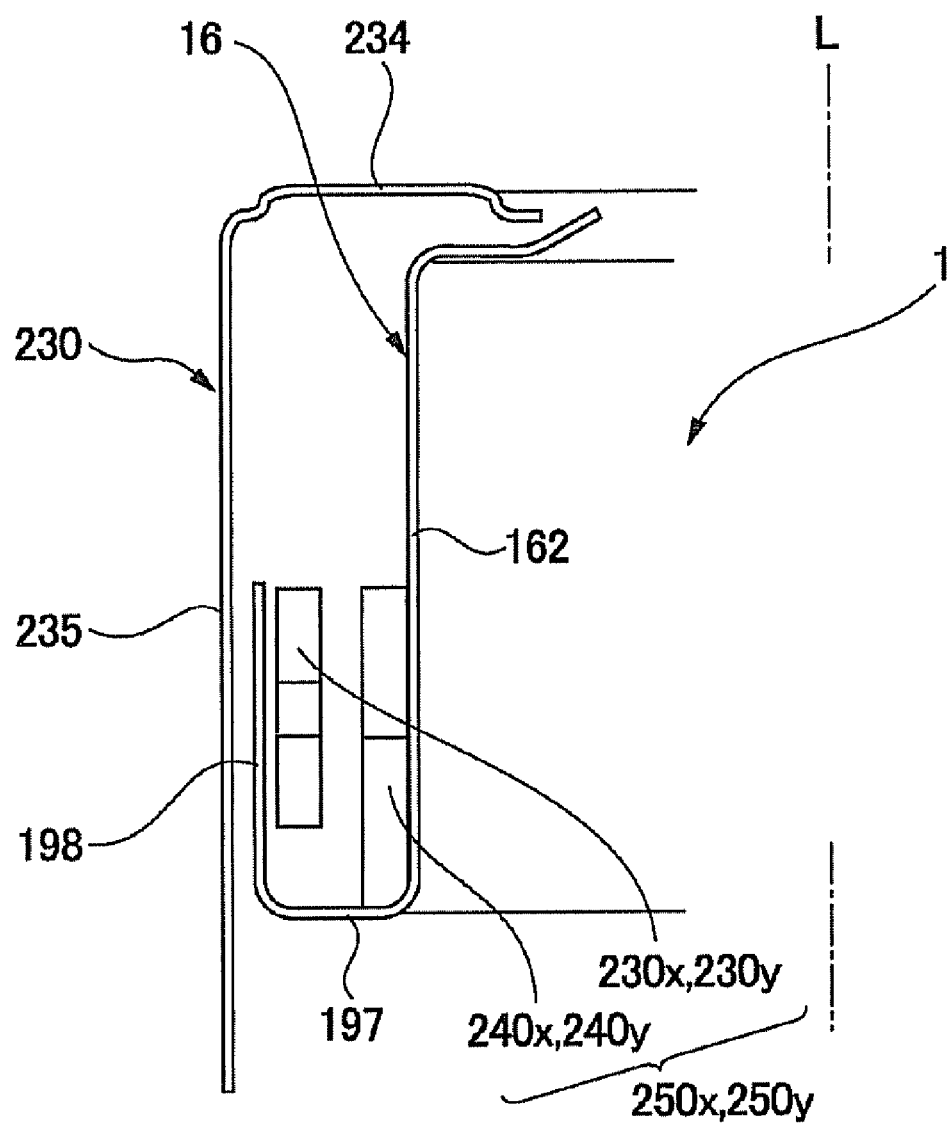
FIG. 8 is an explanatory view showing another countermeasure against magnetic flux leakage in an optical unit with shake correcting function to which at least an embodiment of the present invention is applied.

FIG. 8 is an explanatory view showing another countermeasure against magnetic flux leakage in an optical unit with shake correcting function to which at least an embodiment of the present invention is applied. In the first magnetic flux leakage countermeasure, the fixed cover 230 is utilized but a magnetic flux leakage countermeasure may be performed by utilizing the yoke 16 (movable module side yoke). In this embodiment, as shown in FIG. 8, the shape of the yoke 16 is changed so as to prevent magnetic flux leakage from the first photographing unit drive mechanism 250x and the second photographing unit drive mechanism 250y to the outside and prevent effects of magnetic flux entered from the outside.

In other words, in this embodiment, as shown in FIG. 8, the yoke 16 is provided with a rectangular top plate part 161 on an object to be photographed side, four side plate parts 162 extended to a rear side from an outer circumferential edge of the top plate part 161, a relay plate portion 197 which is bent to an outer peripheral side at a lower end edge of the side plate part 162, and a coil side flux concentrating yoke portion 198 which is bent to a front side from an outer circumferential edge of the relay plate portion 197.

The photographing unit drive magnets 240x and 240y are fixed to the outer faces of the side plate parts 162. Further, the photographing unit drive coils 230x and 230y are disposed between the coil side flux concentrating yoke portion 198 and the photographing unit drive magnets 240x and 240y in the direction perpendicular to the optical axis "L", and gap spaces are provided between the photographing unit drive coils 230x and 230y and the coil side flux concentrating yoke portion 198, and between the photographing unit drive coils 230x and 230y and the photographing unit drive magnets 240x and 240y.

Also in this case structured as described above, the photographing unit drive magnets 240x and 240y and the photographing unit drive coils 230x and 230y are surrounded by the yoke 16. Therefore, magnetic flux leakage from the first photographing unit drive mechanism 250x and the second photographing unit drive mechanism 250y to the outer side is prevented and effects of magnetic flux entering from the outer side can be prevented. Further, interlinkage flux interlinking with the photographing unit drive coils 230x and 230y is increased. Therefore, when an attitude of the photographing unit 1 is to be corrected by the first photographing unit drive mechanism 250x and the second photographing unit drive mechanism 250y, a large thrust force can be obtained and thus responsiveness is improved.

In accordance with an embodiment, when the rocking center of the photographing unit 1 is located on the lower side in the Z-axis direction with respect to the photographing unit 1, the longitudinal sectional shape of the respective photographing unit drive coils 230x and 230y is set to be a trapezoid shape whose lower side is longer. Further, when the rocking center of the movable unit is located in a range overlapping with the movable unit in the Z-axis direction, the longitudinal sectional shape of the respective photographing unit drive coils 230x and 230y is set to be a rectangular shape.

The structure described above may be applied to both cases that the side plate part 235 of the fixed cover 230 is formed of a magnetic body and formed of a nonmagnetic body. In order to hold the photographing unit drive coils 230x and 230y in the state shown in FIG. 8, a coil holding part may be extended from the fixed cover 230.

In the embodiment described above, in both of the first photographing unit drive mechanism 250x and the second photographing unit drive mechanism 250y, it is structured that a magnet (photographing unit drive magnets 240x and 240y) is held on the photographing unit 1 side which is the movable body side, and that a coil (photographing unit drive coils 230x and 230y) is held on the fixed body 210 side. However, it may be structured that the photographing unit drive coil is held on the photographing unit 1 side which is the movable body side and that the photographing unit drive magnet is held on the fixed body 210 side.

In the embodiment described above, the photographing unit 1 is rocked around the X-axis by the first photographing unit drive mechanism 250x and the photographing unit 1 is rocked around the Y-axis by the second photographing unit drive mechanism 250y. However, it may be structured that the photographing unit 1 is rocked around the Y-axis by the first photographing unit drive mechanism 250x and that the photographing unit 1 is rocked around the X-axis by the second photographing unit drive mechanism 250y.

Further, in the embodiment described above, both of the first photographing unit drive mechanism 250x and the second photographing unit drive mechanism 250y are provided for the photographing unit 1. However, in order to correct only a shake in a direction where a hand shake is easily occurred when used by a user, at least an embodiment of the present invention may be applied to a case that only one of the first photographing unit drive mechanism 250x and the second photographing unit drive mechanism 250y is provided. In this case, only one of the paired first photographing unit drive mechanisms 250x and the paired second photographing unit drive mechanisms 250y may be provided on both sides so to interpose the pivot part 225 therebetween.

In the embodiment described above, at least an embodiment of the present invention is applied to the photographic optical device 200 which uses the photographing unit 1 whose lens drive coils 30s and 30t are formed in a rectangular tube shape and whose lens drive magnet 17 is formed in a flat plate shape. However, at least an embodiment of the present invention may be applied to a photographic optical device which uses a photographing unit whose lens drive coils 30s and 30t are formed in a cylindrical shape, whose case 18 is formed in a rectangular tube shape, and in which lens drive magnets 17 are disposed at corner portions of the case 18.

Further, in the embodiment described above, the gimbal spring provided with a plurality of arm parts which are linearly extended in the same circumferential direction as each other is used as the urging means. However, when a plurality of the arm parts 287 is extended in the same circumferential direction, the arm parts 287 may be formed in a curved shape.

In the embodiment described above, the present invention is applied to the optical unit 200 with shake correcting function which is used in a cell phone with camera but at least an embodiment of the present invention may be applied to the optical unit 200 which is used in a thin digital camera or the like. Further, in the embodiment described above, in addition to the lens 121 and the imaging element 155, the lens drive mechanism 5 for magnetically driving the movable body 3 including the lens 121 in the optical axis direction is supported on the support body 2 in the photographing unit 1. However, at least an embodiment of the present invention may be applied to a fixed focus type optical unit in which the lens drive mechanism 5 is not mounted on the photographing unit 1. Further, in the embodiment described above, the photographing unit 1 provided with a lens and an imaging element is described as a movable module. However, at least an embodiment of the present invention may be applied to an optical unit provided with at least a lens as a movable module and, for example, a laser pointer, a portable projection display device and an on-vehicle projection display device are included in the optical unit.

Fourth Embodiment (Entire Structure of Photographic Optical Device)

Next, an embodiment of the present invention will be described below in which the basic structure of the optical unit 200 with shake correcting function described above is structured as a photographic optical device 2000. The photographic optical device 2000 in this embodiment is structured so that the optical unit 200 with shake correcting function is fixed with an attached module 270 in which a shutter mechanism, a filter drive mechanism and a diaphragm mechanism are incorporated, and that an attached module flexible circuit board 275 is drawn out from the attached module 270. Further, in the photographic optical device 2000 in this embodiment, a hand shake detection sensor 170 as a shake detection sensor is disposed between a sensor support plate 115 and a photographing unit 1a, and the photographic optical device 2000 is also provided with an imaging element flexible circuit board 1550 with which the imaging element 155 and the lens drive coils 30s and 30t are electrically connected, and a sensor flexible circuit board 175 on which the hand shake detection sensor 170 is mounted.

FIG. 9(*a*) is an outward appearance view showing the photographic optical device 2000 to which at least an embodiment of the present invention is applied which is viewed from obliquely above on an object to be photographed side, and FIG. 9(*b*) is an explanatory view showing the photographic optical device 2000 which is cut along a line parallel to the optical axis. FIG. 10 is an exploded perspective view showing the photographic optical device 2000 to which at least an embodiment of the present invention is applied.

Similarly to the embodiment described above, an inner side of the fixed cover 230 is structured with a movable module 1000 into which a focus mechanism for a lens is assembled, and a hand shake correction mechanism for rocking the movable module 1000 to correct a hand shake. These structures are similar to the structures of the above-mentioned embodiment and thus their detailed descriptions are omitted.

In the photographic optical device 2000 in this embodiment, an object side end part of a fixed cover 230 in the fixed body 210 is fixed with the attached module 270 into which a shutter mechanism, a filter drive mechanism for changing various filters between a state disposed on the optical axis and a state retreated from the optical axis, and a diaphragm mechanism are assembled. Further, an attached module flexible circuit board 275 drawn out from the attached module 270 is extended along a side face of the fixed cover 230 to an opposite side to the object to be photographed side and extended toward a control circuit (not shown) of a device main body. As the shutter mechanism, a mechanism type in which a shutter plate is magnetically driven or a type utilizing a liquid crystal device may be used.

Figure 9A:
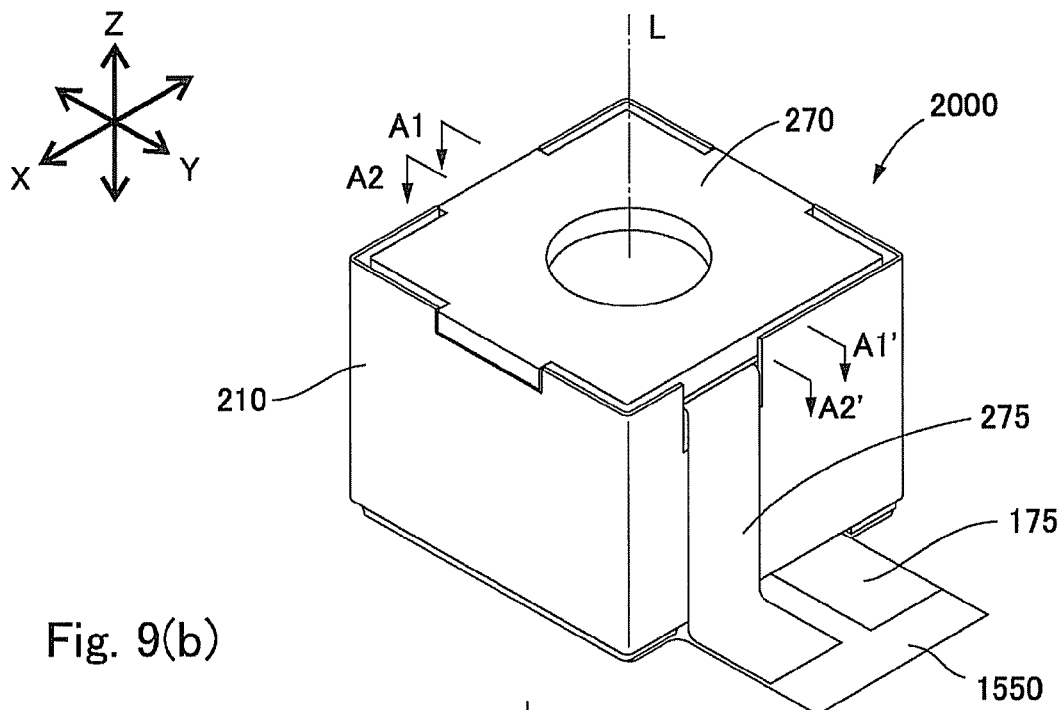
FIG. 9(a) is an outward appearance view showing a photographic optical device to which at least an embodiment of the present invention is applied and which is viewed from obliquely above on an object to be photographed side.
Figure 9B:
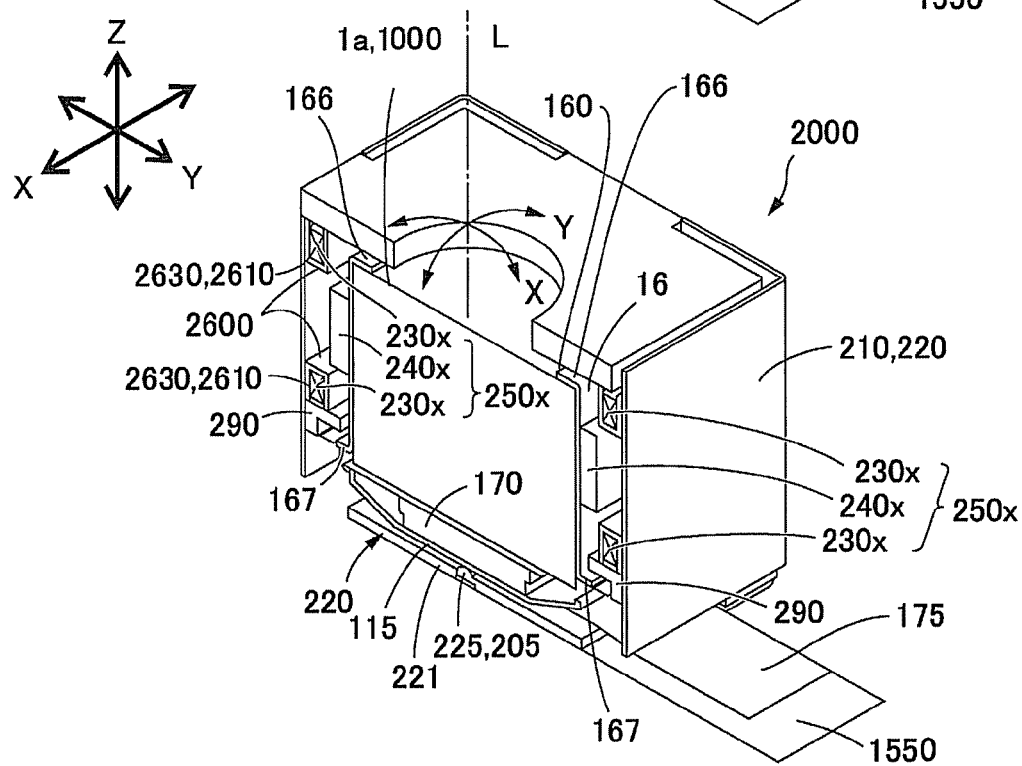
FIG. 9(b) is an explanatory view showing the photographic optical device which is cut along a line parallel to the optical axis.
Figure 10:
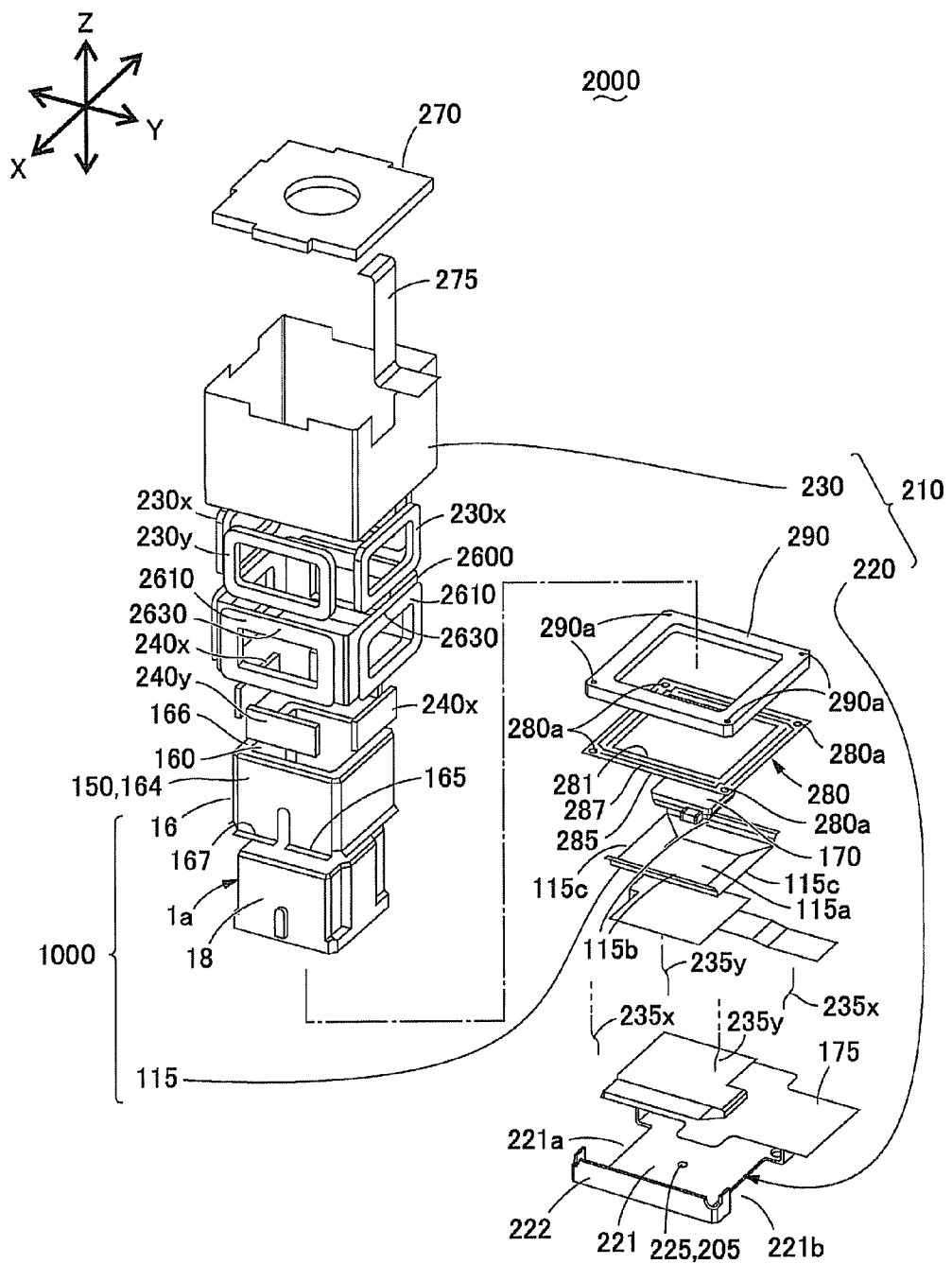
FIG. 10 is an exploded perspective view showing a photographic optical device to which at least an embodiment of the present invention is applied.

As shown in FIGS. 9(a) and 9(b) and FIG. 10, the movable module 1000 is provided with the photographing unit 1a into which a focus mechanism for a lens is assembled and, in order to structure a hand shake preventing mechanism, a yoke 16 which is formed in a rectangular tube-like shape and into which the photographing unit 1a is accommodated and a sensor support plate 115 are attached to the photographing unit 1a. The structure of the photographing unit 1a is similar to the structure of the photographing unit 1 of the optical unit 200 with shake correcting function described above and thus its detailed description is omitted and different structures will be described below.

Figures 3A, 3B:
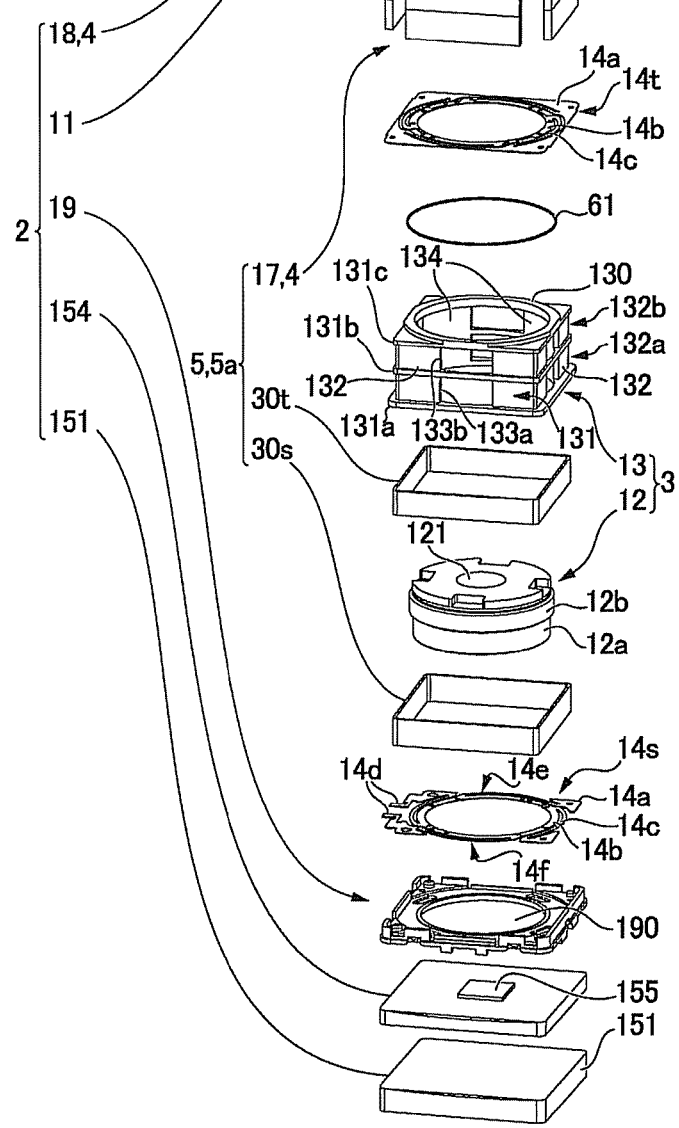
FIG. 3(a) is an outward appearance view showing a photographing unit that is used in the optical unit with shake correcting function in accordance with the first embodiment of the present invention which is viewed from obliquely above.
FIG. 3(b) is its exploded perspective view.
Figure 4:
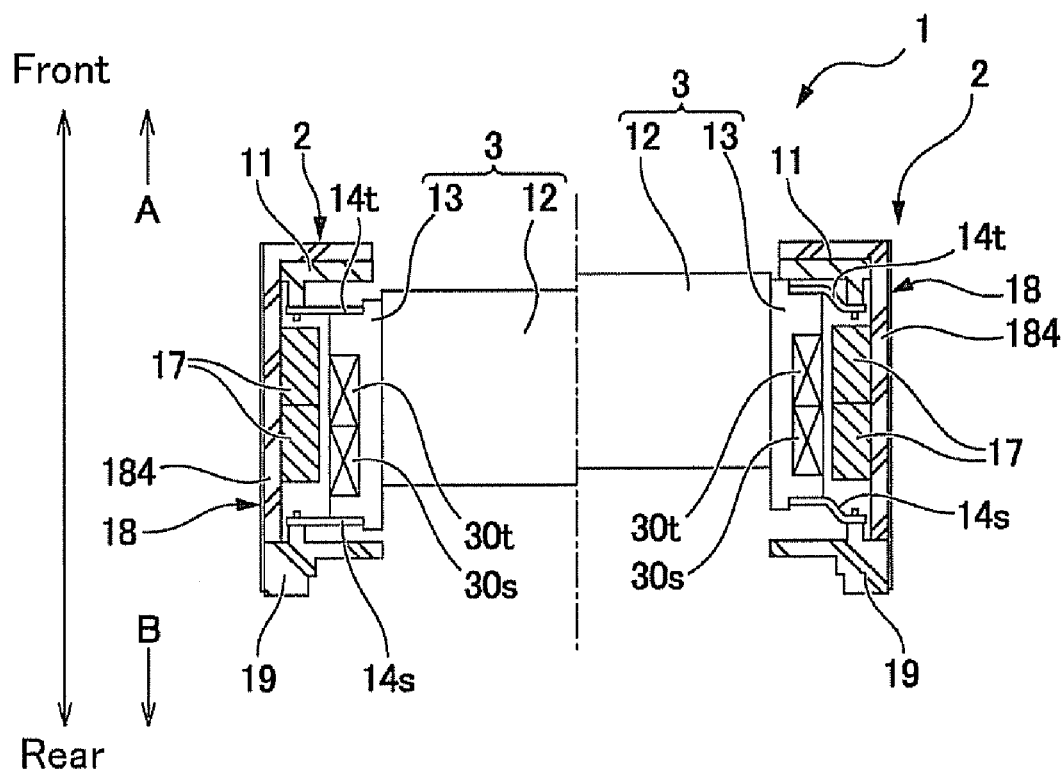
FIG. 4 is an explanatory view schematically showing an operation of the photographing unit shown in FIGS. 3(a) and 3(b).

The support body 2 in the photographing unit 1a is, similarly to the photographing unit 1 shown in FIGS. 3(a) and 3(b), provided with a circuit board 154 on which an imaging element 155 is mounted on its upper face, and the circuit board 154 is fixed on an under face of an imaging element holder 19. The circuit board 154 is a double-sided circuit board and an under face of the circuit board 154 is connected with an imaging element flexible circuit board 1550 (see FIGS. 9(a) and 9(b)) which is electrically connected with the imaging element 155.

In the photographing unit 1a which is provided with a similar structure to the structure of the photographing unit 1 of the optical unit 200 with shake correcting function described above, the imaging element 155 and the lens drive coils 30s and 30t are required to be electrically connected with a control section of the device main body. Therefore, in this embodiment, the imaging element flexible circuit board 1550 is disposed on an opposite side to an object to be photographed side with respect to the photographing unit 1a and the imaging element 155 and the lens drive coils 30s and 30t are electrically connected with wiring patterns which are formed on the imaging element flexible circuit board 1550.

(Structure of Hand Shake Correction Mechanism)

Figure 11A:
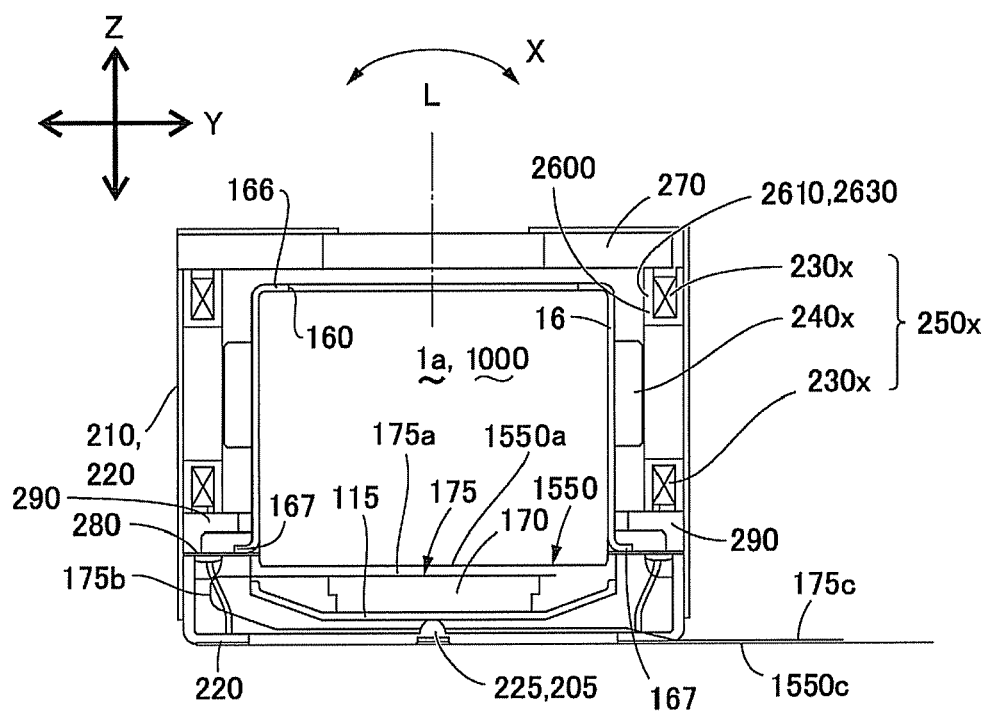
FIG. 11(a) is a longitudinal sectional view showing the photographic optical device to which at least an embodiment of the present invention is applied and which is cut at a position corresponding to the "A1-A1'" line in FIG. 9(a)
Figure 11B:
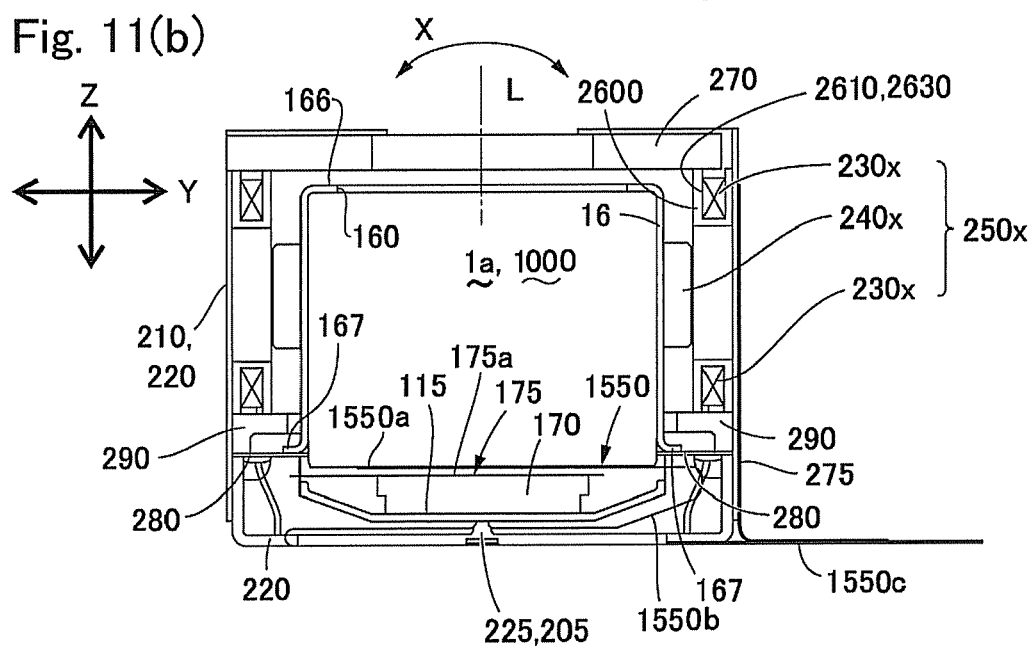
FIG. 11(b) is a longitudinal sectional view showing the photographic optical device which is cut at a position corresponding to the "A2-A2'" line in FIG. 9(a).

FIG. 11(a) is a longitudinal sectional view showing the photographic optical device to which at least an embodiment of the present invention is applied and which is cut at a position corresponding to the "A1-A1'" line in FIG. 9(a), and FIG. 11(b) is a longitudinal sectional view showing the photographic optical device which is cut at a position corresponding to the "A2-A2'" line in FIG. 9(a).

In FIGS. 9(a) and 9(b), FIG. 10 and FIGS. 11(a) and 11(b), in the photographic optical device 2000 in this embodiment, in order to structure a shake correction mechanism, specifically, a hand shake correction mechanism, a hand shake detection sensor 170 is disposed between the sensor support plate 115 and the photographing unit 1a. In this embodiment, the hand shake detection sensor 170 is a surface mounting type gyro-sensor (angular velocity sensor), which is mounted downward on a sensor flexible circuit board 175. Further, an under face of the hand shake detection sensor 170 is supported by an upper face of the sensor support plate 115. The gyro-sensor is a sensor which detects angular velocities of two axes, preferably two axes perpendicular to each other. In this embodiment, the gyro-sensor is structured to detect angular velocities of two axes, i.e., an X-axis and a Y-axis. The sensor support plate 115 is formed with side plate parts 115b and 115c obliquely upward from an outer peripheral portion of its bottom plate portion. However, the side plate parts 115c located in the Y-axis direction are slightly lower than the side plate parts 115b located in the X-axis direction. Therefore, in a state that the side plate parts 115b of the sensor support plate 115 are fixed to the bottom face of the photographing unit 1a (under face of the circuit board 154), gap spaces for passing strip-shaped thinner width portions 1550b and 175b of an imaging element flexible circuit board 1550 and a sensor flexible circuit board 175 described below are formed between the side plate parts 115c of the sensor support plate 115 and the circuit board 154.

A support protruded part 225 which structures a pivot part protruded in a hemispheric shape is formed at a center of the upper face of the base 220 which is used as the fixed body 210. An upper end part of the support protruded part 225 is abutted with a center of the sensor support plate 115 of the movable module 1000 to structure a pivot part 205 (rocking support part) which supports the movable module 1000 to be capable of rocking. The support protruded part 225 is located on the optical axis "L". Therefore, the movable module 1000 is capable of rocking through the support protruded part 225 in all of the X-axis direction, the Y-axis direction and a direction between the X-axis direction and the Y-axis direction. Further, the support protruded part 225 (pivot part 205) is disposed at a position overlapping with the hand shake detection sensor 170 in the optical axis direction on an opposite side to an object to be photographed side with respect to the hand shake detection sensor 170.

Further, in this embodiment, a gimbal spring 280 whose planar shape is rectangular is disposed between the fixed body 210 and the movable module 1000 as an urging means for urging the movable module 1000 toward the support protruded part 225. The structure of the gimbal spring 280 is similar to the structure in the photographing unit 1 in the embodiment described above and thus its detailed description is omitted.

In addition, in this embodiment, a hand shake correction magnetic drive mechanism is provided which generates a magnetic force for rocking the movable module 1000 with the support protruded part 225 as a supporting point. The hand shake correction magnetic drive mechanism includes, between the movable module 1000 and the fixed body 210, a first shake correction magnetic drive mechanism 250x for rocking the movable module 1000 as shown by the arrow "X" around the X-axis with the support protruded part 225 of the pivot part 205 as a supporting point, and a second shake correction magnetic drive mechanism 250y for rocking the movable module 1000 as shown by the arrow "Y" around the Y-axis with the support protruded part 225 as a supporting point. Structures of the first shake correction magnetic drive mechanism 250x and the second shake correction magnetic drive mechanism 250y are basically similar to the structure of the optical unit 200 with shake correcting function in the embodiment described above and thus the descriptions of similar portions are omitted and different portions will be described below.

In this embodiment, a rectangular tube-shaped shake correction coil holder 2600 is disposed on an outer peripheral side of the photographing unit 1a so as to surround the photographing unit 1a. An outer side of each face of the shake correction coil holder 2600 is formed with a bobbin part 2610 in which a coil groove 2630 is opened on its periphery. The shake correction coil holder 2600 is fixed to the inner side of the base 220 in a state that both sides in the optical axis direction of the shake correction coil holder 2600 are sandwiched by the spacer 290 and the attached module 270. The shake correction coil holder 2600 is formed of nonmagnetic material and, in this embodiment, one-piece molded product made of resin is used. A spacer 290 (abutting part) formed in a rectangular frame shape is disposed between the base 220 and the shake correction coil holder 2600, and the spacer 290 is structured of an elastic member whose cross section is in an "L" shape. Since the above-mentioned spacer 290 is disposed, when an external force is applied to vibrate the movable module 1000, the yoke 16 of the movable module 1000 is firstly abutted with an end part of the spacer 290. Therefore, abutting of the shake correction coils 230x and 230y with the yoke 16 and abutting of the shake correction magnets 240x and 240y with the fixed body 210 are prevented.

In this embodiment, a shake correction coil 230x (first shake correction coil) is wound around the bobbin parts 2610 of the shake correction coil holder 2600 which are formed at positions facing each other in the Y-axis direction. The shake correction coil 230x is located on an outer side with respect to the shake correction magnet 240x and the shake correction magnet 240x forms a magnetic field interlinking with respective sides of the shake correction coil 230x.

In this manner, in this embodiment, a first shake correction magnetic drive mechanism 250x is structured of the shake correction coil 230x and the shake correction magnet 240x, and a pair of the first shake correction magnetic drive mechanisms 250x is disposed at two positions interposing the support protruded part 225 therebetween in the Y-axis direction for rocking the movable module 1000 around the X-axis. In the first shake correction magnetic drive mechanism 250x, two shake correction coils 230x are electrically connected so as to generate magnetic driving forces to the movable module 1000 in the same direction as each other around the X-axis when energized. Therefore, two first shake correction magnetic drive mechanisms 250x are arranged to be a push-pull configuration in which, when an electric current is supplied to two shake correction coils 230x, moments in the same direction as each other around the X-axis passing through the support protruded 225 are applied to the movable module 1000.

Further, a shake correction coil 230y (second shake correction coil) is wound around the bobbin parts 2610 of the shake correction coil holder 2600 which are formed at positions facing each other in the X-axis direction. The shake correction coil 230y faces the shake correction magnet 240y in an inner and outer direction. Therefore, the shake correction magnet 240y forms a magnetic field interlinking with respective sides of the shake correction coil 230y.

In this manner, in this embodiment, a second shake correction magnetic drive mechanism 250y is structured of the shake correction coil 230y and the shake correction magnet 240y, and a pair of the second shake correction magnetic drive mechanisms 250y is disposed at two positions interposing the support protruded part 225 therebetween in the X-axis direction for rocking the movable module 1000 around the Y-axis. In the second shake correction magnetic drive mechanism 250y, two shake correction coils 230y are electrically connected so as to generate magnetic driving forces to the movable module 1000 in the same direction as each other around the Y-axis when energized. Therefore, two second shake correction magnetic drive mechanisms 250y are arranged to be a push-pull configuration in which, when an electric current is supplied to two shake correction coils 230y, moments in the same direction as each other around the Y-axis passing through the support protruded 225 are applied to the movable module 1000.

In this embodiment, corner portions of the gimbal spring 280 and the spacer 290 are formed with wiring holes 280a and 290a, and end parts 235x and 235y of the shake correction coils 230x and 230y are drawn to opposite side end parts to an object to be photographed side by passing through the wiring holes 280a and 290a of the gimbal spring 280 and the spacer 290 to be connected with a sensor flexible circuit board 175. The sensor flexible circuit board 175 is extended toward a control circuit (not shown) of the device main body.

(Comparison of Structures of Shake Correction Magnetic Drive Mechanisms)

Figure 12A:
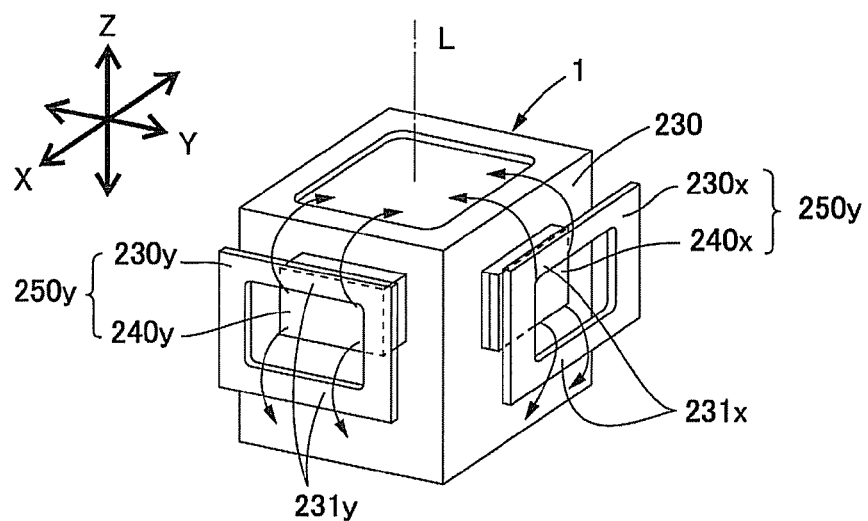
FIG. 12(a) is an explanatory view showing a structure of a shake correction magnetic drive mechanism which is structured in a photographic optical device to which at least an embodiment of the present invention is applied.
Figure 12B:
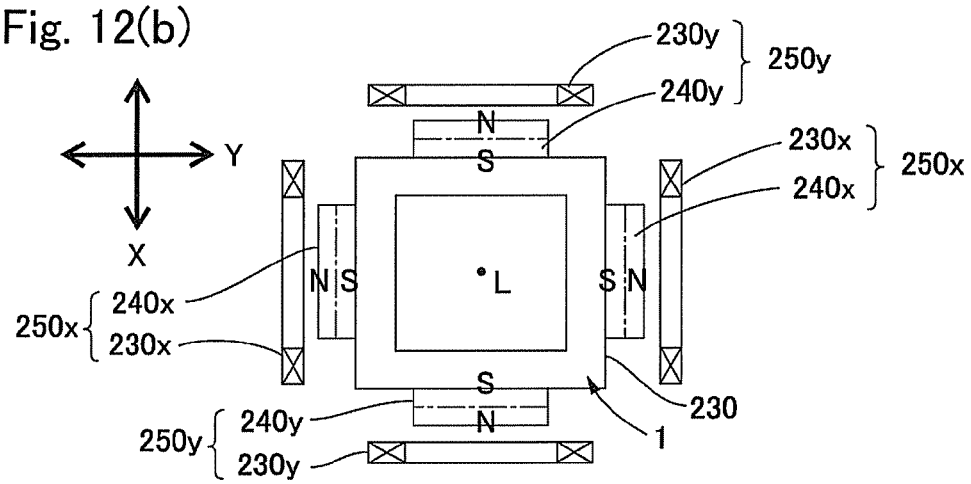
FIG. 12(b) is an explanatory view showing its planar arrangement.
Figure 12C:
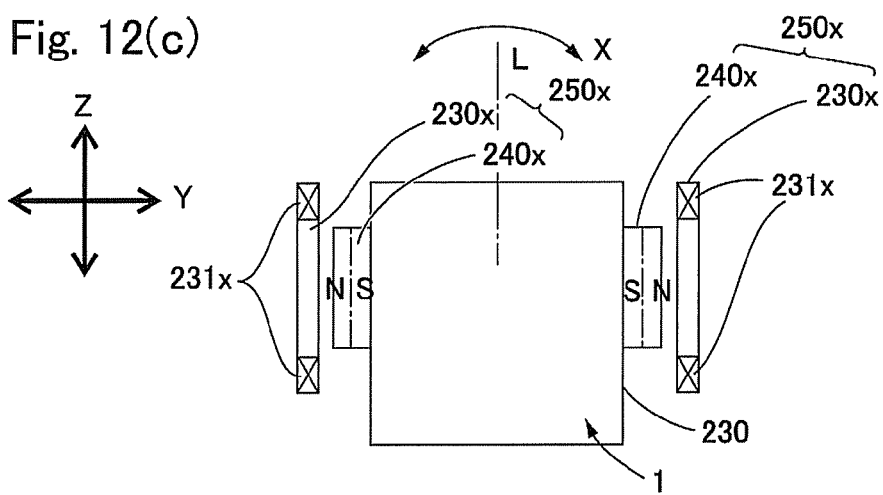
FIG. 12(c) is an explanatory view showing an arrangement in the optical axis direction.
Figure 13A:
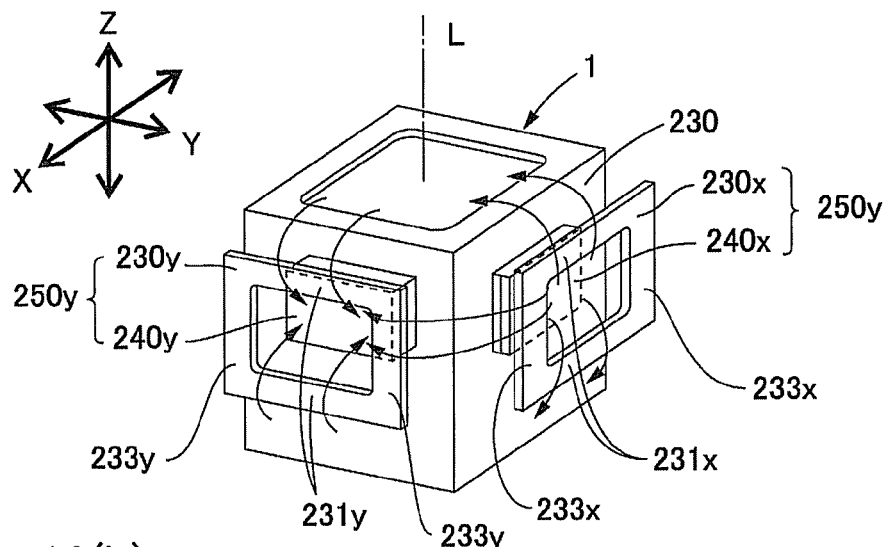
FIG. 13(a) is an explanatory view showing another structure of a shake correction magnetic drive mechanism which is structured in a photographic optical device to which at least an embodiment of the present invention is applied.
Figure 13B:
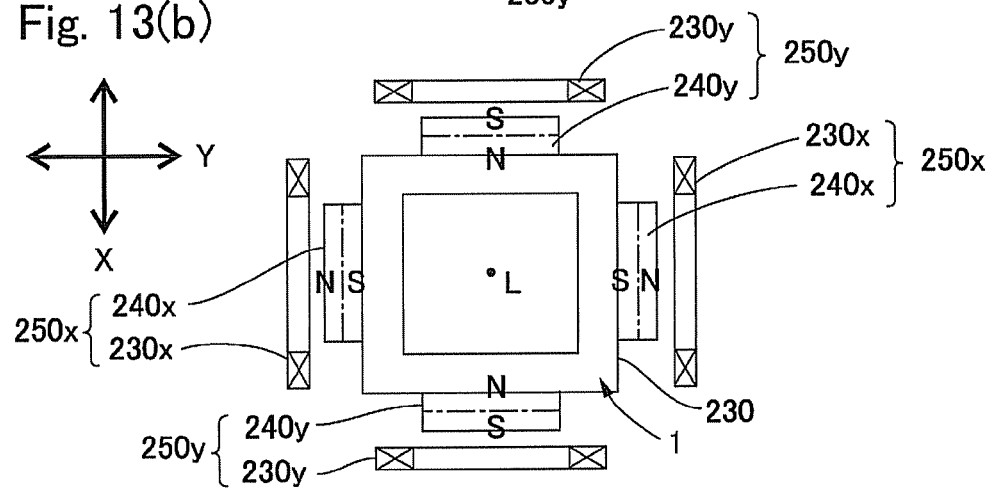
FIG. 13(b) is an explanatory view showing its planar arrangement.
Figure 13C:
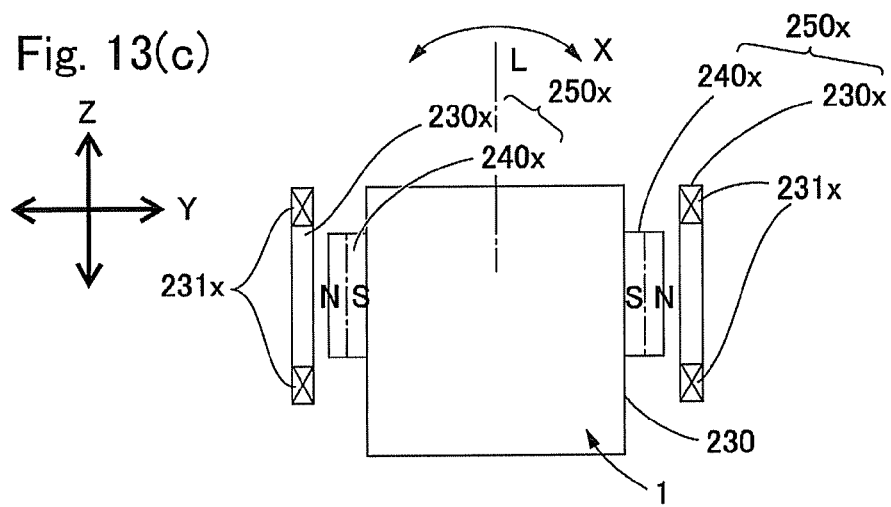
FIG. 13(c) is an explanatory view showing an arrangement in the optical axis direction.
Figure 14A:
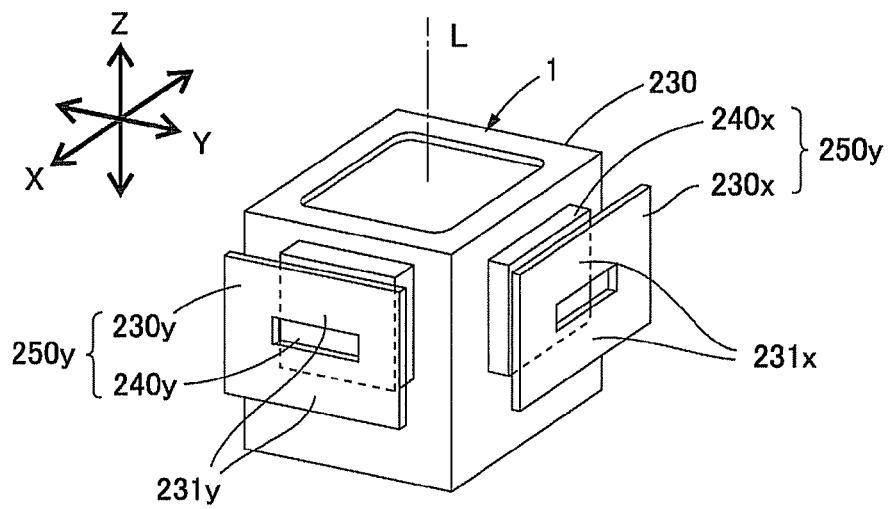
FIG. 14(a) is an explanatory view showing further another structure of a shake correction magnetic drive mechanism which is structured in a photographic optical device to which at least an embodiment of the present invention is applied.
Figure 14B:
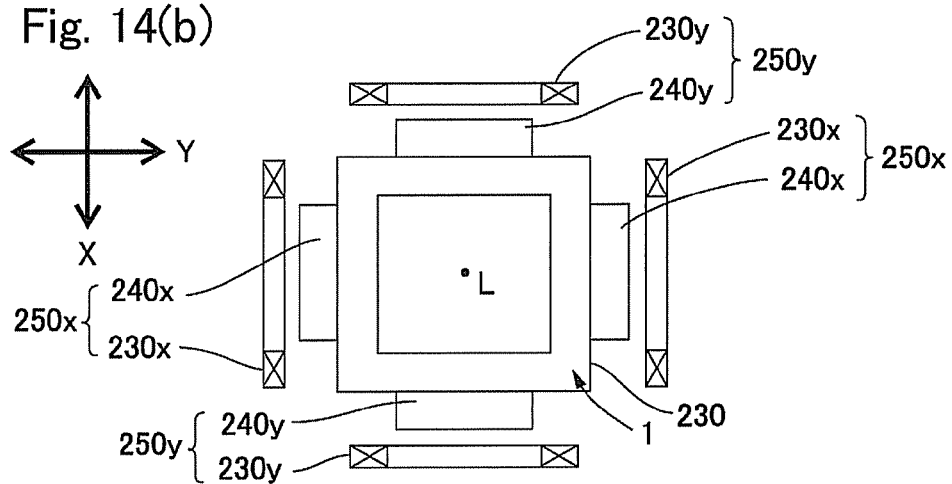
FIG. 14(b) is an explanatory view showing its planar arrangement.
Figure 14C:
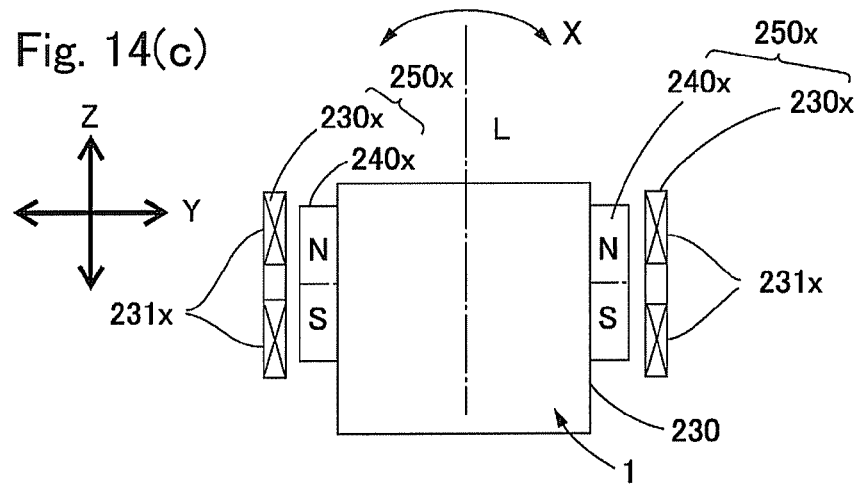
FIG. 14(c) is an explanatory view showing an arrangement in the optical axis direction.
Figure 15A:
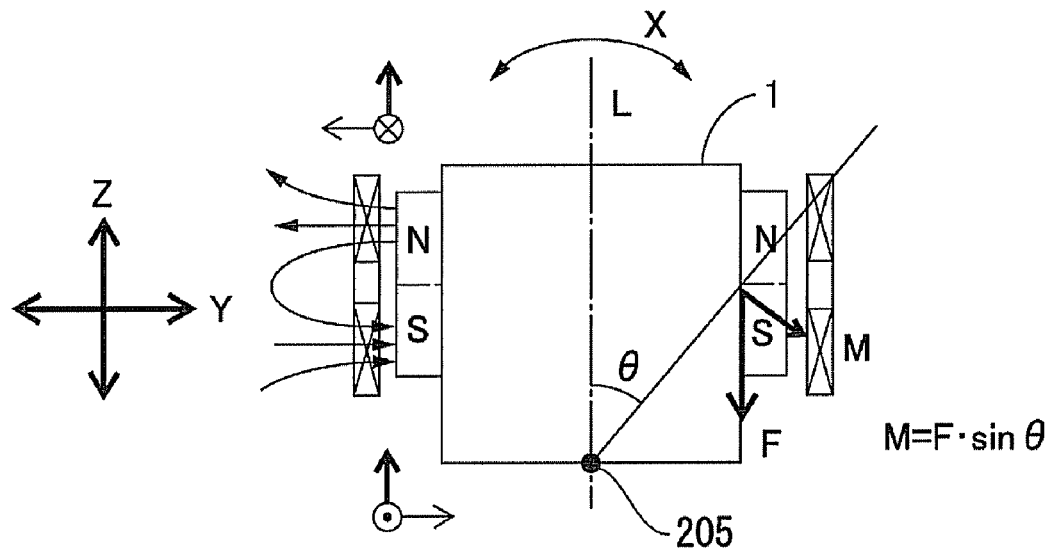
FIGS. 15(a) and 15(b) are explanatory views for comparing the structure shown in FIG. 12(c) and the structure shown in FIG. 14(c) as the shake correction magnetic drive mechanism which is structured in the photographic optical device to which at least an embodiment of the present invention is applied.
Figure 15B:
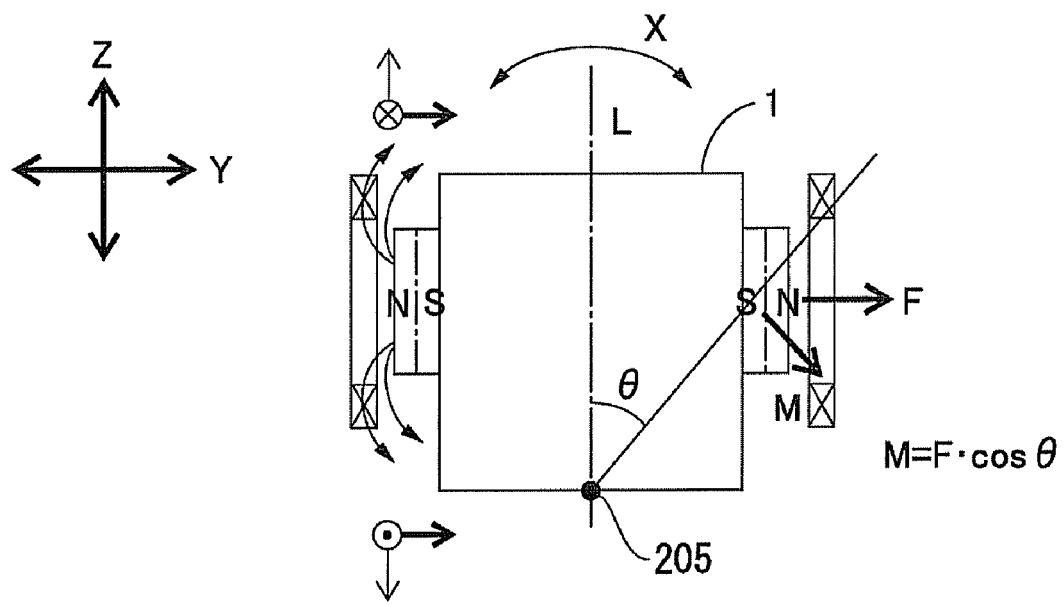

FIG. 12(a) is an explanatory view showing a structure of a shake correction magnetic drive mechanism (first shake correction magnetic drive mechanism 250x and second shake correction magnetic drive mechanism 250y) which is structured in a photographic optical device to which at least an embodiment of the present invention is applied, FIG. 12(b) is an explanatory view showing its planar arrangement, and FIG. 12(c) is an explanatory view showing an arrangement in the optical axis direction. FIG. 13(a) is an explanatory view showing another structure of a shake correction magnetic drive mechanism (first shake correction magnetic drive mechanism 250x and second shake correction magnetic drive mechanism 250y) which is structured in a photographic optical device to which at least an embodiment of the present invention is applied, FIG. 13(b) is an explanatory view showing its planar arrangement, and FIG. 13(c) is an explanatory view showing an arrangement in the optical axis direction. FIG. 14(a) is an explanatory view showing further another structure of a shake correction magnetic drive mechanism (first shake correction magnetic drive mechanism 250x and second shake correction magnetic drive mechanism 250y) which is structured in a photographic optical device to which at least an embodiment of the present invention is applied, FIG. 14(b) is an explanatory view showing its planar arrangement, and FIG. 14(c) is an explanatory view showing an arrangement in the optical axis direction. FIGS. 15(a) and 15(b) are explanatory views for comparing the structure shown in FIG. 13(c) and the structure shown in FIG. 14(c) as the shake correction magnetic drive mechanism which is structured in the photographic optical device to which at least an embodiment of the present invention is applied. The structure shown in FIG. 14(c) is shown in FIG. 15(a) and the structure shown in FIG. 13(c) is shown in FIG. 15(b).

Structures shown in FIGS. 12(a), 12(b) and 12(c), and FIGS. 13(a), 13(b) and 13(c), and FIGS. 14(a), 14(b) and 14(c) may be adopted for structuring a hand shake correction magnetic drive mechanism (first shake correction magnetic drive mechanism 250x and second shake correction magnetic drive mechanism 250y) in the photographic optical device 2000 in this embodiment or in the optical unit 200 with shake correcting function described above.

In the structures shown in FIGS. 12(a), 12(b) and 12(c) and in FIGS. 13(a), 13(b) and 13(c), side portions extending in the X-axis direction which are located at displaced positions in the Z-axis direction from the position facing the shake correction magnet 240x in the Y-axis direction are effective sides 231x of the shake correction coil 230x. Further, side portions extending in the Y-axis direction which are located at displaced positions in the Z-axis direction from the position facing the shake correction magnet 240y in the X-axis direction are effective sides 231y of the shake correction coil 230y. In the structure shown in FIGS. 12(a), 12(b) and 12(c), all of the shake correction magnets 240x and 240y are magnetized so that their outer face sides are magnetized in the same pole, for example, an "N"-pole. On the other hand, in the structure shown in FIGS. 13(a), 13(b) and 13(c), an outer face side of the shake correction magnet 240x is magnetized to be a different pole from that of an outer face side of the shake correction magnet 240y. For example, the outer face side of the shake correction magnet 240x is magnetized in an "N"-pole but the outer face side of the shake correction magnet 240y is magnetized in an "S"-pole.

When this structure is adopted, as understood by comparing the magnetic flux shown in FIG. 12(a) with the magnetic flux shown in FIG. 13(a), according to the structure shown in FIGS. 13(a), 13(b) and 13(c), the magnetic flux is effectively interlinked with the side portions 233x and 233y extending in the Z-axis direction of the shake correction coils 230x and 230y. Therefore, when the same electric current is supplied to a coil under a condition of the same coil winding number, a larger torque is obtained in the structure shown in FIGS. 13(a), 13(b) and 13(c) in comparison with a case that the structure shown in FIGS. 12(a), 12(b) and 12(c) is adopted.

Further, in the structure shown in FIGS. 14(a), 14(b) and 14(c), all of the shake correction magnets 240x and 240y are magnetized so that each of the outer faces are magnetized in different poles in the Z-axis direction. For example, the outer faces of the shake correction magnets 240x and 240y are magnetized so that a portion located on an object to be photographed side is magnetized in an "N"-pole and that a portion located on an opposite side to the object to be photographed side (imaging element side) is magnetized in an "S"-pole. In this case, side portions extending in the X-axis direction which face in the Y-axis direction with respective portions magnetized in different poles of the shake correction magnet 240x are effective sides 231x of the shake correction coil 230x. Further, side portions extending in the Y-axis direction which face in the X-axis direction with respective portions magnetized in different poles of the shake correction magnet 240y are effective sides 231y of the shake correction coil 230y.

When the structure shown in FIGS. 14(a), 14(b) and 14(c) is compared with the structure shown in FIGS. 13(a), 13(b) and 13(c), even in a case that the same electric current is supplied to a coil under a condition of the same coil winding number, a larger torque is obtained in the structure shown in FIGS. 14(a), 14(b) and 14(c) in comparison with a case that the structure shown in FIGS. 13(a), 13(b) and 13(c) is adopted. The reason will be described below with reference to FIGS. 15(a) and 15(b).

FIGS. 15(a) and 15(b) respectively correspond to FIG. 14(c) and FIG. 13(c). When the structure shown in FIG. 14(c) and FIG. 15(a) is compared with the structure shown in FIG. 13(c) and FIG. 15(b), leakage of magnetic flux is smaller in the structure shown in FIG. 14(c) and FIG. 15(a) than the structure shown in FIG. 13(c) and FIG. 15(b).

Further, as shown in FIGS. 15(a) and 15(b), an angle defined by the optical axis and a line formed by connecting the pivot part 205 with the position where a magnetic force acts on the movable module 1 is set to be "θ", and a distance between the pivot part 205 and the position where the magnetic force acts on the movable module 1 is set to be "d". In this case, when magnetic forces shown by "F" equivalent to each other are generated, in the structure shown in FIG. 14(c) and FIG. 15(a), since the magnetic force acts in the optical axis direction, the moment "M" for rocking the movable module 1 with the pivot part 205 as a rocking center is expressed as the following expression.

$$M = d \times F \cdot \sin \theta \quad (1)$$

On the other hand, in the structure shown in FIG. 13(c) and FIG. 15(b), since the magnetic force acts in the Y-axis direction, the moment "M" for rocking the movable module 1 with the pivot part 205 as a rocking center is expressed as the following expression.

$$M = d \times F \cdot \cos \theta \quad (2)$$

Therefore, when the "θ" is 45°, equivalent moments "M" are generated in the structure shown in FIG. 14(c) and FIG. 15(a) and the structure shown in FIG. 13(c) and FIG. 15(b). However, when a dimension in the optical axis direction of the photographic optical device 2000 is reduced by means of that a dimension in the Z-axis direction between the pivot part 205 and the position where the magnetic force acts on the movable module 1 is shortened, the "θ" becomes greater than 45°. In this structure, when the expressions (1) and (2) are compared, the moment "M" obtained by the expression (1) becomes larger. Therefore, a larger torque can be obtained in the structure shown in FIGS. 14(a), 14(b) and 14(c) in comparison with a case that the structure shown in FIGS. 13(a), 13(b) and 13(c) is adopted.

In FIGS. 15(a) and 15(b), the first shake correction magnetic drive mechanisms 250x are shown as an example but the second shake correction magnetic drive mechanisms 250y are similarly operated.

(Structures of Flexible Circuit Boards for Imaging Element and for Sensor)

Figure 16A:
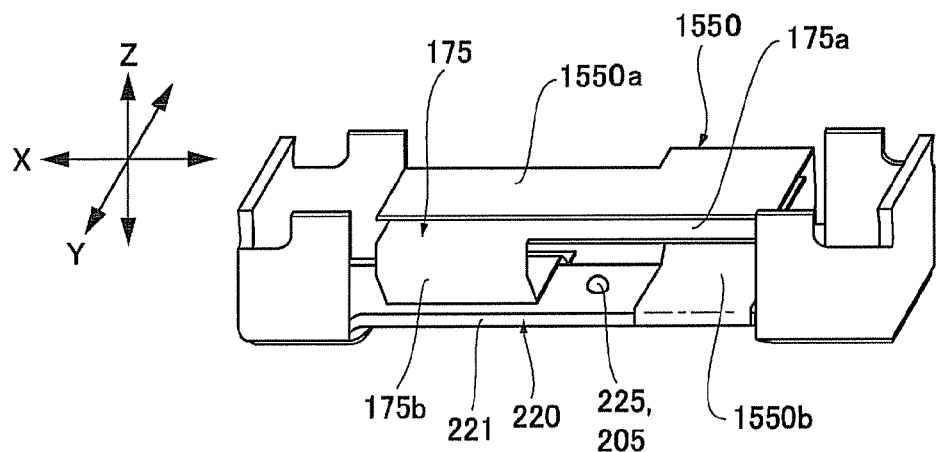
FIG. 16(a) is an explanatory view showing a pivot part and its surroundings in a photographic optical device to which at least an embodiment of the present invention is applied.
Figure 16B:
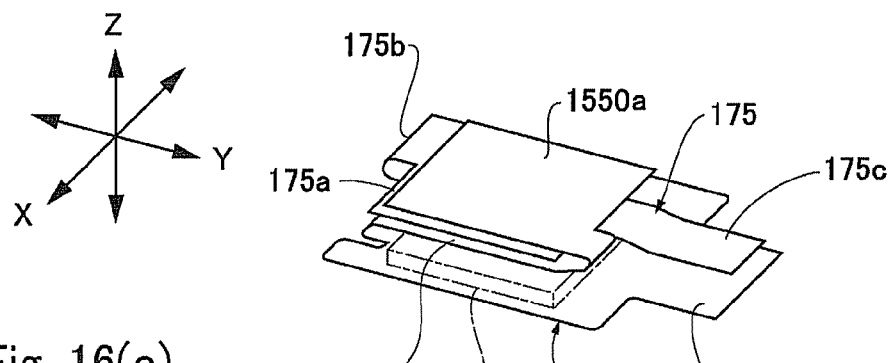
FIG. 16(b) is an explanatory view showing an overlapped portion of flexible circuit boards for imaging element and for sensor.
Figure 16C:
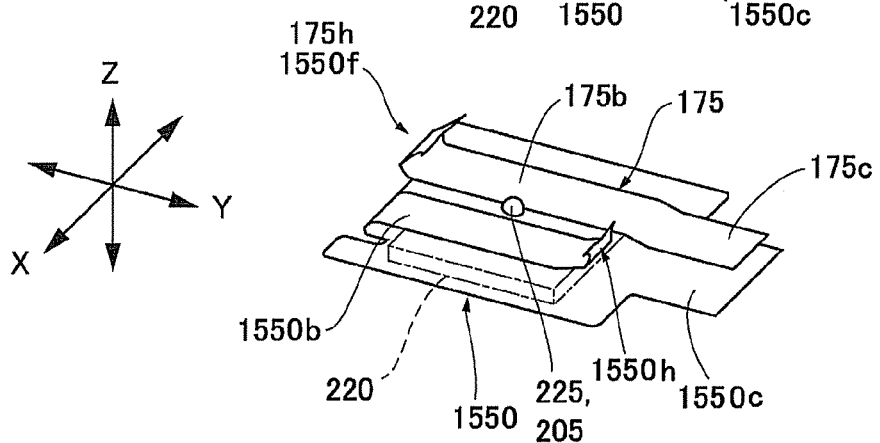
FIG. 16(c) is an explanatory view showing a state where their upper portions are cut off.
Figure 17A:
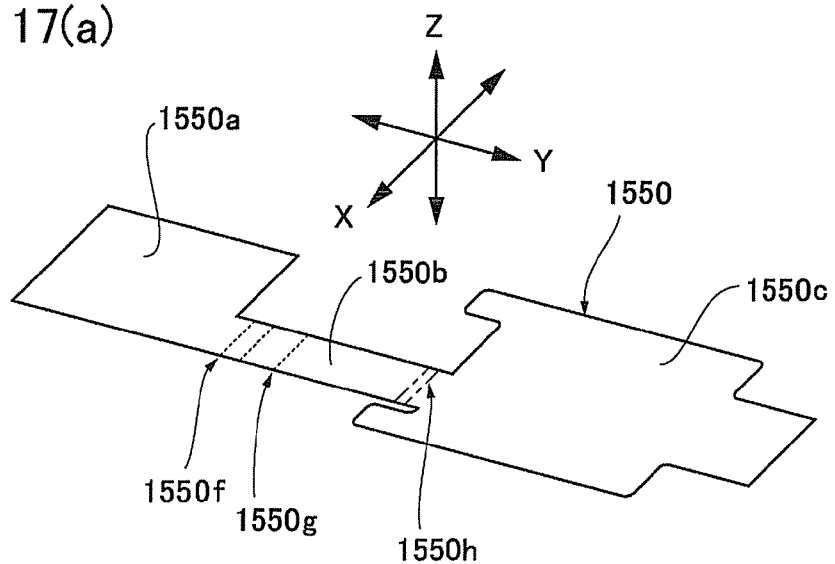
FIG. 17(a) is a developed view showing an imaging element flexible circuit board which is used as a main circuit board in a photographic optical device to which at least an embodiment of the present invention is applied.
Figure 17B:
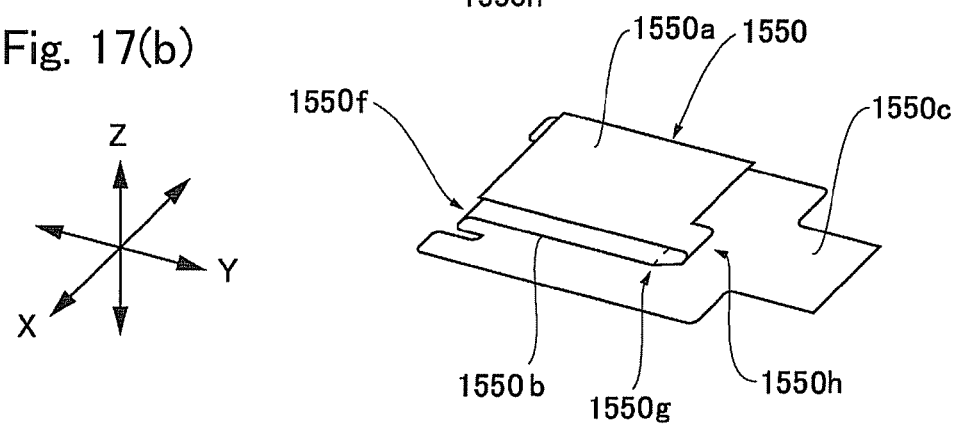
FIG. 17(b) is an explanatory view showing a state where the imaging element flexible circuit board has been folded.
Figure 17C:
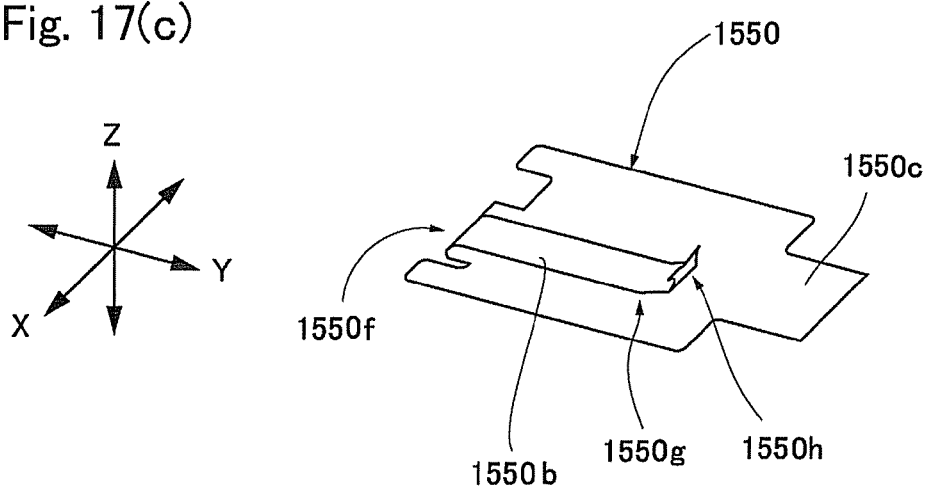
FIG. 17(c) is an explanatory view showing a state where its upper portion is cut off.
Figure 18A:
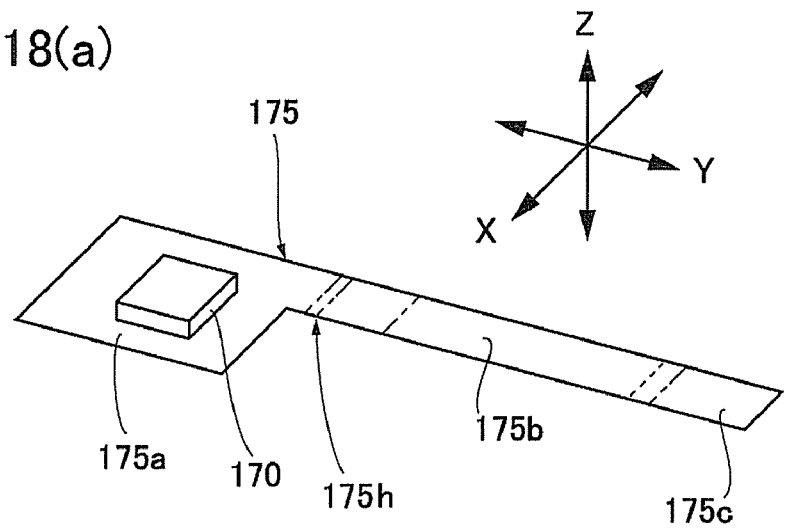
FIG. 18(a) is a developed view showing a sensor flexible circuit board which is used as a sub-circuit board in a photographic optical device to which at least an embodiment of the present invention is applied.
Figure 18B:
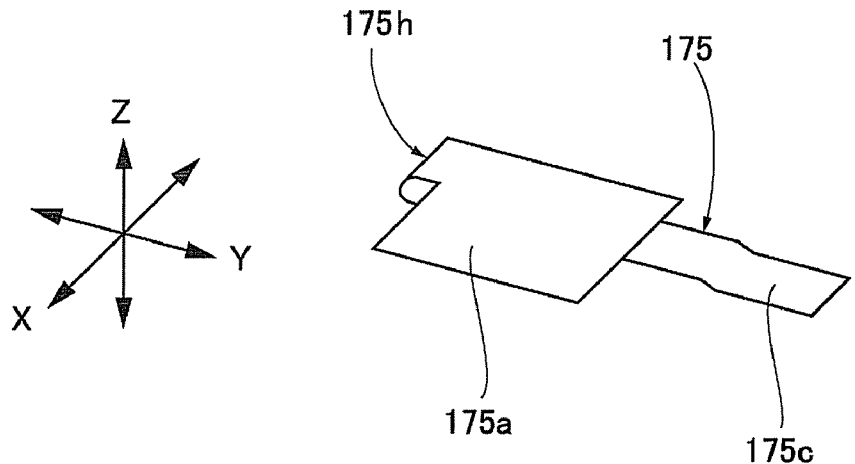
FIG. 18(b) is an explanatory view showing a state where the sensor flexible circuit board has been folded.
Figure 18C:
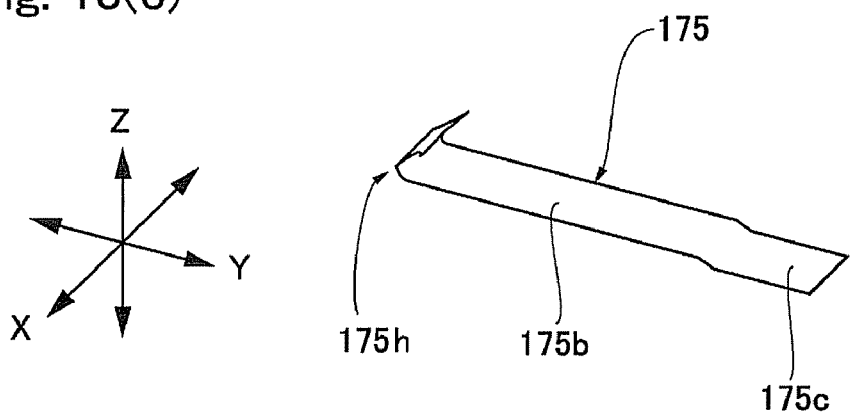
FIG. 18(c) is an explanatory view showing a state where its upper portion is cut off.

FIG. 16(a) is an explanatory view showing the pivot part 205 and its surroundings of the photographic optical device 2000 to which at least an embodiment of the present invention is applied, FIG. 16(b) is an explanatory view showing an overlapped portion of flexible circuit boards for imaging element and for sensor, and FIG. 16(c) is an explanatory view showing a state where their upper portions are cut off. FIG. 17(a) is a developed view showing an imaging element flexible circuit board 1550 which is used as a main circuit board in the photographic optical device 2000 to which at least an embodiment of the present invention is applied, FIG. 17(b) is an explanatory view showing a state where the imaging element flexible circuit board 1550 is folded, and FIG. 17(c) is an explanatory view showing a state where its upper portion is cut off. FIG. 18(a) is a developed view showing a sensor flexible circuit board 175 which is used as a sub-circuit board in the photographic optical device 2000 to which at least an embodiment of the present invention is applied, FIG. 18(b) is an explanatory view showing a state where the sensor flexible circuit board 175 is folded, and FIG. 18(c) is an explanatory view showing a state where its upper portion is cut off. In FIG. 17(a) and FIG. 18(a), a valley folding line is shown by an alternate long and short dash line and a ridge folding line is shown by a dotted line.

As shown in FIGS. 9(a) and 9(b), FIG. 10 and FIGS. 11(a) and 11(b), in the photographic optical device 2000 in this embodiment, three pieces of flexible circuit boards are used, i.e., an attached module flexible circuit board 275 which is drawn out from the attached module 270, an imaging element flexible circuit board 1550 to which the imaging element 155 and the lens drive coils 30s and 30t are electrically connected, and a sensor flexible circuit board 175 on which the hand shake detection sensor 170 is mounted. Each of the flexible circuit boards is a flexible wiring member which is structured so that wiring patterns are formed on an insulation substrate and, when the flexible wiring member is deformed, a shape returning force which is going to return to its original shape is generated.

In this embodiment, a single-sided flexible circuit board which is structured so that wiring patterns are formed on one face of an insulation substrate is used for each of the attached module flexible circuit board 275, the imaging element flexible circuit board 1550 and the sensor flexible circuit board 175. A substrate of the single-sided flexible circuit board is thin and wiring patterns are formed only on one side face. Therefore, the single-sided flexible circuit board is deformed by a small force and its shape returning force when deformed is small. Further, the flexible circuit board is inexpensive.

Further, in this embodiment, the attached module flexible circuit board 275 is drawn to an opposite side to an object to be photographed side along the side face of the fixed cover 230 and adhesively bonded to the fixed cover 230.

In addition, as shown in FIGS. 9(a) and 9(b), FIGS. 11(a) and 11(b), and FIG. 16(a), a part of the imaging element flexible circuit board 1550 and a part of the sensor flexible circuit board 175 are passed through a gap space between the base 220 on which the support protruded part 225 of the pivot part 205 is formed and the sensor support plate 115, and through a gap space between the sensor support plate 115 and the photographing unit 1a. However, as described below, it is structured so that an unnecessary shape returning force is not generated and the pivot part 205 is not covered.

In other words, as shown in FIGS. 17(a), 17(b) and 17(c), the imaging element flexible circuit board 1550 is provided with a rectangular connection part 1550a which is electrically connected with the circuit board 154, a lead-out portion 1550c connected to a control section, and a strip-shaped thinner width portion 1550b which connects the connection part 1550a with the lead-out portion 1550c. The strip-shaped thinner width portion 1550b is formed considerably thinner than widths of the connection part 1550a and the lead-out portion 1550c. Further, in this embodiment, in order to mount the imaging element flexible circuit board 1550 in a state folded in the optical axis direction, bent portions 1550f, 1550g and 1550h are provided at plural positions of the strip-shaped thinner width portion 1550b.

Further, as shown in FIGS. 18(a), 18(b) and 18(c), the sensor flexible circuit board 175 is provided with a rectangular mounting part 175a on which the hand shake detection sensor 170 is mounted and a strip-shaped thinner width portion 175b which is extended from the mounting part 175a. A tip end part of the strip-shaped thinner width portion 175b is a lead-out portion 175c. The strip-shaped thinner width portion 175b is formed considerably thinner than a width of the mounting part 175a. Further, in this embodiment, in order to mount the sensor flexible circuit board 175 in a state folded in the optical axis direction, a bent portion 175h is provided in the strip-shaped thinner width portion 175b.

In the imaging element flexible circuit board 1550 and the sensor flexible circuit board 175 structured as described above, as shown in FIGS. 16(a), 16(b) and 16(c), the sensor flexible circuit board 175 is disposed between the connection part 1550a and the lead-out portion 1550c of the imaging element flexible circuit board 1550, and the lead-out portion 175c of the sensor flexible circuit board 175 is electrically connected with the lead-out portion 1550c of the imaging element flexible circuit board 1550. In this embodiment, an end part of the attached module flexible circuit board 275 shown in FIG. 9(a) is also electrically connected with the lead-out portion 1550c of the imaging element flexible circuit board 1550.

Further, the base 220 is located between the connection part 1550a and the strip-shaped thinner width portion 1550b of the imaging element flexible circuit board 1550. As a result, the respective strip-shaped thinner width portions 1550b and 175b of the imaging element flexible circuit board 1550 and the sensor flexible circuit board 175 are extended in the Y-axis direction in a juxtaposed manner at both sides in the X-axis direction so as to interpose the support protruded part 225 (pivot part 205) on the upper face of the base 220. Therefore, the respective strip-shaped thinner width portions 1550b and 175c of the imaging element flexible circuit board 1550 and the sensor flexible circuit board 175 are routed so as to avoid the support protruded part 225 within a gap space structured by the pivot part 205 between the sensor support plate 115 of the movable module 1 and the fixed body 210 and the base 220.

Further, in the strip-shaped thinner width portions 1550b and 175b of the imaging element flexible circuit board 1550 and the sensor flexible circuit board 175, the bent portions 1550f and 175h directing to the imaging element 155 and the hand shake detection sensor 170 are disposed at point-symmetry positions or substantially point-symmetry positions with the support protruded part 225 as the center.

In this embodiment, the base 220 is provided with side plate parts 222 standing toward an object to be photographed side from two side parts facing each other of the bottom plate part 221. However, the side plate part 222 is not formed from the other two side parts of the bottom plate part 221 and cut-out parts 221a and 221b are formed at positions overlapping with the bent portions 1550f and 175h of the strip-shaped thinner width portions 1550b and 175b of the imaging element flexible circuit board 1550 and the sensor flexible circuit board 175. Therefore, even when the bent portions 1550f and 175h are provided in the strip-shaped thinner width portions 1550b and 175b of the imaging element flexible circuit board 1550 and the sensor flexible circuit board 175, a malfunction such that the bent portions 1550f and 175h are caught by the base 220 does not occur.

(Hand Shake Correcting Operation)

In a cell phone with camera on which the photographic optical device 2000 structured as described above is mounted, a hand shake detection sensor such as a gyro-sensor is mounted for detecting a hand shake at the time of photographing and, on the basis of the detection result by the hand shake detection sensor, a control section which is mounted on the cell phone with camera supplies an electric current to one or both of the shake correction coils 230x and the shake correction coils 230y to rock the movable module 1000 around the X-axis and/or around the Y-axis with the pivot part 205 structured on the opposite side to an object side with respect to the lens 121. When the rocking motions are combined, the movable module 1000 is rocked over the whole "XY" plane. Accordingly, all the hand shakes which may be occurred in a cellular phone with camera or the like can be corrected surely.

In order to perform a hand shake correction, in this embodiment, a hand shake detection sensor is mounted on the movable module 1000 and the control section (not shown) performs a closed loop control on the first shake correction magnetic drive mechanisms 250x and the second shake correction magnetic drive mechanisms 250y so that an integral value of an angular velocity detected by the hand shake detection sensor, i.e., an angular displacement becomes zero.

In this embodiment, the movable module 1000 is structured to be capable of rocking with the pivot tip end part 205 and thus, when an impact is applied from the outside, the movable module 1000 is swung. However, in this embodiment, since the spacer 290 functions as an abutting part for the yoke 16 of the movable module 1000, the spacer 290 and the yoke 16 of the movable module 1000 are abutted with each other before the shake correction coils 230x and 230y and the yoke 16 are collided with each other or before the shake correction magnets 240x and 240y and the fixed body 210 are collided with each other. Therefore, the shake correction coils 230x and 230y and the shake correction magnets 240x and 240y are protected. In this embodiment, the spacer 290 whose cross section is formed in an "L"-like shape is used but, when the spacer 290 is formed to be firstly abutted with the movable module 1000 when the movable module 1000 is swung, the shape of the spacer 290 is not limited to the "L"-like shape. Further, when the movable module 1000 and the fixed body 210 are structured to be abutted with each other before the shake correction coils 230x and 230y and the yoke 16 are collided with each other or before the shake correction magnets 240x and 240y and the fixed body 210 are collided with each other, the abutting part may be structured in either of the movable module 1000 and the fixed body 210.

(Principal Effects in this Embodiment)

As described above, in the photographic optical device 2000 in this embodiment, the imaging element flexible circuit board 1550 which is electrically connected with the imaging element 155 is drawn out from the end part of the movable module 1000 on the opposite side to an object to be photographed side but, when a hand shake is to be corrected, the movable module 1000 is rocked with the imaging element 155 side with respect to the lens 121 (end part on the opposite side to the object side) as a center. Therefore, deformation of the imaging element flexible circuit board 1550 is extremely small. Accordingly, the movable module 1000 can be rocked speedily. Further, when the end part of the imaging element side of the movable module 1000 is rocked, the elastic deformation of the imaging element flexible circuit board 1550 is extremely small. Therefore, the shape returning force of the imaging element flexible circuit board 1550 applied to the movable module 1000 is also extremely small. Accordingly, the movable module 1000 can be rocked appropriately without receiving effects of the deformation of the imaging element flexible circuit board 1550 and thus a hand shake correction can be performed surely.

Further, in this embodiment, the hand shake detection sensor 170 is mounted on the movable module 1000 and a closed loop control is adopted. The sensor flexible circuit board 175 which is electrically connected with the hand shake detection sensor 170 is drawn out from the end part of the movable module 1000 on the opposite side to an object to be photographed side. However, since the movable module 1000 is rocked with the imaging element 155 side with respect to the lens 121 (end part on the opposite side to the object side) as a center, the movable module 1000 can be rocked appropriately without receiving effects of the deformations of the imaging element flexible circuit board 1550 and the sensor flexible circuit board 175 and thus a hand shake correction can be performed surely.

In addition, in this embodiment, a magnetic drive mechanism is used as an actuator for hand shake correction. In the case of magnetic driving, the structure can be simplified and its weight can be reduced but, since the movable module 1000 is driven in an elastic and non-contact manner, the movable module 1000 is easily affected by an external force. However, in this embodiment, the movable module 1000 is rocked with the imaging element 155 side (end part on the opposite side to an object side) as a center, in other words, the movable module 1000 is rocked with the side where the imaging element flexible circuit board 1550 and the sensor flexible circuit board 175 are located as a center. Therefore, the deformations of the imaging element flexible circuit board 1550 and the sensor flexible circuit board 175 are hard to affect as external forces. Accordingly, even when the movable module 1000 is structured to be rocked by magnetic driving, appropriate driving is performed and thus a hand shake correction superior in responsiveness can be performed accurately.

Further, in this embodiment, both of the imaging element flexible circuit board 1550 and the sensor flexible circuit board 175 are used in folded state in the optical axis direction but all of the bent portions 1550f, 1550g, 1550h and 175h are formed in the strip-shaped thinner width portions 1550b and 175b. Therefore, the bent portions can be bent with a small force and, since the shape returning force after having been bent is small, the deformations of the imaging element flexible circuit board 1550 and the sensor flexible circuit board 175 are hard to affect the rocking of the movable module 1000. Further, the folded structures are adopted in the imaging element flexible circuit board 1550 and the sensor flexible circuit board 175. Therefore, when the movable module 1000 is rocked, the tensile strains "h" defined by the following expression of the imaging element flexible circuit board 1550 and the sensor flexible circuit board 175 become smaller.

Tensile strain "h"=ΔL/L
L: Original length
ΔL: change of length

Accordingly, the stress "f" defined by the following expression also becomes smaller.

Stress f=E·h
E: Constant

Therefore, a rocking inhibition due to the imaging element flexible circuit board 1550 and the sensor flexible circuit board 175 is reduced. Accordingly, since the movable module 1000 can be rocked appropriately, a hand shake correction can be performed surely.

Further, in this embodiment, the tip end of the pivot part 205 is utilized for rockably supporting the movable module 1000 and thus the movable module 1000 can be surely supported so as to be capable of rocking with a simple structure. Further, since the hand shake detection sensor 170 is disposed at the position overlapped with the tip end of the pivot part 205 in the optical axis direction, the displacement in any direction of the movable module 1000 due to a hand shake can be detected surely and thus hand shake correction can be performed surely.

Further, the strip-shaped thinner width portions 1550b and 175b of the imaging element flexible circuit board 1550 and the sensor flexible circuit board 175 are extended on both sides of the pivot part 205 in a juxtaposed manner so as to avoid the tip end of the pivot part 205. Therefore, a gap space formed by the tip end of the pivot part 205 between the movable module 1000 and the base 220 of the fixed body 210 can be utilized as a space for routing the imaging element flexible circuit board 1550 and the sensor flexible circuit board 175.

Further, in the strip-shaped thinner width portions 1550b and 175b of the imaging element flexible circuit board 1550 and the sensor flexible circuit board 175, the bent portions 1550f and 175h directing to the imaging element 155 and the hand shake detection sensor 170 are symmetrically disposed around the support protruded part 225 with the support protruded part 225 as a center. In other words, in this embodiment, the bent portions 1550h and 175h are disposed at point-symmetry positions or substantially point-symmetry positions. Therefore, even when the movable module 1000 is rocked in any direction, forces of the imaging element flexible circuit board 1550 and the sensor flexible circuit board 175 applied to the movable module 1000 are equivalent to each other. Accordingly, since the movable module 1000 can be rocked appropriately, a hand shake correction can be performed surely.

Further, in this embodiment, in order to mount the attached module 270 provided with the shutter mechanism on an object to be photographed side with respect to the photographing unit 1a, the attached module 270 is fixed to the fixed body 210. Therefore, even when the attached module 270 is provided, the movable module 1000 is structured in a light-weight state and thus, when a hand shake is to be corrected, the movable module 1000 can be rapidly rocked with a small force.

In this embodiment, in both of the first shake correction magnetic drive mechanism 250*x* and the second shake correction magnetic drive mechanism 250*y*, a magnet (shake correction magnets 240*x* and 240*y*) is held by the movable module 1000 which is a movable body, and a coil (shake correction coils 230*x* and 230*y*) is held by the fixed body 210. Therefore, the number of wiring lines to the movable module 1000 that is a movable body is small and thus a structure for the wiring lines can be simplified. Further, when the shake correction coils 230*x* and 230*y* are mounted on the fixed body 210, the winding number of the shake correction coils 230*x* and 230*y* can be increased and thus a large drive force can be obtained. In addition, since the shake correction magnets 240*x* and 240*y* whose mass is smaller than that of the shake correction coils 230*x* and 230*y* are provided on the movable module 1000 which is the movable body, the weight of the movable module 1000 can be reduced. Accordingly, since the movable module 1000 can be rocked with a small force, power consumption required for shake correction can be reduced. Further, according to this embodiment, responsiveness to a hand shake is superior.

Another Embodiments
(Structure of Flexible Wiring Member)

Figure 19:
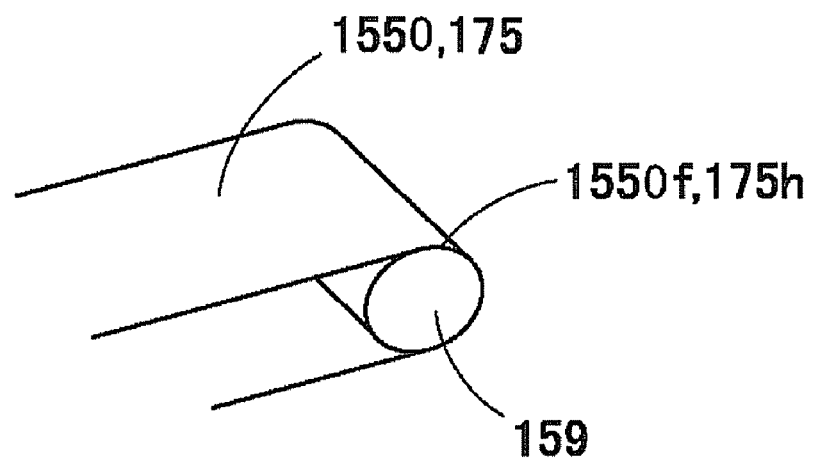
FIG. 19 is an explanatory view showing a bent portion of a flexible circuit board in a photographic optical device to which at least an embodiment of the present invention is applied.
Figure 20:
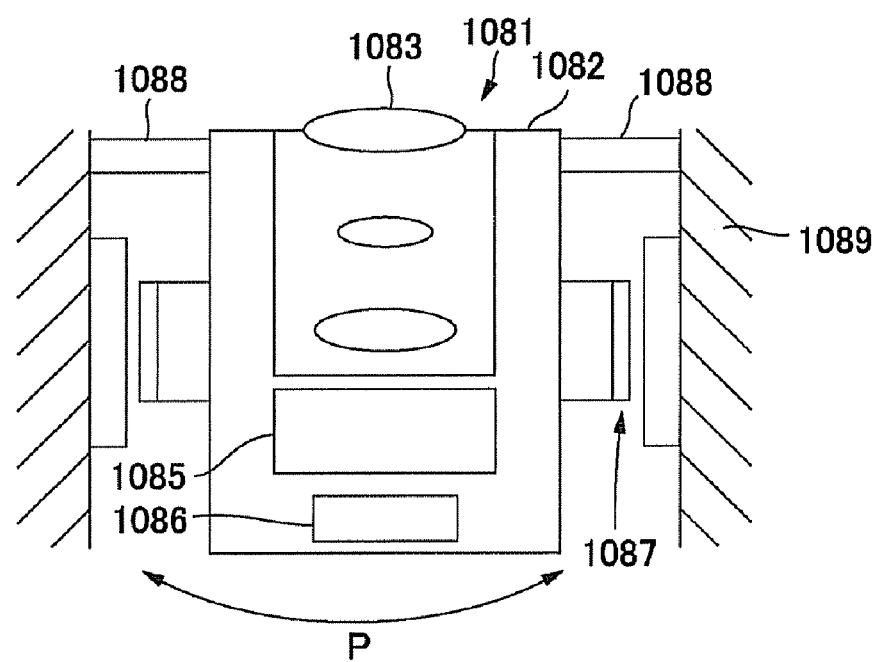
FIG. 20 is an explanatory view showing a conventional photographic optical device.

In order to structure bent portions such as the bent portions 1550*f* and 175*h* in the imaging element flexible circuit board 1550 and the sensor flexible circuit board 175, as shown in FIG. 19, a bend-back prevention member 159 in a circular cylinder shape or a cylindrical tube shape may be adhesively bonded on an inner side of the bent portion such as the bent portions 1550*f* and 175*h*. According to this structure, even when the imaging element flexible circuit board 1550 and the sensor flexible circuit board 175 are bent, the bent shapes of the imaging element flexible circuit board 1550 and the sensor flexible circuit board 175 can be maintained surely, and a force due to bend-back of the bent portion does not affect the movable module 1000.

In the embodiment described above, the imaging element 155 and the hand shake detection sensor 170 are connected with separate flexible circuit boards but at least an embodiment of the present invention may be applied to a case that the imaging element 155 and the hand shake detection sensor 170*a* are connected with a common flexible circuit board.

In the embodiment described above, the imaging element flexible circuit board 1550 and the sensor flexible circuit board 175 which are electrically connected with the imaging element 155 and the hand shake detection sensor 170 are drawn out from the end part of the movable module 1000 on the opposite side to an object to be photographed side. On the other hand, instead of utilizing the above-mentioned flexible circuit boards, it may be structured that flexible wiring members such as a resin coated lead wire are drawn out from the end part on the opposite side to the object side of the movable module 1000. In this case, although deformation of the flexible wiring member may affect the movable module 1000, according to at least an embodiment of the present invention, the movable module 1000 can be rocked appropriately without being affected by the deformation of the flexible wiring member and thus a hand shake correction can be performed surely.

(Structure of Drive Mechanism)

In the embodiment described above, the movable module 1000 is rocked around the X-axis and the Y-axis by two shake correction magnetic drive mechanisms. However, the movable module 1000 may be rocked around the X-axis and the Z-axis by two shake correction magnetic drive mechanisms or the movable module 1000 may be rocked around the Y-axis and the Z-axis by two shake correction magnetic drive mechanisms.

In the embodiment described above, in both of the first shake correction magnetic drive mechanism 250*x* and the second shake correction magnetic drive mechanism 250*y*, a magnet (shake correction magnets 240*x* and 240*y*) is held by the movable module 1000 which is a movable body, and a coil (shake correction coils 230*x* and 230*y*) is held by the fixed body 210. However, a shake correction coil is held by the movable module 1000 which is a movable body and a shake correction magnet is held by the fixed body 210.

In the embodiment described above, only the gimbal spring 280 is used as an urging means for urging the movable module 1000 toward the tip end of the pivot part 205. However, a magnetic spring for urging the movable module 1000 toward the pivot part 205 by a magnetic operation and a spring member mechanically urging the movable module 1000 toward the tip end of the pivot part 205 may be used as the urging means. The gimbal spring 280 described with reference to FIGS. 1(*b*) and FIG. 6(*b*) may be used as the spring member. Further, as the magnetic spring, a structure may be adopted that a magnetic body is disposed on the fixed body 210 on the opposite side to an object to be photographed side with respect to the shake correction magnets 240*x* and 240*y*. According to this structure, a state where the movable module 1000 is supported by the tip end of the pivot part 205 can be maintained surely. Further, during a neutral period when the shake correction magnetic drive mechanism is stopped, the movable module 1000 is urged toward the tip end of the pivot part 205 only by a magnetic spring and the gimbal spring 280 is set to be in a non-deformed state where the gimbal spring 280 does not generate an urging force. According to this structure, when the movable module 1000 is rocked, the gimbal spring 280 is deformed to generate an urging force. In other words, during a period when the movable module 1000 is not rocked, the gimbal spring 280 keeps a flat shape. Therefore, a portion having linearity between a force applied to the gimbal spring 280 and a deformed quantity of the gimbal spring 280 can be utilized effectively and thus the movable module 1000 can be rocked appropriately and a hand shake correction can be performed surely.

In at least an embodiment of the present invention, in the gimbal spring 280, it is preferable that a vibration absorbing material such as gel material or an elastic sheet is fixed to a connected portion of the arm part 287 with the outer peripheral side connecting part 285, a connected portion of the arm part 287 with the inner peripheral side connecting part 281, and the entire arm part 287. According to this countermeasure, when the movable module 1000 is rocked, the vibration of the arm part 287 can be stopped quickly and thus the vibration of the movable module 1000 can be also stopped quickly.

(Structure of Rocking Support Part)

In the embodiment described above, since the support protruded part 225 is formed in a hemispheric shape, a dimension in the direction of the optical axis "L" of the photographic optical device 2000 can be shortened but the support protruded part 225 may be formed in a shaft shape. Further, a portion of the sensor support plate 115 with which the support protruded part 225 is abutted may be formed in a recessed part which is recessed in a conical shape. In addition, the support protruded part 225 may be formed on the movable module 1000.

(Other Structures)

In the embodiment described above, the present invention is applied to the photographic optical device 2000 which uses the photographing unit 1a whose lens drive coils 30s and 30t are formed in a rectangular tube shape and whose lens drive magnet 17 is formed in a flat plate shape. However, at least an embodiment of the present invention may be applied to a photographic optical device which uses a movable module whose lens drive coils 30s and 30t are formed in a cylindrical shape, whose case 18 is formed in a rectangular tube shape, and in which lens drive magnets 17 are disposed at corner portions of the case 18.

In the embodiment described above, the present invention is applied to the photographic optical device 2000 which is used in a cell phone with camera but the present invention may be applied to the photographic optical device 2000 which is used in a thin digital camera or the like. Further, in the embodiment described above, in addition to the lens 121 and the imaging element 155, the lens drive mechanism 5 for magnetically driving the movable body 3 including the lens 121 in the optical axis direction is supported on the support body 2 in the movable module 1000. However, at least an embodiment of the present invention may be applied to a fixed focus type photographic optical device on which the lens drive mechanism 5 is not mounted on the movable module 1000.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correcting function comprising:
   a movable module in which at least a lens is supported on a support body;
   a fixed body which supports the movable module;
   a pivot part which is provided between the movable module and the fixed body for supporting the movable module so that the movable module is capable of being rocked in the fixed body; and
   a movable module drive mechanism provided at two positions with the pivot part interposed therebetween, the movable module drive mechanism being structured to generate magnetic force to rock the movable module with the pivot part as a supporting point;
   wherein the pivot part comprises:
      a support protruded part which is protruded from one of the movable module and the fixed body toward an other of the movable module and the fixed body; and
      an abutted part which is provided in the other of the movable module and the fixed body and with which a tip end part of the support protruded part is abutted.

2. The optical unit with shake correcting function according to claim 1, wherein
   the movable module is a photographing unit in which an imaging element is mounted on the support body,
   the lens is included in a movable body which is supported on the support body and is movable in an optical axis direction,
   a lens drive mechanism for magnetically driving the movable body in the optical axis direction is supported on the support body in the movable module,
   the movable module drive mechanism is provided with a movable module drive magnet provided on the movable module and a movable module drive coil provided on the fixed body,
   the movable module is provided with a cover part surrounding the movable body on an outer peripheral side,
   the lens drive mechanism is provided with a lens drive coil which is held by an outer peripheral face of the movable body and a lens drive magnet which is held by an inner peripheral face of the cover part, and
   the movable module drive magnet is held by an outer peripheral face of the cover part.

3. The optical unit with shake correcting function according to claim 2, wherein
   the movable module is pressed against the pivot part by a spring member, and
   the spring member is provided with an inner peripheral side connecting part that is connected with the movable module, an outer peripheral side connecting part that is connected with the fixed body, and a plurality of arm parts that are extended from the inner peripheral side connecting part in a same circumferential direction as each other and connected with the outer peripheral side connecting part.

4. The optical unit with shake correcting function according to claim 2, wherein
   three directions perpendicular to each other are set to be an X-axis, a Y-axis and a Z-axis, and a direction along the optical axis is set to be the Z-axis, and
   the movable module drive mechanism comprises a first movable module drive mechanism and a second movable module drive mechanism, wherein the first and second movable module drive mechanisms are structured between the movable module and the fixed body and structured to generate magnetic driving forces to rock the movable module around two axial lines of the X-axis, the Y-axis and the Z-axis.

5. The optical unit with shake correcting function according to claim 4, wherein
   the first movable module drive mechanism is provided at two positions and aligned in the Y-axis direction with the pivot part interposed therebetween, and is structured to generate magnetic force to rock the movable module around one of the X-axis and the Y-axis; and
   the second movable module drive mechanism is provided at two positions and aligned in the X-axis direction with the pivot part interposed therebetween, and is structured to generate magnetic force to rock the movable module around an other of the X-axis and the Y-axis.

6. The optical unit with shake correcting function according to claim 5, wherein
   the fixed body is provided with a fixed cover whose magnetic body portion covers an outer peripheral side of the movable module and the movable module drive mechanism, and
   magnetic poles of the movable module drive magnets adjacent to each other around the optical axis are different from each other.

7. The optical unit with shake correcting function according to claim 2, further comprising a magnetic piece for generating a magnetic attraction force between the lens drive magnet and the magnetic piece which is held by the movable body at a position on an object to be photographed side in the optical axis direction with respect to the lens drive magnet.

8. The optical unit with shake correcting function according to claim 1, wherein
the movable module drive mechanism is provided with a movable module drive magnet which is held by one of the movable module and the fixed body and a movable module drive coil which is held by an other of the movable module and the fixed body.

9. An optical unit with shake correcting function comprising:
a movable module in which at least a lens is supported on a support body;
a fixed body which supports the movable module;
a pivot part which is provided between the movable module and the fixed body for supporting the movable module so that the movable module is capable of being rocked in the fixed body;
a spring member provided between the movable module and the fixed body for pressing the movable module against the pivot part; and
a movable module drive mechanism provided between the movable module and the fixed body and structured to generate a magnetic force to rock the movable module with the pivot part as a supporting point;
wherein the spring member is provided with an inner peripheral side connecting part that is connected with the movable module, an outer peripheral side connecting part that is connected with the fixed body, and a plurality of arm parts that are extended from the inner peripheral side connecting part in a same circumferential direction as each other and connected with the outer peripheral side connecting part;
wherein the pivot part comprises:
a support protruded part which is protruded from one of the movable module and the fixed body toward an other of the movable module and the fixed body; and
an abutted part which is provided in the other of the movable module and the fixed body and with which a tip end part of the support protruded part is abutted.

10. The optical unit with shake correcting function according to claim 9, wherein
the movable module is a photographing unit in which an imaging element is mounted on the support body,
the lens is included in a movable body which is supported on the support body and is movable in an optical axis direction,
a lens drive mechanism for magnetically driving the movable body in the optical axis direction is supported on the support body in the movable module,
the movable module drive mechanism is provided with a movable module drive magnet provided on the movable module and a movable module drive coil provided on the fixed body,
the movable module is provided with a cover part surrounding the movable body on an outer peripheral side,
the lens drive mechanism is provided with a lens drive coil which is held by an outer peripheral face of the movable body and a lens drive magnet which is held by an inner peripheral face of the cover part, and
the movable module drive magnet is held by an outer peripheral face of the cover part.

11. The optical unit with shake correcting function according to claim 10, wherein
three directions perpendicular to each other are set to be an X-axis, a Y-axis and a Z-axis, and a direction along the optical axis is set to be the Z-axis,
the movable module drive mechanism comprises a first movable module drive mechanism and a second movable module drive mechanism, wherein the first and second movable module drive mechanisms are structured between the movable module and the fixed body structured to generate magnetic driving forces to rock the movable module around two axial lines of the X-axis, the Y-axis and the Z-axis.

12. The optical unit with shake correcting function according to claim 11, further comprising a magnetic piece for generating a magnetic attraction force between the lens drive magnet and the magnetic piece which is held by the movable body at a position on an object to be photographed side in the optical axis direction with respect to the lens drive magnet.

13. A photographic optical device for photographing an object to be photographed, the photographic optical device comprising:
a movable module in which a lens and an imaging element located on an opposite side to the object to be photographed side with respect to the lens are supported on a support body;
a fixed body which supports the movable module;
a shake detection sensor which detects an inclination of the movable module;
a shake correction mechanism which rocks the movable module on the fixed body on a basis of a detection result of the shake detection sensor; and
an imaging element flexible wiring member which is electrically connected with the imaging element and is drawn out from an end part of the movable module on an opposite side to the object to be photographed side;
wherein the shake correction mechanism comprises;
a rocking support part structured to rockably support the movable module with a side where the imaging element is located with respect to the lens as a rocking center; and
a shake correction magnetic drive mechanism structured to generate a magnetic force to rock the movable module on the rocking support part;
wherein the movable module comprises:
a movable body which includes the lens and which is supported on the support body and is movable in an optical axis direction; and
a lens drive mechanism which is provided between the movable body and the support body for magnetically driving the movable body in the optical axis direction;
wherein the rocking support part is the pivot part which comprises:
a support protruded part which is protruded from one of the movable module and the fixed body toward an other of the movable module and the fixed body; and
an abutted part which is provided in the other of the movable module and the fixed body and with which a tip end part of the support protruded part is abutted.

14. The photographic optical device according to claim 13, wherein
the shake detection sensor is electrically connected with the sensor flexible wiring member which is separately provided from the imaging element flexible wiring member, and
each of the sensor flexible wiring member and the imaging element flexible wiring member is a flexible circuit board in which wiring patterns are formed on a flexible insulation substrate and which is provided with a strip-shaped thinner width portion that is folded at least one position in the optical axis direction.

15. The photographic optical device according to claim 14, wherein the strip-shaped thinner width portions of the sensor flexible wiring member and the imaging element flexible wiring member are respectively passed through a gap space that is structured between the movable module and the fixed body by the pivot part so as to avoid the support protruded part.

16. The photographic optical device according to claim 15, wherein the strip-shaped thinner width portions of the sensor flexible wiring member and the imaging element flexible wiring member are juxtaposedly extended so as to interpose the pivot part.

17. The photographic optical device according to claim 16, wherein bent portions of the strip-shaped thinner width portions directing to the shake detection sensor and the imaging element of the sensor flexible wiring member and the imaging element flexible wiring member are disposed around the support protruded part with the support protruded part as a center.

18. The photographic optical device according to claim 14, wherein at least one of the sensor flexible wiring member and the imaging element flexible wiring member is provided with a bent portion whose inner side is adhesively bonded with a bend-back prevention member.

19. The photographic optical device according to claim 14, wherein
the fixed body is provided with a base which is formed in a substantially rectangular shape and structures a part of the pivot part at an opposite side position to an object to be photographed side with respect to the movable module,
the base is provided with side plate parts extending toward the object to be photographed side only from two side parts facing each other of a bottom plate part of the base, and
portions corresponding to two other side parts of the bottom plate part are formed with cut-out parts at positions overlapping with the bent portions of the sensor flexible wiring member and the imaging element flexible wiring member.

20. The photographic optical device according to claim 14, wherein each of the sensor flexible wiring member and the imaging element flexible wiring member is a single-sided flexible circuit board in which wiring patterns are formed on one face of the insulation substrate.

21. The photographic optical device according to claim 13, further comprising a gimbal spring structured to urge the movable module toward the pivot part,
wherein the gimbal spring is provided with an inner peripheral side connecting part connected with the movable module, an outer peripheral side connecting part connected with the fixed body, and a plurality of arm parts extended from the inner peripheral side connecting part to be connected with the outer peripheral side connecting part.

22. The photographic optical device according to claim 21, wherein the gimbal spring is in a deformed state for generating an urging force which urges the movable module toward the pivot part during a neutral period when the shake correction magnetic drive mechanism is stopped.

23. The photographic optical device according to claim 13, further comprising an urging means for urging the movable module toward the pivot part,
wherein the urging means comprises:
a magnetic spring which urges the movable module toward the pivot part by magnetic operation; and
a spring member which mechanically urges the movable module toward the pivot part,
wherein the spring member is a gimbal spring which is provided with an inner peripheral side connecting part connected with the movable module, an outer peripheral side connecting part connected with the fixed body, and a plurality of arm parts extended from the inner peripheral side connecting part to be connected with the outer peripheral side connecting part.

24. The photographic optical device according to claim 13, wherein the shake correction magnetic drive mechanism is provided at two positions with a rocking center interposed therebetween, and is structured to generate magnetic force to rock the movable module on the rocking center.

25. The photographic optical device according to claim 24, wherein
three directions perpendicular to each other are set to be an X-axis, a Y-axis and a Z-axis, and a direction parallel to the optical axis is set to be the Z-axis,
the shake correction magnetic drive mechanism comprises a first shake correction magnetic drive mechanism and a second shake correction magnetic drive mechanism, wherein the first and second shake correction magnetic drive mechanisms are structured between the movable module and the fixed body and structured to generate magnetic driving forces to rock the movable module around two axial lines of the X-axis, the Y-axis and the Z-axis.

26. The photographic optical device according to claim 25, wherein
the first shake correction magnetic drive mechanism is provided at two positions and aligned in the Y-axis direction with the rocking part interposed therebetween, and is structured to generate magnetic force to rock the movable module around the X-axis; and
the second shake correction magnetic drive mechanism is provided at two positions and aligned in the Y-axis direction with the rocking part interposed therebetween, and is structured to generate magnetic force to rock the movable module around the X-axis;
the first shake correction magnetic drive mechanism is provided with first shake correction magnets which are disposed at two positions in the Y-axis direction on the movable module and first shake correction coils which respectively face the first shake correction magnets in the Y-axis direction, and
the second shake correction magnetic drive mechanism is provided with second shake correction magnets which are disposed at two positions in the X-axis direction on the movable module and second shake correction coils which respectively face the second shake correction magnets in the X-axis direction.

27. The photographic optical device according to claim 26, wherein
a side portion extending in the X-axis direction which is located at a displaced position in a Z-axis direction from a position facing the first shake correction magnet in the Y-axis direction is set to be an effective side of the first shake correction coil, and
a side portion extending in the Y-axis direction which is located at a displaced position in the Z-axis direction from a position facing the second shake correction magnet in the X-axis direction is set to be an effective side of the second shake correction coil.

28. The photographic optical device according to claim 26, wherein
an outer face of each of the first shake correction magnet and the second shake correction magnet is magnetized in different poles in a Z-axis direction,
side portions of the first shake correction coil extending in the X-axis direction so as to face respective portions magnetized in different poles of the first shake correction magnet in the Y-axis direction are set to be effective sides, and side portions of the second shake correction coil extending in the Y-axis direction so as to face respective portions magnetized in different poles of the second shake correction magnet in the X-axis direction are set to be effective sides.

29. The photographic optical device according to claim 26, wherein the first shake correction coil and the second shake correction coil are held on respective faces of a rectangular tube-shaped coil holder which is disposed on an outer side of the movable module.

30. The photographic optical device according to claim 26, further comprising an abutting part which is disposed between the fixed body and the movable module, wherein the movable module and the fixed body are abutted with each other through the abutting part before the movable module is abutted with the shake correction coil and before the shake correction magnet is abutted with the fixed body when the movable module is rocked.

* * * * *